US 6,795,071 B2

(12) United States Patent
Tracey et al.

(10) Patent No.: US 6,795,071 B2
(45) Date of Patent: *Sep. 21, 2004

(54) METHOD OF MANAGING WORKFLOW INFORMATION

(75) Inventors: James B. A. Tracey, Danville, CA (US); Bruce Mackinlay, Hayward, CA (US); Joseph Tagupa, North Berkeley, CA (US); Paul Lauffenburger, Grants Pass, OR (US); Daniel Exline, II, Brentwood, CA (US); Harold T. Leach, Jr., Danville, CA (US)

(73) Assignee: DCS, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/317,244

(22) Filed: Dec. 10, 2002

(65) Prior Publication Data

US 2003/0083917 A1 May 1, 2003

Related U.S. Application Data

(63) Continuation of application No. 09/454,923, filed on Dec. 3, 1999.

(51) Int. Cl.[7] ................................................ G06T 11/20
(52) U.S. Cl. ...................................... 345/440; 345/441
(58) Field of Search .............................. 705/7; 345/440, 345/441

(56) References Cited

U.S. PATENT DOCUMENTS 3,862,615 A * 1/1975 Liou .......................... 116/308
4,853,852 A   8/1989 Rosen
4,937,743 A * 6/1990 Rassman et al. ............... 705/8

(List continued on next page.)

FOREIGN PATENT DOCUMENTS

| JP | 07160608 A | * | 6/1995 | ........... G06F/13/00 |
| WO | WO 97/49047 |  | 6/1997 |  |
| WO | WO 98/27479 |  | 12/1997 |  |
| WO | WO 98/27500 |  | 12/1997 |  |
| WO | WO 99/23591 |  | 5/1999 |  |

OTHER PUBLICATIONS

Davis, Karron T. "Credit scoring software: A brief look," Business Credit, Feb. 1999.
Leonard et al. "1995 software reviews," Business Credit, May 1995.
Brill, Jeff. "The importance of credit scoring models in improving cash flow and collections," Business Credit, Jan. 1998.

(List continued on next page.)

Primary Examiner—Tariq R. Hafiz
Assistant Examiner—Catherine M. Colón
(74) Attorney, Agent, or Firm—Knobbe Martens Olson & Bear LLP

(57) ABSTRACT

Methods of managing workflow information in an account-based system are described. The illustrated embodiments include a contact management system, and some embodiments are adapted for employment in a debt collection context. In addition, methods and systems are described for allowing a debt collector to associate debtors with different categories, either manually or automatically in response to predetermined condition. Thus, the system and method provide for efficiently managing the status of debtors by associating each debtor with a particular category. In certain embodiments, the debtor accounts are moved from one category to another, and from one individual to another, as the collection process is undertaken. The system and method maintain each debtor account within a predetermined category, display each of the categories to a collector on a graphical display, and display a list of debtor accounts within the category in response to the collector pressing a function key corresponding to a category.

39 Claims, 30 Drawing Sheets

U.S. PATENT DOCUMENTS

| | | | |
|---|---|---|---|
| 5,097,528 A | | 3/1992 | Gursahaney et al. |
| 5,325,290 A | | 6/1994 | Cauffman et al. |
| 5,402,474 A | | 3/1995 | Miller et al. |
| 5,436,965 A | | 7/1995 | Grossman et al. |
| 5,555,403 A | | 9/1996 | Cambot et al. |
| 5,611,035 A | * | 3/1997 | Hall .......................... 345/440 |
| 5,621,790 A | | 4/1997 | Grossman et al. |
| 5,628,004 A | | 5/1997 | Gormley et al. |
| 5,666,493 A | | 9/1997 | Wojcik et al. |
| 5,724,584 A | | 3/1998 | Peters et al. |
| 5,737,726 A | * | 4/1998 | Cameron et al. .............. 705/7 |
| 5,831,611 A | | 11/1998 | Kennedy et al. |
| 5,866,889 A | | 2/1999 | Weiss et al. |
| 5,889,799 A | | 3/1999 | Grossman et al. |
| 5,890,132 A | | 3/1999 | Sanders |
| 5,917,499 A | * | 6/1999 | Jancke et al. ................ 345/440 |
| 5,995,948 A | | 11/1999 | Whitford et al. |
| 6,064,984 A | | 5/2000 | Ferguson et al. |
| 6,065,012 A | * | 5/2000 | Balsara et al. .............. 707/102 |
| 6,073,104 A | * | 6/2000 | Field .............................. 705/1 |
| 6,131,810 A | | 10/2000 | Weiss et al. |
| 6,158,657 A | * | 12/2000 | Hall et al. ................... 235/380 |
| 6,169,534 B1 | * | 1/2001 | Raffel et al. ................. 345/581 |
| 6,269,369 B1 | * | 7/2001 | Robertson .................... 707/10 |
| 6,321,206 B1 | * | 11/2001 | Honarvar ........................ 705/7 |
| 6,336,138 B1 | * | 1/2002 | Caswell et al. ............. 709/223 |
| 6,430,542 B1 | * | 8/2002 | Moran .......................... 705/36 |
| 6,442,567 B1 | * | 8/2002 | Retallick et al. .......... 707/104.1 |

OTHER PUBLICATIONS

"BN New solutions," Bank News, Feb. 1999.
"Experian Introdues Two Customized Risk Management Software Packages Business Editors and Automotive Writers," Jan. 25, 1999.
Archived version of www.fairisaace.com, May 23, 1998.
"Fair, Isaac's CreditDesk 2.3 (R) Streamlines Operations Through New Web–based Front End and Increased Scoring Model Options," PR Newswire, Jan. 26, 1998.
Mercado, Carol A. "Bankcards Tune Up for High Performance," Bankers Monthly, Sep. 1992.
Lawson, James C. "Knowing the score," USBanker, Nov. 1995.

* cited by examiner

| Hot Accounts Bin | | | | | | | |
|---|---|---|---|---|---|---|---|
| HOT ACCOUNTS BIN | | | | | | | |
| Viewed | # | Debtor Name | Account Number | Follow-up Date | Alarm Time | Remarks | Dialer Result |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

Use Arrow keys or number keys and <Enter> to select line.

| Open Debtor Main Screen <F1> | Schedule For Power Dialer <F2> | Schedule For Auto Dialer <F2> | Expand/Reduce Remarks | Next Page <Page Down> | Previous Page <Page Up> | Exit <Esc> |

| Loan Collection System–Debtor Information: Morgan, Mary S | Collector ID: 13140 Janice Williams Ext. 2373 USAG |
|---|---|

MORGAN, MARY S

| 1 AKA | THOMAS, MARY S | | 123-45-6789 |
| 2 Spo | | Contacted | Balance as of |
| 3 Rep | | 4 Home 1-205-555-1234 [ATT=0][LMTC=0] + | 01-31-1999 $2,826.70 |
| | | 5 Work 1-205-555-6000 [ATT=0][LMTC=0] | 6 Client USAG |

Street Address     762 City    764 State    Zip    Care of

7 Address1: 5432 MAIN STREET , BIRMINGHAM, AL 33333
~~Address2: 12000 EAST PARK BLVD , BIRMINGHAM, AL 36660~~

8 Employer:

9 Scroll     To add a new Lead or Reference select Field #10 through Update Main Screen

| 11. Comaker 1 of 1: Never Contacted<br>MORGAN, JOSEPH 567231004<br>1227 CRIMSON TIDE AVENUE<br>BIRMINGHAM, AL 36702<br>1-205-666-2050    780a | 12. Lead: 1 of 1<br>12/17/98 DEBTOR MAY BE AN ATTORNEY<br><br><br><br>780b | 13. Reference 1of1 : Never Contacted<br>MORGAN, ELIZABETH • SISTER<br>4907 WEST OAKWOOD TERRACE<br>TUSKEGEE, AL 33042<br>1-205-677-3636    780c |

| | 17 DOB | 10-13-1965 | Assignment Date | 02-13-1997 |
| | 18 Notes | N | Rank Average | # of Contacts 2 |

14 Warning:

15 Full Transaction History     Description/Remarks

| UserID | Date/Time | |
|---|---|---|
| 13140 | 12-17-1998, 12:54 PM | Reference01 • Ref, New telephone number • 1-205-677-3636 |
| 13140 | 12-17-1998, 12:54 PM | Lead01 • New LeAd Information • DEBTOR MAY BE AN ATTORNEY |
| 13140 | 12-17-1998, 12:53 PM | Debtor   Borrower, Modify birthdate   10/13/35 |
| 13140 | 12-17-1998, 12:52 PM | Debtor   Debtor, New address   5432 MAIN STREET BIRMINGHAM AL 33333 |

16 Attorney:

Objective: Co-Debtor Follow-up Bin     FDD Hit Count: 0    Hit Count: 0    OFF

19 SMITH, JOHN   DOE, JANE

Loan Collection System–Debtor Information: Morgan, Mary S        Collector ID: 13140 Janice Williams Ext. 2373 USAG MORGAN, MARY S | Contacted | 123-45-6789
--- | --- | ---
1 AKA THOMAS, MARY S | | Balance as of
2 Spo | 4 Home 1-205-555-1234 ATT=0 LMTC=0 | 01-31-1999  $2,826.70
3 Rep | 5 Work 1-205-555-6000 ATT=0 LMTC=0 | 6 Client USAG
 | Street Address  City  State | Zip  Care of 7  Address1: 5432 MAIN STREET , BIRMINGHAM, AL 33333
   Address2: 12000 EAST PARK BLVD , BIRMINGHAM, AL 36660
8  Employer:
9  Scroll         To add a new Lead or Reference select Field #10 through Update Main Screen 11. Comaker 1 of 1: Never Contacted | 12. Lead: 1 of 1 | 13. Reference 1of1 : Never Contacted
MORGAN, JOSEPH  567231004 | 12/17/98 DEBTOR MAY BE AN ATTORNEY | MORGAN, ELIZABETH • SISTER
1227 CRIMSON TIDE AVENUE | | 4907 WEST OAKWOOD TERRACE
BIRMINGHAM, AL 36702 | | TUSKEGEE, AL 33042
1-205-666-2050 | | 1-205-677-3636

| 17 DOB 10-13-1965  Assignment Date 02-13-1997
 | 18 Notes N  Rank Average  # of Contacts 2

Phone: ( )   -
Esc
Enter Phone Number or
Partial Phone Number

1. Account Number
2. Name
3. Phone Number
4. Name/Address
5. Business/Company
6. Client Debt ID#
7. Esc Description/Remarks
• Bad to good Debtor Phone • 1-205-555-1234
Debtor • Bad Telephone Number • 1-205-555-1234
Debtor • Business Directory Search Completed • NEW ADDRESS FROM CLIENT
Reference • Ref. new telephone number • 1-206-677-3636

16 Attorney:
Objective: Co-Debtor Follow-up Bin        FDD Hit Count: 0   Hit Count: 0   OFF
19

Loan Collection System-Debtor Information: Morgan, Mary S    Collector ID: 13140  Janice Williams Ext. 2373 USAG MORGAN, MARY S | Contacted | 123-45-6789
1 AKA THOMAS, MARY S | | Balance as of
2 Spo | 4 Home 1-205-555-1234 [ATT=0][LMTC=0] | 01-31-1999   $2,826.70
3 Rep | 5 Work 1-205-555-6000 [ATT=0][LMTC=0] | 6 Client USAG
Street Address                City              State           Zip           Care of
7 Address1: 5432 MAIN STREET , BIRMINGHAM, AL 33333
  Address2: 12000 EAST PARK BLVD , BIRMINGHAM, AL 36660
8 Employer:
9 Scroll    To add a new Lead or Reference select Field #10 through Update Main Screen 11. Comaker 1 of 1: Never Contacted     12. Lead: 1 of 1                          13. Reference 1of1 : Never Contacted
MORGAN, JOSEPH 567231004                12/17/98 DEBTOR MAY BE AN ATTORNEY         MORGAN, ELIZABETH · SISTER
1227 CRIMSON TIDE AVENUE                                                           4907 WEST OAKWOOD TERRACE
BIRMINGHAM, AL 36702                                                               TUSKEGEE, AL 33042
1-205-666-2050                                                                     1-205-677-3636

10-13-1965     Assignment Date 02-13-1997
N    Rank  Average    # of Contacts  2

1. Account Number          Last Name:
2. Name                    First Name:
3. Phone Number            Street:
4. Name/Address            City:
5. Business/Company        State:
6. Client Debt ID#         Zip Code:
7. Esc                     Esc FDD Hit Count: 0    Hit Count: 0    Hit Count: 0    OFF
16 Attorney:
Objective: Co-Debtor Follow-up Bin
19

| Loan Collection System–Debtor Information: Morgan, Mary S | Collector ID: 13140 Janice Williams Ext. 2373 USAG |
|---|---|

MORGAN, MARY S  — 123-45-6789

1 AKA  THOMAS, MARY S        Contacted
2 Spo
3 Rep                        4 Home 1-205-555-1234 [ATT=0][LMTC=0]  +  $2,826.70
                                                                        Balance as of
                             5 Work 1-205-555-6000 [ATT=0][LMTC=0]      01-31-1999
                                    City             State      Zip     6 Client
      Street Address                                                    USAG
7 Address1: 5432 MAIN STREET, BIRMINGHAM, AL 33333                              Care of
  Address2: ~~12000 EAST PARK BLVD, BIRMINGHAM, AL 36660~~
8 Employer:
9 Scroll        To add a new Lead or Reference select Field #10 through Update Main Screen 11. Comaker 1 of 1: Never Contacted     12. Lead: 1 of 1                13. Reference 1of1: Never Contacted
MORGAN, JOSEPH 567231004                12/17/98 DEBTOR MAY BE AN ATTORNEY   MORGAN, ELIZABETH • SISTER
1227 CRIMSON TIDE AVENUE                                                     4907 WEST OAKWOOD TERRACE
BIRMINGHAM, AL 36702                                                         TUSKEGEE, AL 33042
1-205-666-2050                                                               1-205-677-3636

Date: __-__-____                                           Assignment Date 02-13-1997
Alarm Time:  __:__                900b
Esc                                                        Average  # of     2
                                                                    Contacts
Bad to good Debtor Phone • 1-205-555-1234
ad Telephone Number • 1-205-555-1234
usiness Directory Search Completed • NEW ADDRESS FROM CLIENT
• Ref. new telephone number • 1-206-677-3636

1. Add to Hot Accounts Bin                    900a
2. Remove from Hot Accounts Bin
3. Add to Asset Investigation/Skiptrace Bin
4. Remove from Asset Investigation/Skiptrace Bin
5. Add to Saturday Work Bin
6. Remove from Saturday Work Bin
7. Change Scheduled Follow-Up Date
8. Esc Objective: Co-Debtor Follow-up Bin          FDD Hit Count: 0    Hit Count: 0    OFF
19 TIMOTHY HOWS 450, 752a, 752b, 900a, 900b

| ☐ Loan Collection System—Debtor Information: Morgan, Mary S | | Collector ID: 13140 Janice Williams Ext. 2373 USAG | ☐ ☐ ☒ |
|---|---|---|---|
| MORGAN, MARY S | | Contacted | 123-45-6789 |
| | | | Balance as of |
| 1 AKA | THOMAS, MARY S | 4 Home 1-205-555-1234 [ATT=0][LMTC=0] + | 01-31-1999 $2,826.70 |
| 2 Spo | | | 6 Client |
| 3 Rep | | 5 Work 1-205-555-6000 [ATT=0][LMTC=0] | USAG |
| Street Address | | City State | Zip Care of |
| 7 Address1: 5432 MAIN STREET , BIRMINGHAM, AL 33333 | | | |
| Address2: 12000 EAST PARK BLVD , BIRMINGHAM, AL 36660 | | | |
| 8 Employer: | | | |
| 9 Scroll | | To add a new Lead or Reference select Field #10 through Update Main Screen | |
| 11. Comaker 1 of 1: Never Contacted | | 12. Lead: 1 of 1 | 13. Reference 1of1 : Never Contacted |
| MORGAN, JOSEPH 567231004 | | 12/17/98 DEBTOR MAY BE AN ATTORNEY | MORGAN, ELIZABETH • SISTER |
| 1227 CRIMSON TIDE AVENUE | | | 4907 WEST OAKWOOD TERRACE |
| BIRMINGHAM, AL 36702 | | | TUSKEGEE, AL 33042 |
| 1-205-666-2050 | | | 1-205-677-3636 |

452a
452b

| UserID | Date/Time | Description/Remarks | Total Number Transaction #50 |
|---|---|---|---|
| 13140 | 12-21-1998, 10:35 AM | Debtor • Bad to Good Debtor Phone • 1-205-555-1234 | |
| 13140 | 12-21-1998, 10:34 AM | Debtor • Borrower, Bad telephone number • 1-205-555-1234 | |
| 13140 | 12-17-1998, 10:12 AM | Debtor • Business Directory Search Completed • NEW ADDRESS FROM CLIENT | |
| 13140 | 12-17-1998, 12:54 PM | Reference01 • Ref, New telephone number • 1-205-677-3636 | |
| 13140 | 12-17-1998, 12:54 PM | Lead01 • New Lead Information • DEBTOR MAY BE AN ATTORNEY | |
| 13140 | 12-17-1998, 12:53 PM | Debtor • Borrower, Modify birthdate • 10/13/35 | |
| 13140 | 12-17-1998, 12:52 PM | Debtor • Debtor, New address • 5432 MAIN STREET BIRMINGHAM AL 33333 | |

| Contact/ Result Transactions <F1> | Letters/ Bills Sent <F2> | All Legal Transactions <F3> | Full Transaction History <F4> | All Skiptrace Activities <F5> | Media Received <F6> | All AWG Transactions <F7> | All Consolidation Transactions <F8> | Delete Today's Transactions <F9> | Next Page <Page Down> | Previous Page <Page Up> | Exit <Esc> |

| Loan Collection System--Debtor Information: Morgan, Mary S | Collector ID: 13140 Janice Williams Ext. 2373 USAG |
|---|---|

MORGAN, MARY S    Contacted    123-45-6789
1 AKA  THOMAS, MARY S
                                Balance as of
2 Spo                    4 Home  1-205-555-1234 [ATT=0][LMTC=0] +   01-31-1999   $2,826.70
3 Rep                    5 Work  1-205-555-6000 [ATT=0][LMTC=0]     6 Client
                                                                   USAG
         Street Address                   City          State         Zip        Care of 7 Address1: 5432 MAIN STREET , BIRMINGHAM, AL 33333
  Address2: 12000 EAST PARK BLVD , BIRMINGHAM, AL 36660
8 Employer:
9 Scroll    To add a new Lead or Reference select Field #10 through Update Main Screen 11. Comaker 1 of 1: Never Contacted    12. Lead: 1 of 1          13. Reference 1of1 : Never Contacted
MORGAN, JOSEPH 567231004               12/17/98 DEBTOR MAY BE AN ATTORNEY    MORGAN, ELIZABETH • SISTER
1227 CRIMSON TIDE AVENUE                                         4907 WEST OAKWOOD TERRACE
BIRMINGHAM, AL 36702                                             TUSKEGEE, AL 33042
1-205-666-2050                                                   1-205-677-3636

1  Client:          USA Group Guarantee Services, Inc.     School:           GADSEN BUSINESS COLG
   Client Address:  1131 W BROADWAY                        Client Acct. #:   313870099
                    TEMPE                 AZ 85282         DCS Debtor #:     417460813020l
                                                           Lender:           U.S.A. GROUP LOAN SERVICE
Disbursement Date:      05-09-1991                         Default Date/Tax Year:  08-23-1996
Disbursement Amount:    $2,973.45                          Carge-Off Date:
Assignment Date:        02-13-1997
Assigned Balance:
     Principal     $2,300.06   Interest      $98.38   Collection Costs  $575.01  Late Fees  $0.00
     Misc. Charges $0.00       Court Costs   $0.00    Attorney Fees     $0.00    Total      $2,973.45

Return to          Next Page           Previous Page         Exit
     Loan Balance       <Page Down>         <Page Up>             <Esc>
     Breakdown
     <F1>

FIG. 21

METHOD OF MANAGING WORKFLOW INFORMATION

RELATED APPLICATIONS

This application is a divisional of, and claims priority to, U.S. patent application Ser. No. 09/454,923, filed Dec. 3, 1999 and titled "WORKFLOW MANAGEMENT SYSTEM."

FIELD OF THE INVENTION

The invention relates to methods implemented on a computer system. More particularly, the invention relates to methods of managing workflow information in a workflow management computer system.

BACKGROUND OF THE INVENTION

Businesses and individuals use conventional workflow management and contact management systems to manage workgroups and to track contacts and results with a particular group of individuals. For example, salespeople use contact management systems for tracking the names, addresses, contacts, progress and results with their customers. Individuals use contact management systems for tracking and maintaining information on their friends and acquaintances. Organizations use workflow management systems to manage and distribute the work performed by each individual in the organization.

Contact Management

One contact management system currently available under the trade name ACT! (Symantec Corp., California) provides a conventional contact management system which tracks contacts in a database structure. In use, a sales person keeps a database of potential customers within the ACT! contact database and, using the software, set alarms and flags for managing phone calls, letters and other communications with the potential customer.

Within ACT!, the sales person is presented with a screen displaying the name, address and other pertinent information about the customer to be contacted. The ACT! database can be sorted so that, once a salesperson has made contact with a customer, the next screen that is displayed includes the name and contact information for the next customer to be called. For example, the sales person could sort the contact database for all customers who had not been called within the last three months. A first screen is then displayed to the sales person of the first customer that had not been called within the last three months. Once the sales person has called this first customer, a next screen is displayed having the name and contact information for the next customer that had not been called in the previous three months. This process repeats until the sales person calls all of the customers that had not been contacted within the last three months. Virtually all conventional contact management systems function in a similar manner.

Unfortunately, conventional contact management systems suffer from several disadvantages. One disadvantage relates to the difficulty users have in categorizing their contacts. While conventional contact management systems provide several fields that can be used to sort the contacts into a particular order, it can be very difficult for a user to understand the overall structure of lists generated in this manner. This is due to the format of conventional contact management systems, wherein only lists of contacts are provided to the users. Thus, a need exists for a simple system for conveying to a user of a contact management system the types and number of contacts within particular categories of their system.

Included within the category of contact management systems are debt collection systems. Companies and debt collection businesses use these systems to contact debtors that owe money. Originally, collectors were charged with collecting from purchased, placed or randomly assigned debtor accounts. The collectors could organize hard copy files in a prescribed or selected manner, and would be relied upon for collecting from debtors in an appropriate sequence. Unfortunately, such manual systems failed to ensure that deadlines, such as those dictated by 34 CFR. 682.410(b), were met. Moreover, manual systems required heavy investments in time to organize and prioritize physical files, in addition to depending upon the judgment of individual collectors.

The advent of the computer enabled automation of file organization and prioritizing. Furthermore, automation presented the opportunity to eliminate the risk of improper prioritization. By incorporating a variety of account information in databases, accounts in prior systems could be sequenced according to selected criteria, and collection access to accounts restricted to that sequence, thus ensuring that the accounts are handled in the desired sequence.

For example, the COLLECTOR SYSTEM (Columbia Ultimate, Vancouver, Wash.) is a Microsoft Windows compatible software program that includes a series of windows for displaying information on debtors. The COLLECTOR SYSTEM includes a work-in-process list (WIP list), which displays the debtors' accounts in the order they are to be contacted by the collector. A collection manager who oversees a pool of debt collectors normally sets the order that the debtors are to be contacted. Normally, a manager of this type of system chooses the list of debtors to be contacted by a particular collector. This chosen list of debtors is thereafter transmitted to the collector and the collector contacts the debtors in sequential order. Thus, the collector has very little control over which accounts are contacted at any particular time.

Unfortunately, this type of forced contact with debtors does not provide the flexibility that would be advantageous to a debt collector. The collections manager or automated collection system conventionally forces the order in which debtors are contacted upon the collector so that the manager can retain control over which accounts are being contacted.

In addition, there is no system in the prior art that easily conveys the overall status of all debtor accounts assigned to each collector. The collector may have no idea how many accounts are past due, under administrative wage garnishment, or require a follow up phone call. While many systems allow generation of reports listing specific information, no overall picture of the debtors accounts and the actions required on those accounts were provided.

Workflow Management

Similarly, in workflow management contexts, it is challenging for an organization to manage the flow of work between many different individuals. Moreover, the status of each project, product design and actual product manufacturing is often difficult to assess at a glance. Rather complex data compilation or report generation is typically required before such status is clear. For example, a semiconductor fabrication facility might have many people responsible for various stages of the manufacturing process.

Thus, a need exists for more flexible workflow management methods to allow the organization to move and schedule complicated projects between each individual that is part of a large project.

SUMMARY OF CERTAIN INVENTIVE ASPECTS

In satisfaction of the above-described needs, the present invention includes methods in a workflow management system that efficiently transfer work from one individual to another. In addition, managers are able to graphically determine who is responsible for a project at any stage of development. Desirably, the methods are configured to not only transfer work throughout individuals in an organization, but to also display status information derived from a database, and manipulate or update the database as work is performed.

In a workflow and contact management context, a single contact can be managed by several individuals. One individual may be responsible for calling the contact on the telephone after a particular due date has passed, whereas a different individual may be responsible for sending a letter to the contact after a due date has passed. Aspects of the methods include provisions for moving client records between different individuals in the organization in order to manage the work performed by these individuals. Thus, the methods have the ability to identify particular actions (such as sending a letter) that need to be performed, and thereafter assigning that task to the appropriate individual in the organization.

Accordingly, certain embodiments include a computerized method of managing contact information comprising storing in a computer memory a plurality of names of contacts and a category identifier that identifies one or more categories associated with the plurality of the names of contacts, outputting a graphical display to a display screen, said graphical display comprising a plurality of graphical shapes, wherein each graphical shape represents one of said categories associated with the plurality of the names of contacts, and wherein each category identifier corresponds to a graphical shape, receiving input from a user indicating which of said plurality of graphical shapes is selected by the user, and displaying a list of the plurality of the names of contacts associated with the selected graphical shape.

An additional aspect includes the method wherein the contact information is debt collection information. A further aspect includes the method wherein the graphical shape is selected by the user pressing a function key on a computer keyboard. Another aspect includes the method wherein the graphical shapes are rectangles. A still further aspect includes the method wherein a number of contacts within each category is displayed within its corresponding graphical shape.

The method further comprises storing in a second computer memory a rating for each contact. An additional aspect includes the method wherein the graphical shapes indicate the number of contacts within each category, and the rating for each contact. A further aspect includes the method wherein the graphical shapes indicate the number of contacts having each type of rating by associating a color with each possible rating, and wherein each graphical shape is colored in a proportion substantially equal to the proportion of each rating within the total number of contacts.

The method further comprises changing the association between contacts and categories in response to an event. An additional aspect includes the method wherein said event is generated in response to a key being pressed on a keyboard. A further aspect includes the method wherein said event is generated in response to a selection being made from a menu. As still further aspect includes the method wherein said event is automatically generated in response to a condition being satisfied. An additional aspect includes the method wherein the condition is selected from the group consisting of: a date condition, a time condition, a flag set condition and a data entry found condition.

Certain embodiments include a computerized method of managing debt collection comprising storing in a first computer memory a plurality of names of debtors, a category identifier that identifies one or more categories associated with the plurality of the names of debtors, and a collectability ranking for each debtor, and outputting a graphical display to a display screen, said graphical display comprising a plurality of graphical shapes, wherein each graphical shape represents one of said categories associated with the plurality of the names of debtors, and wherein each category identifier corresponds to a graphical shape.

The method further comprises displaying on the display screen a list of debtors in each category. An additional aspect includes the method wherein the collectability ranking is selected from the group consisting of: Very Good, Average and Poor. The method further comprises storing data relating to a debt owed by the debtor in a second computer memory. A further aspect includes the method wherein the graphical shape is selected by pressing a function key on a computer keyboard. A still further aspect includes the method wherein the graphical shapes are rectangles. An additional aspect includes the method wherein the number of debtors within each category is displayed within the rectangles. Another aspect includes the method wherein the rectangles indicate the number of debtors that have each type of ranking.

An additional aspect includes the method wherein the rectangles indicate the number of debtors having each type of ranking by associating a shading with each possible ranking, and wherein each rectangle is shaded in a proportion equal to the proportion of each ranking within the total number of debtors. The method further comprises changing the association between debtors and categories in response to an event. A further aspect includes the method wherein said event is generated in response to a keyboard input. A still further aspect includes the method wherein said event is generated in response to a user making a selection from a menu. Another aspect includes the method wherein said event is automatically generated in response to a condition being satisfied. An additional aspect includes the method wherein the condition is selected from the group consisting of: a date condition, a time condition, a flag set condition and a data entry found condition.

In addition, certain embodiments includes a computerized method of managing workflow information comprising outputting a graphical display to a display screen, the graphical display comprising a plurality of graphical shapes, wherein each graphical shape represents a plurality of tasks having a common status, determining when a user has selected a graphical shape and displays a list of the plurality of tasks associated with the graphical shape, and automatically changing the association of the plurality of tasks with the graphical shape in response to the generation of an event.

An additional aspect includes the method wherein said event is generated in response to a key being pressed on a keyboard. A further aspect includes the method wherein said event is generated in response to a menu choice being made. A still further aspect includes the method wherein said event is generated in response to a condition being satisfied. Another aspect includes the method wherein the condition is selected from the group consisting of: a date condition, a time condition, a flag set condition and a data entry found condition.

Additionally, certain embodiments include a computerized method of managing debt collection comprising storing a plurality of names of debtors and a category identifier that identifies one or more categories associated with the plurality of the names of the debtors, and outputting a graphical display to a display screen, the graphical display comprising a menu system comprising menu choices that, when selected, associates the plurality of the names of the debtors with a category and updates at least one graphical shape in the graphical display representing the category.

An additional aspect includes the method wherein said menu system generates at least one event. A further aspect includes the method wherein the graphical display further comprises a plurality of graphical shapes, wherein each category identifier corresponds to a graphical shape. A still further aspect includes the method wherein said menu system further comprises instructions that generate an event in response to a menu choice. Another aspect includes the method wherein said event triggers scheduler instructions to perform a task. An additional aspect includes the method wherein said scheduler instructions result in the debtor being associated with a different category.

In addition, certain embodiments include a computerized method of assigning and tracking one or more tasks to a plurality of individuals or stages in an organization, the tasks corresponding to an account in a workflow management system comprising inputting the account having tasks associated with the account, assigning a first status to the account, assigning at least one task corresponding to the account to a first individual or stage in the organization, outputting a graphical display to a display screen, the graphical display comprising at least one graphical shape, wherein the at least one graphical shape indicates the assigning of the at least one task to the first individual or stage, assigning a second status to the account in response to an event, automatically assigning the at least one task to a second individual or stage in the organization, updating the at least one graphical shape on the graphical display to indicate the at least one task no longer being assigned to the first individual or stage, and outputting at least a second graphical shape to the graphical display, the second graphical shape indicating the assigning of the at least one task to the second individual or stage.

An additional aspect includes the method wherein the first and second status are collectability ratings. A further aspect includes the method wherein the graphical shapes are selected from the group consisting of: a rectangle, a bar graph, a pie chart or a line graph. A still further aspect includes the method wherein the workflow management system is a contact management system and the accounts are contacts. Another aspect includes the method wherein the workflow management system is a debt collection system and the accounts are debt collection accounts.

An additional aspect includes the method wherein the event is automatically generated in response to a condition being satisfied. A further aspect includes the method wherein the event is a debtor disputing a debt. A still further aspect includes the method wherein the event is a media received event. Another aspect includes the method wherein the event is a promise to play according to an agreed upon payment plan.

BRIEF DESCRIPTION OF THE DRAWINGS

FIG. 8 is a screen capture that illustrates a list of debtor accounts associated with the Hot Accounts Bin.

FIG. 9 is a screen capture that illustrates a divided (split) main screen for accessing a debtor's account information. The upper portion can remain static while the lower portion changes to display useful information to a collector.

FIG. 10 is a screen capture that illustrates a split main screen having a set of menus for recording contact with a co-debtor displayed along the lower section of the main screen.

FIG. 11 is a screen capture that illustrates a split main screen having a set of menus for recording a message left at a home telephone number displayed along the lower section of the main screen.

FIG. 12 is a screen capture that illustrates a split main screen having a set of menus for recording referral of a debtor to an administrative wage garnishment process displayed along the lower section of the main screen.

FIG. 13 is a screen capture that illustrates a split main screen having a set of menus for sending a letter giving a debtor's financial statement displayed along the lower section of the main screen.

FIG. 14 is a screen capture that illustrates a split main screen having a set of menus for recording instructions not to call a specific phone number displayed along the lower section of the main screen.

FIG. 15 is a screen capture that illustrates a split main screen having a set of menus for entering a telephone number displayed along the lower section of the main screen.

FIG. 16 is a screen capture that illustrates a split main screen having a set of menus for entering an address displayed along the lower section of the main screen.

FIG. 17 is a screen capture that illustrates a split main screen having a menu for generating a set of reports displayed along the lower section of the main screen.

FIG. 18 is a screen capture that illustrates a split main screen having a set of menus for transferring the debtor's account to the hot bin on a specific date displayed along the lower section of the main screen.

FIG. 19 is a screen capture that illustrates a split main screen having a lower section that shows a transaction history table for the debtor.

FIG. 20 is a screen capture that illustrates a split main screen having lower section that shows specific information on the debts owed by the debtor.

FIG. 21 is a screen capture that illustrates a split main screen having lower section that shows default payment options available to offer the debtor.

DETAILED DESCRIPTION

Figure 1:
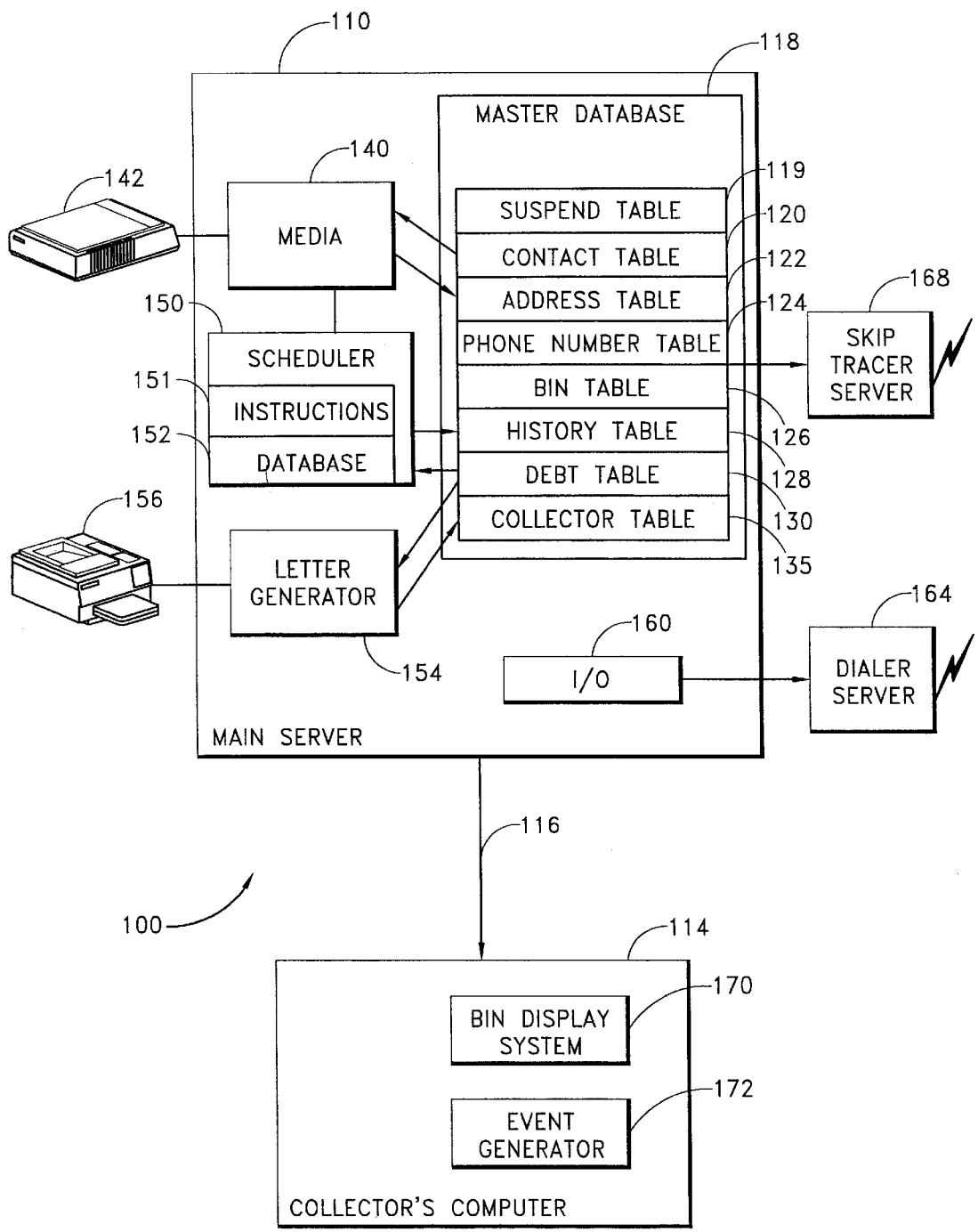
FIG. 1 is a block diagram of a debt collection system in accordance with a preferred embodiment, having a main server and a collector's computer.

The following detailed description is directed to certain specific embodiments of the invention. However, the invention can be embodied in a multitude of different ways as defined and covered by the claims. In this description, references are made to the drawings wherein like parts are designated with like numerals throughout. The following application includes the principal sections listed below:

I. Introduction
II. Definitions
III. System Structure
   A. Overview
   B. Databases
   C. Software Modules
   D. Display
   E. Menus
IV. Method of Operation
   A. Event Generation
   B. Fileback Process
   C. Scatter Back Process
   D. Workflow Management
   E. Contractual Obligations
   F. Scrolling Bins

I. Introduction

As described below, the present invention relates to a workflow management system for managing the flow of tasks in an office. In one embodiment, the workflow management system is a contact management system that has increased flexibility for managing communications between an operator and a contact, while still providing the security and efficiency of automation. In the illustrated embodiment, the operator is a debt collector and the contact is a debtor.

It should be noted that, although the preferred embodiment of the invention, as described below, relates to a debt collection system, the skilled artisan will find application for the features described herein in a variety of workflow contexts. Embodiments of the invention include an improved workflow management system for tracking and managing the flow of tasks between many different individuals or production stages in an organization. For example, the skilled artisan will find application for the system in a sales organization, for allowing a salesperson to efficiently manage orders and customers; in an assembly line or other multiple-stage fabrication facility, for managing the status of workpieces at various stages of manufacturing; for tracking the progress of various projects; etc. As will be described below, certain features and aspects of the invention are broadly applicable to a vast range of computerized organizational tools such as Project Management Systems or Decision Support Systems, to name only a few of the existing possibilities.

One embodiment of the invention is a workflow management system that can be used to track and coordinate the progress of orders in a sales office. For example, embodiments of the invention are useful in a grocery store to notify a receiving clerk about new products, to notify a stock person that new goods are available, and to notify management that items have been received and stocked on shelves. In this example, the store management would define several categories of items. Some categories might be, for example, "received", "stocked on shelves" and "ready for sale".

The system in accordance with such an embodiment displays graphical categories ("bins") in the shape of a bar graph that graphically represents the numbers of fruits, meats and dairy products within the store. Each bin is linked to a particular function key on the keyboard so that activation of the function key displays a related series of sub-bins. Pressing the function key that corresponds to the fruit bin would display a series of bins corresponding to, for example, the number of apples, peaches and pears in stock in the store. By pressing the function key corresponding to the number of apples in the store, the system would display all of the information concerning the delivery times and dates of the apples.

The illustrated embodiment of the invention includes a graphical representation of categories of items that are being tracked within the system. For example, in a debt collection system, each of the items being tracked is a debtor or a debtor account. The person responsible for contacting the debtor is a collector. In addition, each collector normally reports to a manager that oversees and provides guidance to a pool of collectors. The debt collection system provides a plurality of categories that can be associated with each debtor. For example, a debtor account that is new to the system can be assigned to a "New Contact" category, while a debtor account that needs to be contacted within the next two days can be assigned to a "Two Day Follow-up" category (see, e.g., FIG. 5). Of course, this category could be easily modified to include follow-ups after 3, 4, 5 or any other number of days. Each debtor account is associated with a particular category through the use of a category identifier string that is stored in a table within the debt collection system. Thus, each debtor account is associated with a category that reflects his current status within the debt collection system.

Once each debtor account is associated with a category, the categories are graphically represented to the collector in a "bin" display. A display generator that creates colored bars or other visually identifiable symbols on a display screen outputs the bin display. However, it should be realized that the invention is not limited to the particular rectangular shape of the bin display. A bin display can include graphical representations of line graphs, pie charts or any other indicia of a category. The bin display is designed to mimic the look and feel of a conventional desktop organizer that has a series of categorically identified bins, cubicles, holes, slots or baskets. In one embodiment, each bin graphically represents the number of debtor accounts that are associated with the category for the selected bin. According to one aspect of the invention, each "bin" resembles a bar within a bar graph. According to another aspect, the number of debtor accounts associated with each bin is represented next to or within the bin symbol.

Moreover, the bin display should not be envisioned as a one-dimensional graphical representation of categories, but rather as a multi-dimensional representation of categories. Each bin has a "depth" in that pressing a function key associated with one bin can lead to a series of "sub-bins" that graphically represent data (not shown) within the main bin. For example, a main bin might list Today's Work, while the sub-bins display graphs relating to the type of work to be done today. In the illustrated embodiment, Today's Work Bin is divided into sub-bins for accounts sent to this bin due to due diligence, media to review, defaulted from billing, never contacted and contacted (the latter two categories being returned from Central Files). Each sub-bin can include its own set of sub-bins so that a hierarchy of bins can be accessed within the system.

The bin display can also have "width" in that a user can press the right and left arrow keys (or other input commands) to scroll to bins that are not shown on the screen. For example, pressing the right arrow key will shift the bin display to the left by one bin, and display a new bin on the right side of the screen. Moreover, the bin display can be envisioned as a scrolling belt of individual bins, wherein pressing the right arrow key will move bins so that they travel off the left edge of the screen and eventually return to the right edge of the display in a circular manner. This process will be described more completely below with respect to FIG. 30.

In accordance with another aspect of the invention, each of the debtor accounts are first ranked according to how collectable their debt is likely to be for the debt collection personnel. For example, a debtor with a good job might have an account that is ranked as "Very Good" in relation to collectability, whereas a debtor that has not worked for two years may have an account that is ranked as "Very Poor" in relation to collectability. A debtor with average collectability will have an account that is ranked "Average". Of course, this aspect of the invention is not narrowly limited to these specific rankings. Other rankings, such as "Worst", "Normal", "Best", numeric rankings or the like are within the scope of the invention. Most preferably, the ranking system is automated, based upon information stored within the database.

Figure 5:
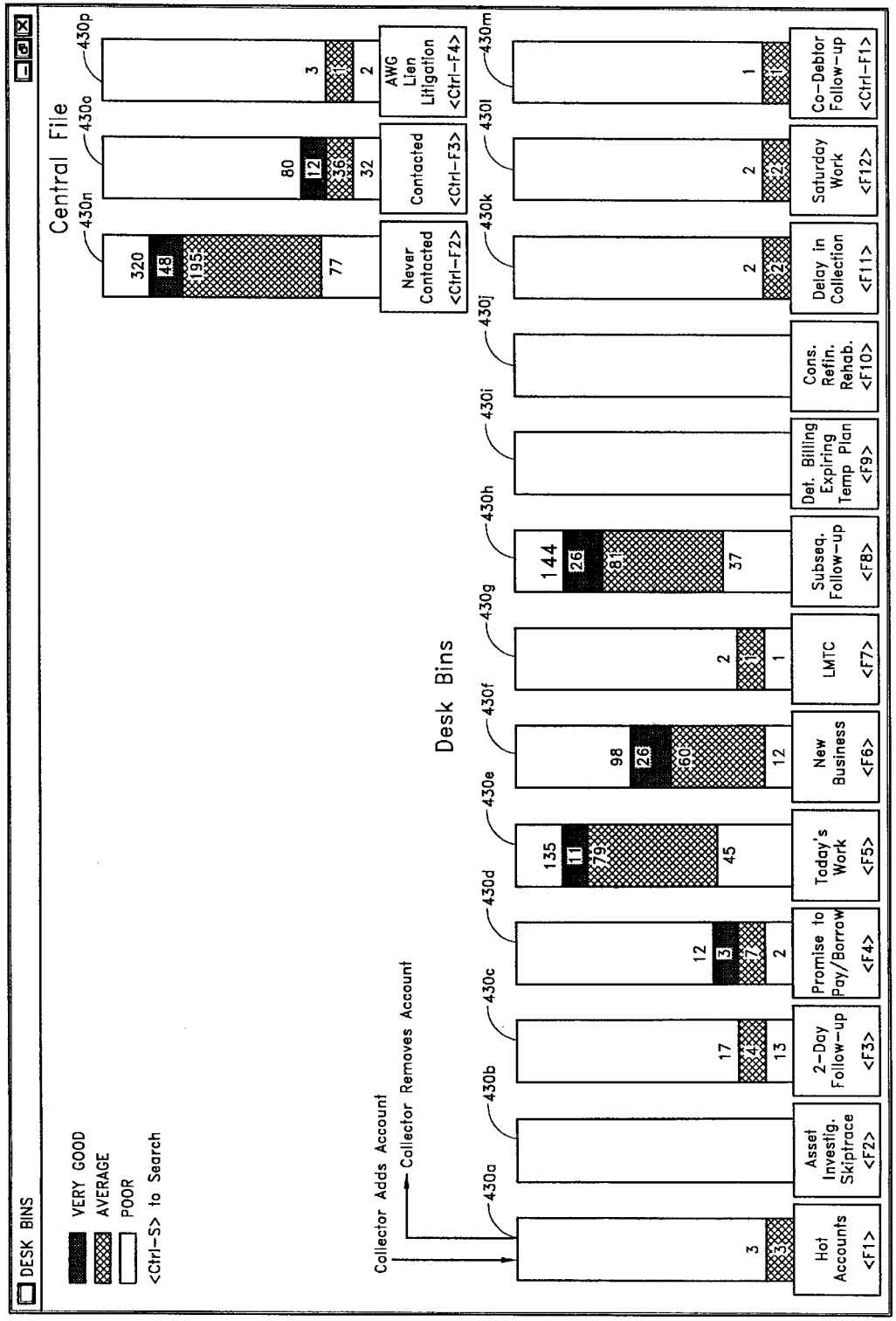
FIG. 5 is a screen capture illustrating a series of bins according to one preferred embodiment of the invention.

Once the debtor accounts are ranked according to their collectability, that information is preferably also displayed on the bin display. For example, in the illustrated embodiment, each bar (representing an individual category) within the bin display is divided into colors, with the height of each color within the bar representing the percentage of debtor accounts in that category that are ranked either "Very Good", "Average", or "Poor" in regards to collectability. FIG. 5 is a screen capture illustrating such an embodiment and is discussed in detail below. The number of debtor accounts within each category is also preferably displayed along side, within or on top of the corresponding color of the bar.

In accordance with another aspect of the invention, events within the system control the association of debtor accounts with categories. For example, a "telephone contact" event can be generated if the collector indicates in the system that he spoke to the debtor on the telephone. This event causes instructions to be run in the system that associate the debtor account with the "Contacted" category, and remove the debtor's association with the "Never Contacted" category. The bin display would then be updated to reflect that one debtor account has left the "Never Contacted" category and one debtor account has been added to the "Contacted" category.

It should be noted that this mechanism of categorizing debtor accounts can form the basis of an efficient work flow management system. Of course, it should be realized that this system is not limited to debt collection systems, and finds applicability in a wide range of organizations wherein work projects are assigned to individuals. However, in the debt collection context, work can be distributed to various individuals by assigning and moving debtor accounts between various categories. For example, a collector might need to have a letter sent out to a debtor requesting payment. The collector can assign that debtor to a "Send Letter" category. At the end of each day, the system automatically copies all debtor accounts that are found in each collector's "Send Letter" category to the "Today's Letters" category of a mail clerk. That mail clerk would then know that each debtor listed in his "Today's Letters" category needs to have a letter sent. Thus, the system manages the flow of letter creation and mailing within the organization.

Events can be manually controlled by the collector through the use of the integrated menu system, or automatically generated by the system if a predetermined condition is met. In embodiments of the system described herein, the collector can enter virtually all types of contacts and account management through a set of simple menu choices, rather than requiring the collector to memorize numerous codes or manually typing the information.

Figure 11:
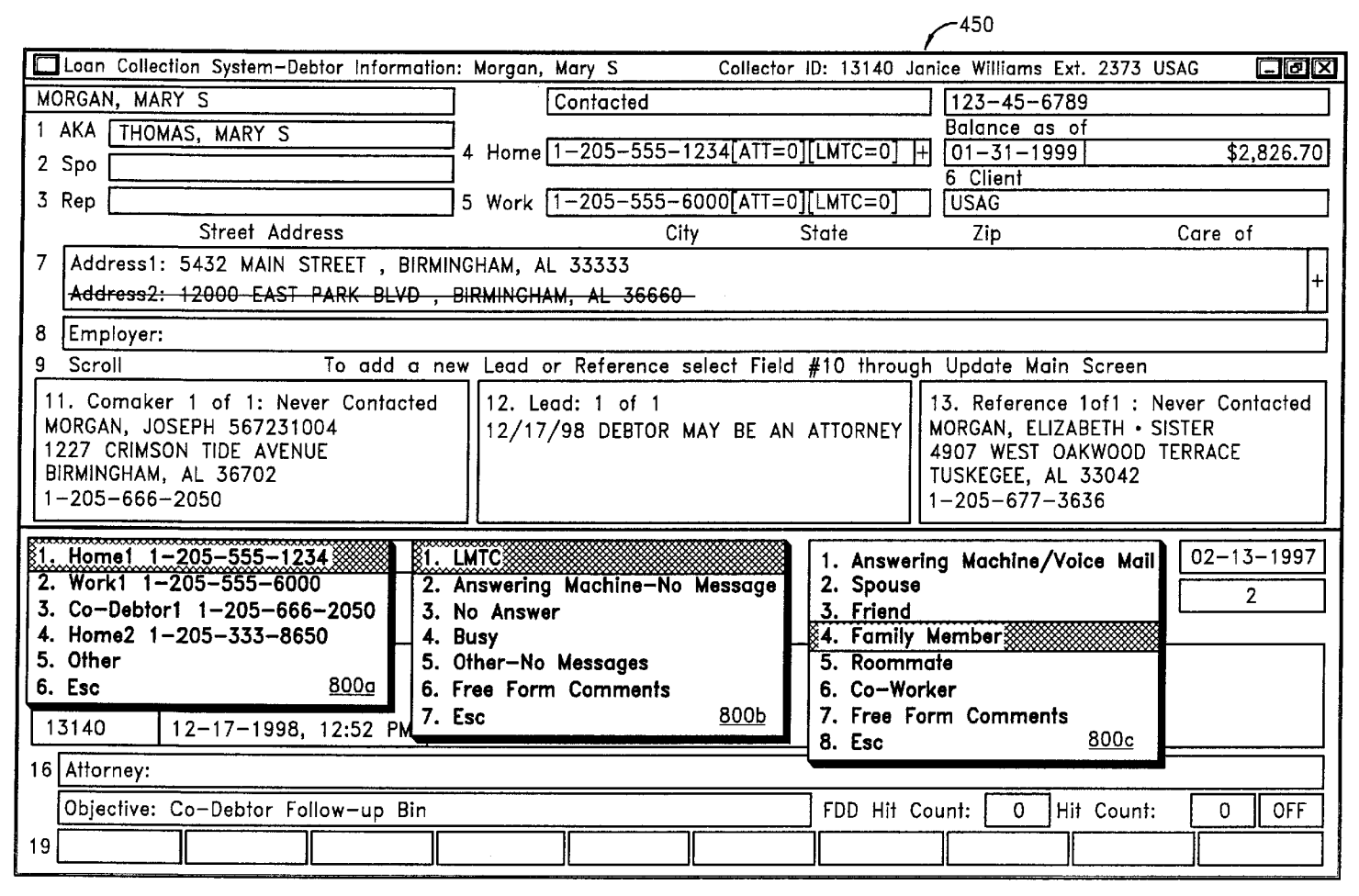

For example, with reference to FIG. 11, a collector that wants to indicate that he has contacted a debtor by telephone can choose the Contact menu by pressing a function key. A menu then appears that lists the telephone numbers of all of the individuals having a connection with the currently listed account. The work and home phone numbers of the main debtor, co-debtors and other references are displayed to the collector. After selecting the phone number through which contact was made, a second menu is displayed that lists various types of contact.

Exemplary types of contact include a Left Message to Call (LMTC), No Answer, and the like. If the menu choice of LMTC is chosen, another menu choice appears that requests the name or type of person that took the message. Choices such as Family Member, References, Neighbor, Secretary and the like are available. Thus, it is readily apparent that the collector can make some simple menu choices to enter the contact information. This information is then used by the system to generate the proper type of event. An event handler then identifies the event and carries out the appropriate action, in this case associating the debtor with the "Two-Day Follow-up" category indicating that this debtor should be called in two days to follow up on the message.

A particularly powerful feature of the debt collection system is the use of automated events to control the association of debtor's accounts with particular categories. For example, a debtor's account that is currently associated with the "2-Day Follow-Up" category should be contacted within two days of being entered into this category. If the debtor is contacted, then the debtor's account will become removed from the "2-Day Follow-Up" bin and associated with a different category, such as "Promised to Pay".

Integrated into the debt collection system is a scheduler module (FIG. 3) that monitors the status of each debtor account in every category. If a debtor's account is associated with the "2-Day Follow-Up" bin, after ten days the scheduler will automatically generate an event that changes the debtor account's association to, for example, a sub-bin within the "Subsequent Follow-up" bin. In this manner, the collector will now have one more account(s) automatically listed in his or her "Subsequent Follow-up" bin. This automated system for associating debtor's accounts with categories provides the system with its tremendous flexibility.

Of course, this is only one example of how the scheduler can automatically associate a debtor's account with a category in response to a particular condition being met. In the above example, the condition was a follow-up date within the "2-day Follow-up" category. Other conditions can also be tested by the scheduler and, if met, generate a particular event.

Another aspect of the invention is the ability of the collector to set alarms within the debt collection system. The collector can attach an alarm to virtually any event that is generated by the system. Thus, if a debtor's account is associated with the 2-Day Follow-up bin, and two days have gone by, an alarm alerts the collector to this fact. When the alarm is triggered, a pop-up screen appears on the collector's screen. This screen requires the collector to press Enter, or take some other action acknowledging the alarm, before it is removed. In the present implementation, the collector sets the alarms manually. When an alarm is triggered, the name on the account appears in the first box on a transaction history bar (field 19) and flashes green until the collector checks the account.

An additional aspect of the invention is the ability of the system to generate font sizes within each field that correspond to the amount of data that is to be displayed to the collector. For example, if only a few characters are present in a field, the system resizes the font size of the characters so that each character is as large as possible without overflowing the field. A minimum size font is defined so that if a field has a lot of text, the characters will still be readable at a distance from the screen. In addition if too many characters are present in the field, the system allows characters to scroll right or left so that all of the data can be read.

Another embodiment of the invention is the automated system for scheduling work to be performed outside normal business hours. In a preferred embodiment, the bin display includes a "Saturday Work" bin that is associated with debtor accounts that have not been successfully contacted on during business hours Monday to Friday. Debtor accounts can be manually or automatically associated with this bin. For example, a collector that has been unsuccessful at reaching a debtor during the normal workweek can move the debtor's account to the Saturday Work bin. Thus, the next time that the collector works on a Saturday, this debtors account will appear as one of the accounts to be contacted. Additionally, the scheduler module can automatically associate a debtor's account with the Saturday Work bin if there have been a predetermined number of unsuccessful contacts with the debtor during the standard workweek. In one embodiment, the scheduler is pre-programmed to count the number of daytime attempts and evening attempts to reach the debtor. If a specified number of attempts are unsuccessful, restrictions are run to associate the debtor with the Saturday work bin.

One other aspect of the debt collection system is the contract compliance aspect of the scheduler. As can be appreciated, each account that is brought into a debt collection business is normally controlled by contractual obligations with the debt collection business' client. For example, if a debt collection business contracts with the ACME Company to collect on loans owed to ACME, there may be contractual stipulations that that debt collection business must meet during the debt collection process. The scheduler module of the present invention can be advantageously programmed with the contractual obligations, so that if the collector does not meet certain requirements, the system will automatically set an alarm or perform a function such as sending a letter or running a skip trace. Similarly, federally mandated steps are incorporated into the scheduler module. The system also includes the capability of notifying particular managers, or special groups, that a contractual federally mandated obligation will not be met unless an action is taken in the near future.

Accordingly, the user has the flexibility to select which account (or project, step, stage, etc.) to work, based upon his or her own preferences, strengths and efficiencies. At the same time, the system includes automation of movement from bin-to-bin on the basis of events, and graphical representations of those bins. The user is thus automatically provided with information that is readily available to assist the user in his/her decision making.

II. Definitions

A. Account

As used herein, a contact account refers to all of the related information on a particular contact, and in the illustrated embodiment the contact comprises a debtor. The debtor account normally includes data that span several tables in a relational database system. Included within a debtor account can be the debtor's name, address, telephone number, debt information, similar information about co-debtors, leads and references, and much more additional information that is useful to a collector.

B. Collector

A collector is the person that is responsible for collecting a debt from a debtor and represents a contact manager in the illustrated embodiment.

C. Central File

A central file is a main storage for all items within the workflow management system. Items that are newly added to the system are placed in the central file and then associated with one or more categories.

D. Debtor

A debtor is a person that owes a debt, and represents a contact in the illustrated embodiment.

E. Desk Bin

A desk bin is a graphical representation of a category. For example, a desk bin can be in the shape of a square, rectangle, circle or other graphical form that represents a category of information.

F. Input Devices

The input device can be, for example, a keyboard, rollerball, mouse, voice recognition system or other device capable of transmitting information from a user to a computer. The input device can also be a touch screen associated with the display, in which case the user responds to prompts on the display by touching the screen. The user may enter textual information through the input device such as the keyboard or the touch screen.

G. Instructions

Instructions refer to computer-implemented steps for processing information in the debt collection system. Instructions can be implemented in software, firmware or hardware and include any type of programmed step undertaken by components of the debt collection system.

H. LAN

One example of the Local Area Network may be a corporate computing network, including access to the Internet, to which computers and computing devices comprising the debt collection system are connected. In one embodiment, the LAN conforms to the Transmission Control Protocol/Internet Protocol (TCP/IP) industry standard.

In alternative embodiments, the LAN may conform to other network standards, including, but not limited to, the International Standards Organization's Open Systems Interconnection, IBM's SNA, Novell's Netware, and Banyan VINES.

I. Media

Media refers to images, sounds, video or any other multimedia type data that is entered into the preferred debt collection system. Typically media refers to a document that is entered into the system by a document scanner.

J. Main Screen

The main screen is the display window in the preferred debt collection system that appears on the collector's computer and lists contact information such as the name, address and telephone number of the debtor. The upper section of the screen can remain stable, so that the contact information is always displayed. However, the lower portion of the screen is variable in that it can display several different types of information to the collector. For example, the lower section can display the skiptrace history, transaction history, payment information or debt information on the debtor.

K. Microprocessor

The microprocessor may be any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. The microprocessor typically has conventional address lines, conventional data lines, and one or more conventional control lines.

L. Modules

The debt collection system is comprised of various modules as discussed in detail below. As can be appreciated by one of ordinary skill in the art, each of the modules comprises various sub-routines, procedures, definitional statements and macros. Each of the modules are typically separately compiled and linked into a single executable program. Therefore, the following description of each of the modules is used for convenience to describe the functionality of the preferred debt collection system. Thus, the processes that are undergone by each of the modules may be arbitrarily redistributed to one of the other modules, combined together in a single module, or made available in, for example, a shareable dynamic link library.

M. Networks

The debt collection system may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. As used herein, an Internet includes network variations such as public internet, a private internet, a secure internet, a private network, a public network, a value-added network, an intranet, and the like.

N. Operating Systems

The debt collection system may be used in connection with various operating systems such as: UNIX, Disk Operating System (DOS), OS/2, Windows 3.X, Windows 95, Windows 98, and Windows NT.

O. Programming Languages

The debt collection system may be written in any programming language such as C, C++, BASIC, Pascal, Java, and FORTRAN and ran under the well-known operating system. C, C++, BASIC, Pascal, Java, and FORTRAN are industry standard programming languages for which many commercial compilers can be used to create executable code.

P. Skiptrace

A skiptrace is a process that is run on a contact (debtor in the illustrated embodiment) to determine their current address or telephone number. A skiptrace is run on a debtor when the collector cannot locate the debtor at their last known location. Many companies offer skiptrace services through data links. By providing the debtor's name, last known address, phone number and social security number, one of these skiptrace companies will attempt to locate the debtor or the debtor's assets.

Q. Transmission Control Protocol

Transmission Control Protocol (TCP) is a transport layer protocol used to provide a reliable, connection-oriented, transport layer link among computer systems. The network layer provides services to the transport layer. Using a two-way handshaking scheme, TCP provides the mechanism for establishing, maintaining, and terminating logical connections among computer systems. TCP transport layer uses IP as its network layer protocol. Additionally, TCP provides protocol ports to distinguish multiple programs executing on a single device by including the destination and source port number with each message. TCP performs functions such as transmission of byte streams, data flow definitions, data acknowledgments, lost or corrupt data retransmissions and multiplexing multiple connections through a single network connection. Finally, TCP is responsible for encapsulating information into a datagram structure.

III. System Structure

A. Overview

1. Main Server

Referring to FIG. 1, an overview of the debt collection system 100 is provided. The debt collection system 100 includes a main server 110 and collector computer 114. Of course, it should be noted that the main server 110 will generally be connected to a plurality of collector computers in a standard network topology. Such a network could be based on systems and software from MICROSOFT, NOVELL, BANYAN or other well-known companies that provide computer-networking systems.

A data line 116 is shown connecting the main server 110 to the collector computer 114. The dataline 116 is preferably be based on the Ethernet standard or any other well-known network topology standard, such as TCP/IP. In addition, the data line 116 can be part of a wide area network wherein the main server 110 and collector computer 114 are located in physically distant offices and communicate with one another through the data line 116. In such an arrangement, the dataline 116 can be a T1 or fractional T1 line in order to provide real-time data communications between the main server 110 and collector computer 114.

The main server 110 includes a master database 118 that includes a plurality of associated tables. For example, the master database 118 can include a suspend table 119, contact table 120, address table 122, phone number table 124, bin table 126, history table 128, and debt table 130. The structure of the master database 118 and its associated tables is described more specifically in FIG. 2.

In one embodiment, the master database 118 is an Informix® database (Informix Software, Inc., Menlo Park, Calif.). Of course, it should be realized that any conventional relational database, such as those provided by Oracle Corporation, Microsoft, Sun, IBM or other software vendor would work similarly within the main server 110.

The master database 118 communicates with a media module 140, which is linked to a scanner 142. The media module 140 includes instructions for receiving image data from the scanner 142 or other input device and storing it within the master database 118. The scanner 142 is a conventional digitizing scanner for reading and storing images of documents into the system 100. As will be described more completely below, the media module 140 allows the system 100 to store and associate scanned documents with particular debtor records within the master database 118. Thus, a collector could view not only the name and address of a particular debtor, but could also review a scanned image of documents relating to the debtor's account.

Also associated with the master database 118 is a scheduler module 150 that controls movement of data between each of the tables within the master database. As will be described below, the scheduler module 150 includes instructions 151 and a scheduler database 152. The instructions 151, when performed, move data from one table in the master database to another table in the master database in order to automatically track and update debtor information. The scheduler 150 can be activated manually by an event generated from the collector computer 114 or automatically by preset instructions or routines. The scheduler module 150, instructions 151 and scheduler database 152 are described in more detail with respect to FIG. 3 below.

The master database 118 is also in communication with a letter generator module 154, which communicates with a printer 156 for printing letters to debtors. The letter generator module receives name and address information from the master database 118 and merges it with preset form letters in order to output particular letters selected by the collector. In the preferred embodiment, the letter generator module 154 is associated with a separate department within the collection agency, employing multiple printers and personnel dedicated to handling incoming and outgoing media. Advantageously, the master database 118 automatically interfaces with the letter generator module 154 based upon the status of accounts after data input by the collector via menu choices.

The master database 118 is also in communication with an input/output module 160 that connects to a dialer server 164 for automatically dialing debtors either in the foreground or the background. For example, a collector could select a particular debtor from the database 118 and select speed dial to automatically call the debtor listed on the screen. The master database 118 then sends the phone number to dial from the phone number table 124 to the input/output module 160. From the input/output module 160, the phone number is forwarded to the dialer server 164.

The dialer server 164 also includes autodialer and power dialer functions, including instructions and hardware for dialing telephone numbers of debtors, co-debtors, information leads or other contacts. The dialer server 164 thus includes instructions for interpreting signals returned from outgoing calls, determining whether a particular debtor is at home, whether a telephone answering device has picked up the call, whether the number has changed, been disconnected or had a change in area code, etc. In one embodiment, if a telephone answering device has picked up the call, the system automatically leaves a pre-recorded message to the debtor on the answering machine. In another embodiment, the dialer server 164 can include instructions for only connecting a collector with a telephone number being dialed if a person answers the telephone at the dialed telephone number. Thus, the collector does not need to spend time manually dialing telephone numbers and waiting to determine whether anyone is at home. The dialer server 164 can perform these operations in the background as the collector continues to manage his caseload of debtors.

Also in communication with the master database 118 is a skip trace server 168 that is used to run a skip trace on a debtor who cannot be located. Briefly, the skip trace server 168 connects through dial-up or dedicated data lines to a tracking system (not shown). The debt collection system 100 then sends a name, an address or a telephone number of the debtor or reference to be traced to the skip trace server 168 so that it can be processed and sent to a company that maintains databases of names, addresses, phone numbers and employment records of people. Of course, the system can also be linked through the Internet to public or private databases of information.

2. Collector Computer

As illustrated in FIG. 1, the collector computer 114 includes a bin display system 170 and an event generator module 172. Although the collector computer is exemplified as a separate machine with its own processor, it should be noted that embodiments of the invention include a collector computer that acts as a simple terminal attached to a mainframe computer system.

Briefly, the bin display system 170 is used to graphically display the status of a collector's accounts. The bin display system 170 lets the collector know at any time how many accounts are in a particular category so that the most important work to be done is easy to identify and likely to be completed first.

In accordance with one aspect of the invention, the bin display system 170 graphically displays categories of debtor accounts to the collector. Examples of categories are "Hot Accounts" and "2-Day Follow-up". In other work flow management applications, the categories might represent a stage in an assembly process, or a status of a contact. These categories are displayed to the collector as category indicia on the collector's computer screen. Preferably, the category indicia are rectangular bars, each labeled with the name of the category and each including the total number of debtor accounts within the category and their collectability ranking (see FIG. 5 and accompanying description). Of course, other types of graphical category indicia, such as graphs, pie charts, squares, circles and other geometric shapes are within the scope of the invention. The graphical representation can additionally include indicia of the relative numbers of accounts in each category, as will be better understood from the discussion of FIG. 5, below.

The event generator 172 is used within the collector computer 114 to generate events that are used to trigger data movements within the debt collection system. In one embodiment, the events affect the function of the scheduler 150 that resides on the main server 110. Thus, events generated by actions of a collector on the collector computer 114 are sent across the data line 116 and interpreted by the scheduler module 150 within the main server 110.

B. Databases

1. Master Database

Figure 2:
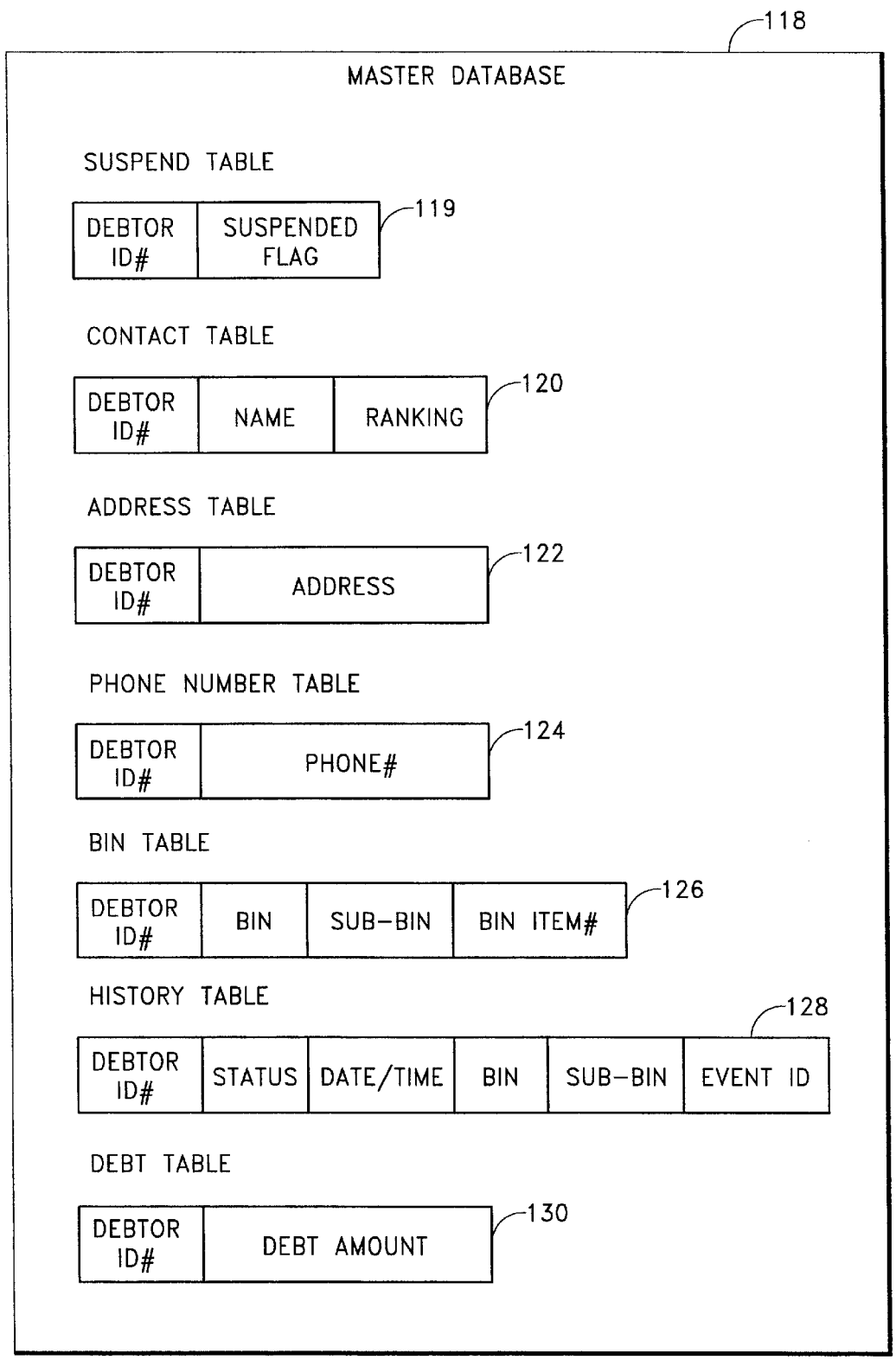
FIG. 2 is a block diagram illustrating one embodiment of a Master Database within the main server of FIG. 1.

Referring now to FIG. 2, a block diagram of the master database 118 is illustrated. The master database includes several tables that store information on debtor accounts. For example, the suspend table 119 includes fields for a Debtor Identification (DID) number and a suspended flag. The DID number is used to uniquely identify one debtor account in the system from all the other debtor accounts. The DID number is preferably a string of numerals, but could include any string of characters without departing from the spirit of the invention.

The contact table 120 includes fields for a DID number, a name and a ranking. The DID number is used throughout the master database to link a particular debtor with all of the information on that debtor. For example, if a debtor had several aliases or several accounts, the contact table may have several records with the same DID number but different names or different debts. In this manner, the system can track aliases and other accounts of a particular debtor. The ranking field is used to store a measurement of how collectable the debt is from this debtor account. For example, if the possibility of collecting the debt is very high, the ranking field could store a "very high" ranking. Ranking debtors is discussed below in more detail.

The address table 122 includes a DID number and an address field. If the debtor has several addresses, then the address table 122 would include several records with the same DID number, but different addresses.

As illustrated, the master database 118 includes a phone number table 124 having a DID number and phone number fields that store all of the known phone numbers for a particular debtor. As described further below, the phone number table 124 maintains old or disconnected phone numbers, which obviates duplicative efforts to contact a debtor or lead.

Similarly, the bin table 126 stores the current bin number, sub-bin number and bin item number for the categories associated with the debtor account. As will be discussed more specifically below, each debtor's account is associated with one or more "bins" and "sub-bins" that indicate the category to which the debtor account belongs. A debtor's account might be associated with a bin such as "New Business" in order to indicate to the collector that the selected debtor's account is a new account. Thus, in one example, all of the debtor accounts that are newly entered into the system can be associated with a "new business" bin. The bin item number refers to a specific action to be taken on the debtor's account that is stored in the associated bin/sub-bin. The bin item number is provided in each record to indicate the appropriate action to take in cases wherein a debtor has more than one entry in the same bin/sub-bin.

The master database 118 also includes a history table 128 for tracking actions that have already occurred within the system. The history table 128 is a copy of the bin table 126, but also includes the date and time of last activity, the event ID of the activity and a status flag. For example, when an item is removed from the bin table, it is placed in the history table, and the status field is marked as "satisfied". The date of last activity is then updated in the history table.

The master database 118 also includes a debt table 130, which stores the debtor identification and amount of debt owed for each debtor. Of course, it should be understood that more than one debt table record for a particular debtor can be added in the debt table 130 if the debtor has more than one outstanding debt. Other information within the master database may include associations between DID's and creditors, which represent clients of the collection agency.

2. Scheduler Database

Figure 3:
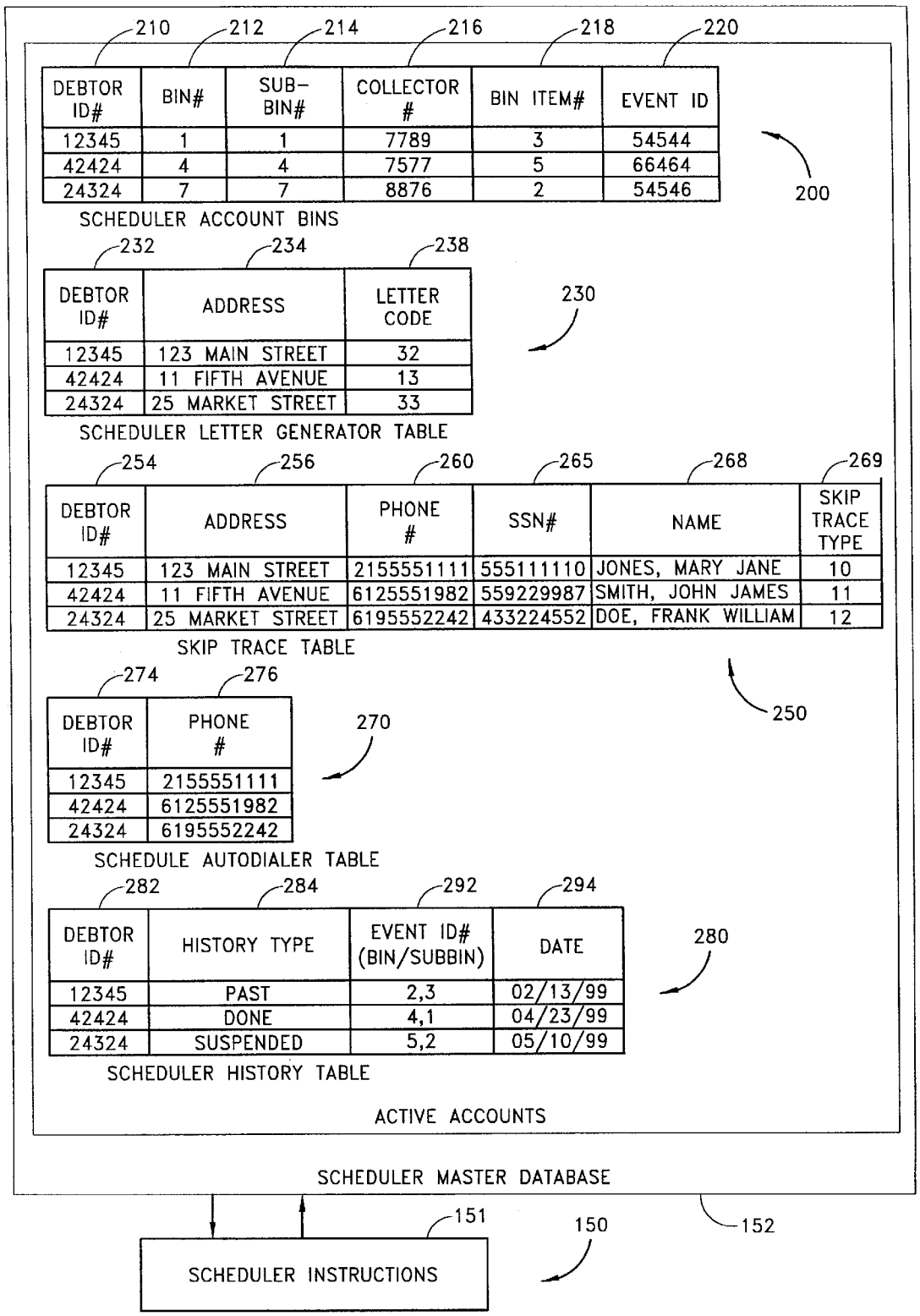
FIG. 3 is a block diagram illustrating one embodiment of a Scheduler Database within the main server of FIG. 1.

Referring now to FIG. 3, a block diagram of the scheduler module 150 is illustrated. The scheduler module 150 includes the scheduler instructions 151 and the scheduler database 152. The scheduler instructions 151 are the software and algorithms that act upon the tables within the scheduler database 152 to generate events and move data from table to table in the system. The scheduler instructions will be described more completely in the following Figures, which describe event handling within the debt collection system.

However, it should be noted that the scheduler instructions 151 can be written in any conventional programming language, such as C, C++, Visual Basic or Perl. In addition, the scheduler database 152 can be based on any well-known relational database such as those produced by Informix Software, Inc., Oracle Corporation, IBM, Microsoft and many others.

The scheduler database 152 includes a scheduler account bins table 200 that includes a DID number field 210, a bin number field 212, a sub-bin number field 214, a collector number field 216, bin item number field 218 and event identification field 220. The DID number field 210 is used to store the debtor account number used in relating the debtor account with the bin and collector to be associated with that account.

In use, the scheduler account bins table 200 is used to track which bins should be associated with a particular DID number. For example, when a collector decides to move a particular debtor account from one bin (category) to another, an event is generated by the collector which stores the destination bin number, destination sub-bin number and the collector's identification number within the scheduler accounts bin table 200.

Scheduler instructions 151 are then run to update the bin table 126 (FIG. 2) with the appropriate bin number and sub-bin number. Once an action has been taken by the scheduler instructions, the record that has been acted upon within the scheduler accounts bin table 200 is deleted from the table 200. Thus, the scheduler accounts bin table 200 includes all of the records for bin movements occurring within the system. Once a bin movement has been undertaken, that record is deleted from the scheduler account bins table 200.

The scheduler accounts bin database is also used to match debtors or debtor accounts with a particular collector. The system described herein, therefore, has particular utility in connection with a debt collection organization that operates on a "cradle-to-grave" principle, whereby accounts are assigned to a collector for dedicated service. Of course, it should be realized that while a particular collector can be dedicated to work on one account, that account can be advantageously assigned to different individuals throughout the office as part of the workflow management system. Thus, while the collector is in charge of the debtor account, the account can be routinely associated with several individuals in the office to efficiently manage tasks associated with that debtor account.

The illustrated account bins table 200 also includes bin and sub-bin information. As will be understood from the further discussion below, the association between a DID number and a bin or sub-bin is, to some extent, controlled by the collector. Moreover, regardless of whether bin movement is manually selected by the collector or automatically follows event generation within the system, the bins and sub-bins displayed on each collector's screen only refer to accounts that are assigned to that collector.

The scheduler database 152 also includes a letter generator table 230 that is used to generate form letters through the letter generator module 154. The letter generator table 230 includes a DID number field 232, an address field 234 and a letter code field 238. The letter code field 238 is used to store the type of form letter to be sent to the debtor.

In use, a collector can normally indicate through a menu selection that a particular debtor should be sent a predetermined form letter. The collector chooses the debtor's name from a menu choice on the screen and thereafter selects a menu option to determine the proper form letter to send to the debtor. Preferably, some menu choices by the collector represent an event, which automatically results in generation of an appropriate letter code. For example, if the collector enters an event indicating that the debtor has promised to pay with specific terms, this event could automatically request a specific letter. Either process adds a new record into the letter generator table 230 that includes the debtor identification number, mailing address and letter code corresponding to the appropriate form letter into the letter generator table 230. The scheduler instructions 151 then, on an automated schedule, read each record within the letter generator table 230 and send the appropriate address and letter code information to the letter generator module 154 to print the desired form letter. Of course, the action taken by the collector to send the form letter can generate an event that causes the scheduler instructions 151 to immediately read the stored record in the letter generator table 230 in order to immediately print a form letter to the debtor.

The scheduler master database 152 also includes a skip trace table 250 that is used to provide skip traces on debtors. The skip trace table includes a debtor ID # field 254, address field 256, phone number field 260, social security number field 265, name field 268 and skip trace type field 269. In use, a collector indicates within the system that a skip trace needs to be run on a particular debtor. By choosing the debtor's name from a menu, the collector can run a skip trace by adding the debtor's name, address, phone number, social security number and DID number to the skip trace table 250. The scheduler instructions 151 then read that record within the skip trace table and perform a skip trace using all of the information stored in the debtor's record.

The scheduler master database 152 also includes an autodialer table 270 that has a DID number field 274 and phone number field 276. In use, a collector indicates within the system that a particular debtor should be contacted using the autodialer module to be described in more detail below. Once the collector has indicated that the debtor needs to be contacted by telephone, a new record is added to the autodialer table 270 that includes the DID number and telephone number of the debtor to be contacted. The scheduler instructions 151 then perform steps that transfer the DID number and telephone number to be dialed to the dialer server 164 (FIG. 1) so that the debtor number can be automatically dialed and routed to the collector after contact.

The scheduler master database 152 also includes a scheduler history table 280 that includes a DID number field 282, history type field 284, event identification number field 292 and date field 294. As will be described in the following figures, the scheduler history table 280 is used to track whether particular events have been done, suspended or are past due.

C. Software Modules

Figure 4:
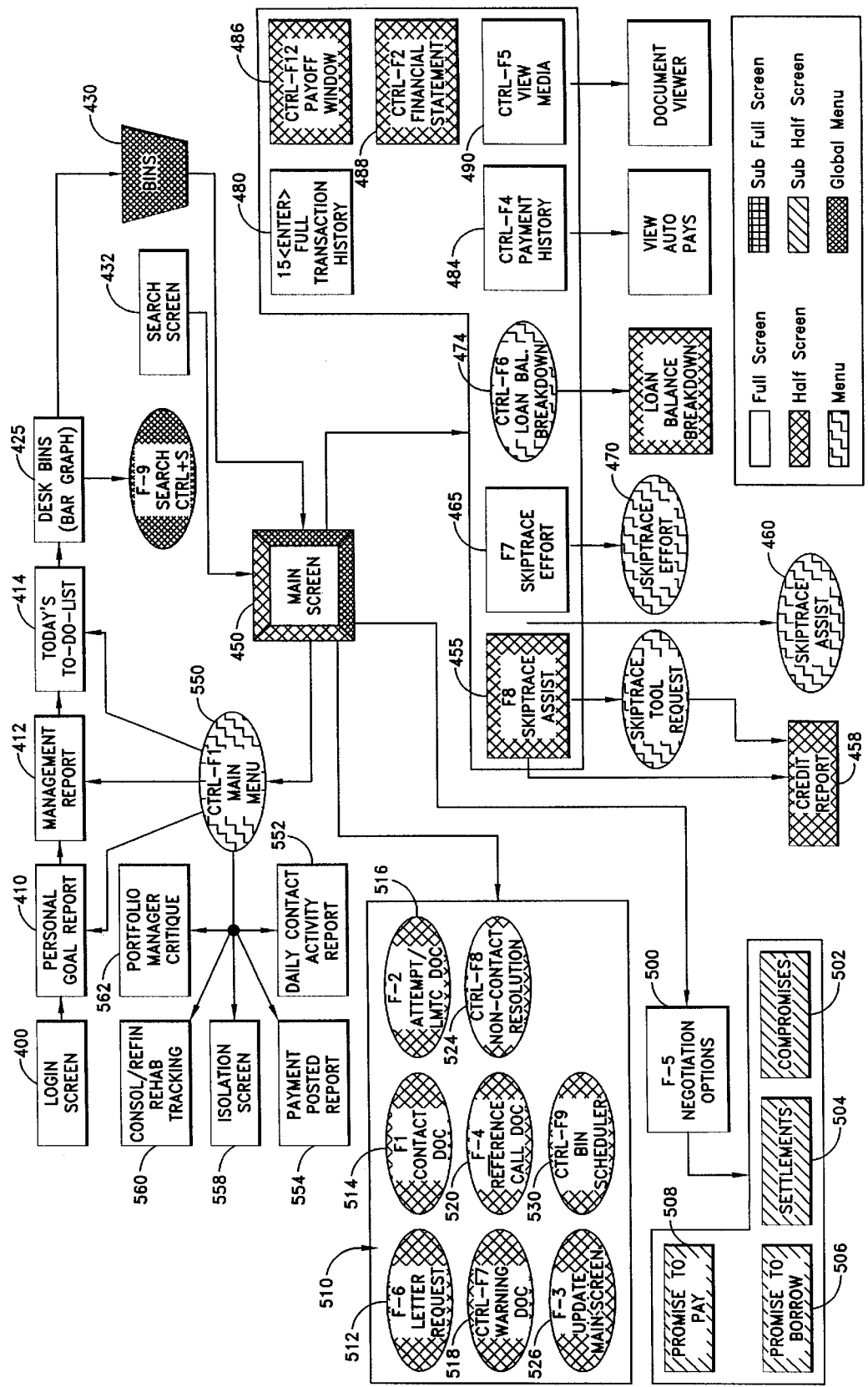
FIG. 4 is a block diagram providing one embodiment of the software modules within a preferred debt collection system.

FIG. 4 is a block diagram illustrating many of the software modules in the preferred debt collection system 100. In addition, FIG. 4 illustrates the flow of data between many of the software modules within the debt collection system 100. For example, beginning at a main screen 450, many different windows can be opened that provide access to modules within the debt collection system.

The debt collection system 100 begins with a login screen 400, wherein a collector or manager logs into the system. If the login is from a collector, a personal goal report 410 is displayed in order to provide collection (quota) goals on performance relative to others in their office, division or company. If a manager had logged in through the login screen 400, a management report 412 is displayed which shows the goal status for all of the collectors that are managed by the manager. A list of that day's to-do list 414 is then displayed which shows all of the actions and accounts to be contacted that day.

Once today's to-do list 414 is displayed, a series of desk bins 425 are displayed to the collector. An illustration of this screen is shown in FIG. 5. As will be discussed in detail below, the desk bins are graphical indicia that represent categories of debtors. From a review of the desk bin display 425, the collector can choose to list the debtors within a specific bin 430 or choose to search the system for a particular debtor using a search screen 432. Thus, the collector is provided with the flexibility of either displaying information stored within particular desk bins or for searching to find particular debtors using the search screen 432.

After displaying information on the search screen 432, or within a particular bin 430, the collector can move to a main screen 450 that provides access to most of the other modules within the collection system. As will be described in more detail below, the main screen 450 displays a compilation of information on the debtor. One example of a main screen 450 is shown in FIG. 9.

In accordance with one aspect of the invention, portions of the main screen 450 are replaced with half screens so that useful information, such as the debtor's name, reference names, address and telephone numbers, remained displayed to the collector while additional information is simultaneously displayed. For example, from the main screen 450, the collector can display a series of half screens that show useful information.

In the illustrated embodiment, from the main screen 450, the collector can press the F8 function key to access a skip trace assistant that appears on the lower half of the main screen 450 and is used to input skip trace information for running this process on the debtor. The skiptrace assistant screen 455 links to a credit report screen 458 or a skip trace assistant module 460. Also from the main screen, pressing the F7 function key on the keyboard can open a skip trace effort screen 465. The collector can thereafter enter information relating to the skip trace screen, which prompts for the type of search to be run. Types of searches are, for example, a credit check or a directory assistance search for people with the same last or surname. Based on the search type, the system requests the user to select the address or party to be searched. Once all of the qualifying information is entered, it is sent through a local area network or wide area network to the skip trace server. The skip trace server sends the request to a skip tracer information provider and the provider returns the requested data. New data is then saved in the database and is presented to the collector. The main screen 450 also links with a loan balance breakdown screen 474 if the collector presses the control and F6 function keys simultaneously.

Other screens, such as a full transaction history screen 480, payment history screen 484, payoff window 486, financial statement 488, and media view screen 490 can also be activated from the main screen 450. As indicated in FIG. 4, many other types of screens can be accessed from the main screen 450 by pressing predetermined function keys, or combinations of function keys, in the collection system. Of course, it should be understood that one of ordinary skill in the art could easily replace activation of a particular screen through a function key with activation of the same screen by using any other key on the keyboard, selection with a mouse or other input.

The main screen 450 also links to a negotiation options screen 500 (see also FIG. 21) that provides a collector with options for negotiating a deal with a debtor. In one preferred embodiment, the negotiation options screen 500 is a half-screen appearing at the lower portion of the main screen 450. Within the negotiation options screen 500 are several sub-screens, such as a compromises sub-screen 502, settlements sub-screen 504, promise to borrow sub-screen 506 and a promise to pay (PTP) sub-screen 508. The sub-screens are preferably accessible by the collector through the use of function keys on the collector's keyboard.

From the main screen 450, there are also several documentation processes 510 that can be initiated. These documentation processes 510 allow a collector to document that particular actions have been taken on the debtor's account. For example, by pressing the F6 function key from the main screen 450, a letter request process 512 can be initiated to send a letter to the debtor requesting payment on the overdue account. This process also documents within the debtor's account that such a letter was sent. As is known, debt collectors are required to document particular actions taken to collect on a debt in order to satisfy contracts with the company that is owed the original debt. The documentation processes 510 can be used to automatically fulfill the requirements of this type of contract by providing an automated system for documenting contacts with debtors.

Other documentation processes 510 can also be run from the main screen 450, including contact documentation process 514, which stores a record in the debtors account showing that a contact was made with the debtor. By pressing the F2 function key in the illustrated embodiment, the collector can run an attempt process 516 which records the date and time that the collector attempted to reach the debtor and left a message to call. Another documentation process is a reference call process 520, wherein the collector documents that a call was made to a reference listed by the debtor on the debtor's original loan application. A non-contact resolution process 524 can also be run by the collector to document that a resolution to the debt collection problem was found without actually contacting the debtor. This might arise, for example, if another person agrees to pay the debt for the debtor.

An update main screen process 526 can be run to prompt for the number of field to change and then requests the updated information from the collector. Once this step is completed, the main screen and central database are updated. As one example, the main screen process can be used to enter a new address, phone number or other debtor information.

Each of these documentation processes 510 can also serves as event triggers, automatically causing movement of an account from bin to bin. In addition, a bin scheduler process 530 can be run to allow the collector to have manual control over selected bins by adding and/or removing accounts from a specific bin.

Also from the main screen 450 is a main menu 550 that allows the collector to link with several additional screens and report generators. For example, from the main menu 550, the collector can produce a daily contact activity report 552 that lists all of the contacts made on that date. Another report that can be run from the main menu 550 is the payment posted report 554 that lists the names of debtors and amounts of money posted as payments to their accounts on the current date.

In addition, from the main menu 550, an isolation screen 558 can be activated to allow managers to control the order and presentation of the bin screen. In one embodiment of the invention, the manager has two options in the isolation screen 558, "priority isolation," and "absolute isolation." With priority isolation, the manager can adjust the priority of selected categories of accounts. For example, the manager can artificially raise or lower the specified balance parameters so as to select all accounts above, below, or within these selected balance limits. Absolute isolation allows the manager to completely remove categories of accounts from bins.

Also from the main menu 550, is a consolidation/refinance/rehabilitation tracking screen 560 that provides an on-screen report showing the progress a debtor has made in complying with the available consolidation, refinancing, or rehabilitation programs. All of these programs are methods that a debtor can exercise to pay a debt by making a prescribed down payment and qualifying monthly payments. For example, to qualify for loan consolidation, a minimum debt can be set at $4,500 or greater, a minimum down payment set at $450, and six monthly payments of at least $545 could be arranged through this screen 560.

A portfolio manager critique screen 562 can also be run from the main menu 550, so that critiques by the portfolio manager of a particular collector or account can be entered into the system.

D. Display

1. The Bin Display Screen

FIG. 5 is a screen capture of a bin display screen that illustrates one aspect of the invention. As indicated, a series of graphical indicia of "bins" 430a–430p are diagrammed on the bin display screen 425. Each bin has a corresponding title that represents the category of the bin. For example, the "Hot Accounts" bin 430a shows that there are three debtors currently associated with the category of Hot Accounts.

Each "bin" thus represents a vessel or receptacle for commonly storing items, specifically debtor accounts, associated with a particular category. The bins could thus alternately be referred to as drawers, boxes, containers, shelves, binders, cells, or any of a number of other physical analogs to an information storage vessel for a particular category of items. As previously noted, the graphical display for the bins can be simple bars, as shown in the illustrated embodiment of FIG. 5, or can alternately be replaced by any suitable icon, such as other forms of graphs, charts, geometric shapes, icons of containers of any sort, etc.

The illustrated "bin" system is designed to mimic a physical desk set wherein a collector would place a physical file within a particular bin or shelf based upon its status. The shelves would then be labeled with the appropriate status. The intuitive setup of the desk bin screen thus allows the collector to select an account from a particular bin to work upon. While most bins are filled or emptied based upon automatic reaction to events, such as receipt of a letter, sending of a letter, contacts, and any of a number of menu choices made by a collector while making a contact (these menu choices are typically made from the Main Screen), certain bins also enable the collector to manually place or remove accounts. In the illustrated embodiment, the Hot Accounts bin is both automatic and also allows manual placement, and the Assets Investigations/Skiptrace is filled only with accounts that the collector decides to place in it. Like the Hot Accounts bin, the Saturday Work bin is also filled and emptied partially automatically and partially manually by the collector.

The automated movement of accounts from bin to bin, based upon menu selections or other events, thus provides the organization to ensure appropriate action by the collector. On the other hand, the collector has full flexibility to select accounts from any bin he or she chooses, and has further flexibility to select accounts to place in certain bins, such as the Hot Accounts bin, the Assets Investigations/Skiptrace bin, and the Saturday Work bin. The collector's productivity is thereby driven by his own preferences as to sequence of working accounts, as fully and clearly informed by automated categorization and visual representation by the desk bins.

A description of each bin category is provided in Table 1 below.

TABLE 1

Descriptions of Bin Categories

| BIN CATEGORY | DESCRIPTION |
| --- | --- |
| Hot Accounts | Debtor accounts are associated with this bin when the collector believes that they need to be acted upon very quickly. In the illustrated embodiment, accounts are added to this bin category manually by the collector, and represent "copies" of accounts also found in other bins. Accounts also automatically move into and out of this bin based upon selected events. |
| Asset Investigation/Skip Trace | A collector will associate a debtor with this bin category when a skip trace or asset investigation is undertaken on the debtor. This bin lists all debtors whose assets are being investigated or who are currently being run with a skip trace. Accounts are added manually to this bin category by the collector. |
| 2-Day Follow Up | This bin category is associated with debtors whose accounts need to be acted upon in two days from the current date. Accounts are added to this bin automatically after an initial contact with a debtor, for example, |
| Promise to Pay/Borrow | This bin category is automatically associated with debtors who have made a promise to pay their debt, or borrow funds that enable them to pay the debt. |
| Today's Work | This bin category is automatically associated with debtors whose accounts need to be worked on the current date, based upon scheduling by Fileback and Scatter Back functions (see FIGS. 28 and 29). This bin also includes subbins. |
| New Business | This bin category is automatically associated with debtors who are initially placed within the debt collection system. Normally the debtors associated with this bin have never been contacted. |
| Left Message to Call (LMTC) | This bin category includes debtors that have been left a message by the collector, and movement into this bin is automated after the collector indicates such a message has been left. |
| Subsequent Follow Up | A debtor is automatically associated with this bin to indicate that a subsequent follow up needs to be made. |
| Del. Billing Expiring Temp Plan | This bin category automatically includes debtor accounts that were set up on a monthly payment plan, but have become delinquent. This bin category also includes debtor accounts that were set up on a temporary plan, but the plan is expiring. |
| Cons Refine Rehab | This bin category includes holding all accounts that receive some activity in the consolidation, refinance or rehabilitation processes. |
| Delay in Collection | Debtor accounts are associated with this bin when collection activity is being temporarily delayed due to a debtor's dispute over loan obligation or balance, or due to debtor's unconfirmed claim(s) of disability, bankruptcy, etc. |
| Saturday Work | A debtor is associated with this bin when a collector is unable to contact them during the normal week, so that they should be contacted on a Saturday. This bin movement can be automated, based upon several failed contact attempts during business hours, or manual. |

TABLE 1-continued

Descriptions of Bin Categories

| BIN CATEGORY | DESCRIPTION |
| --- | --- |
| Co-debtor Follow Up | A debtor is associated with this bin to indicate that a co-debtor exists on the account that should be contacted to arrange payment of the debt. |
| Never Contacted | A debtor is associated with this bin when they have never been contacted by the collector. This bin resides in a Central Files category to which collectors can file accounts for rescheduling. |
| Contacted | A debtor is associated with this bin when they have been contacted by the collector. This bin resides in a Central Files category to which collectors can file accounts for rescheduling. |
| AWG Lien Litigation | A debtor is associated with this bin when their account is being reviewed for an administrative wage garnishment, lien or litigation |

As shown in FIG. 5, the bin display screen 425 provides a tremendous amount of information quickly and easily to a collector. Each debtor account is associated with a particular category that best describes the account's current status. Thus, the collector knows at a glance how many accounts are within each category. As noted, this arrangement mimics a classical set of bins on a desk wherein each bin includes a series of individual files.

The collector has the ability to move files between bins, or to schedule movements between the bins for future dates and times. In addition, the scheduler module 150 can automatically move accounts between bins in response to certain conditions being met. For example, if a debtor's account is associated with the 2-Day Follow-Up bin 430c, but no action is taken within ten days, the scheduler module 150 will automatically associate the debtor's account with the subsequent Follow-Up bin 430h. Thus, the next time the collector reviews the bin display screen 425, an additional account will appear in the subsequent Follow-Up bin 430h.

The Never Contacted bin 430n and Contacted bin 430o are used as "central storage" bins to hold accounts that are not currently being worked on by the collector. Thus, the system moves debtor accounts from these central storage bins to the Today's Work bin 430e at regular intervals so that the collector is notified that it is time to contact these accounts. Two methods, Fileback and Scatter Back, for moving accounts to and from the central storage bins are discussed below in relation to FIGS. 28 and 29.

As can also be seen upon reference to the bin display screen 425, each graphical representation of a bin includes shaded areas corresponding to whether the account is "Very good" or "Average" or "Poor." These rankings relate to the collectability of the debt from the debtor and are normally made when the debtor's account is first entered into the debt collection system. This type of review can be performed prior to adding the debtor's name into the debt collection system, or at any time after the debtor has been added to the system. The collectability ranking gives the collector a priority scheme for collecting from the debtors. Typically, the collector will first attempt to collect money from the debtors with "Very Good" collectability rankings, since they have the most financial resources.

Since the bin display screen 425 displays not only categories, but also rankings for each debtor, the collector is provided with a very powerfull and flexible tool for collecting on debts. The collector can review the colored/shaded areas of each graphical representation of a bin to determine how many of the debtor accounts within the bin are ranked as Very Good, Average, or Poor in regards to their collectability.

Within each colored/shaded area is a number indicating the number of debtor accounts within each ranking of Very Good, Average or Poor. Thus, by quickly reviewing each graphical representation of a bin, the collector can determine how many total debtor accounts are within the bin, as well as how many of those accounts have high collectability rankings. The mechanism for producing the colored areas representing the collectability of the debt, and the numbers are displayed within each graphical representation of a bin is discussed more thoroughly in the following figures.

2. Generating the Bin Display Screen

Figure 6:
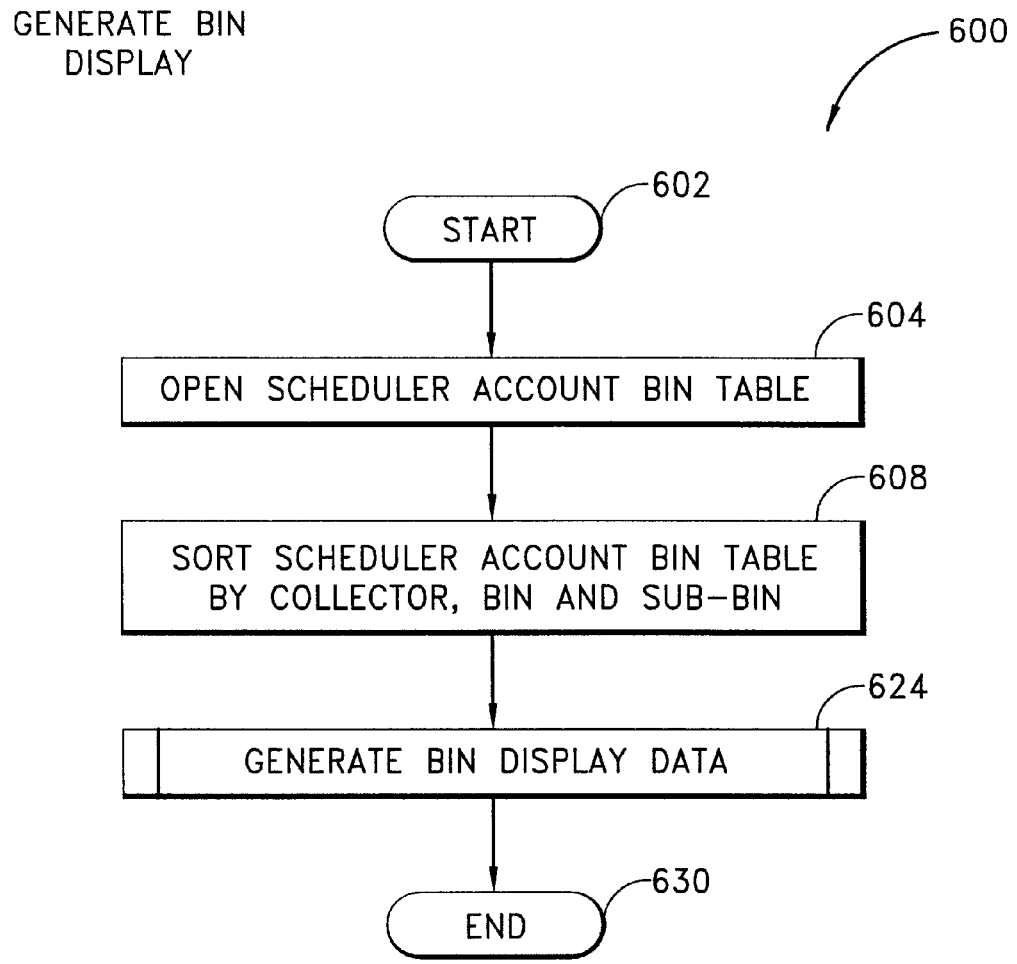
FIG. 6 is a flow diagram illustrating a process for updating the bin display illustrated in FIG. 5.

Referring to FIG. 6, a process 600 of generating data to be displayed on the collector's bin display screen is illustrated. The process 600 begins at a start state 602 and then moves to a state 604 wherein the scheduler account bin table 200 (FIG. 3) is opened. Once the account bin table 200 has been opened, the process 600 moves to a state 608 wherein the records in the table are sorted according to the collector, bin and sub-bin.

The process 600 then moves to a state 624 when data sorted at the state 604 is used to display representations of bins to collector's screen. The process 600 then terminates at an end state 630.

Figure 7:
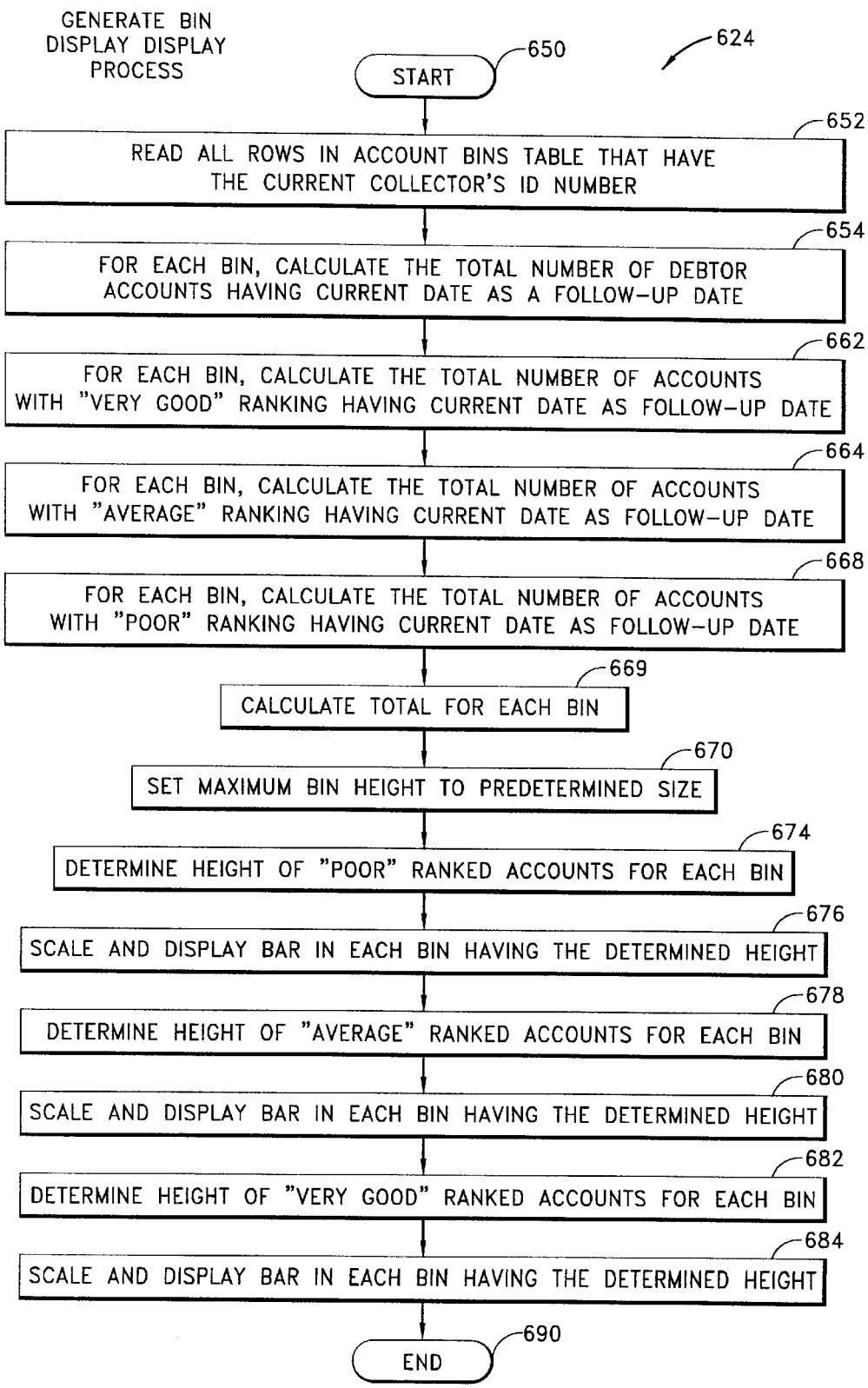
FIG. 7 is a flow diagram illustrating the GENERATE BIN DISPLAY data process of FIG. 6.

FIG. 7 is a flow diagram illustrating the generate bin display data process 624 of FIG. 6. Normally, this process would be run as part of the bin display system 170 (FIG. 1) that runs on the collector computer 114. The process 624 is used to generate the actual graphical representation of bins shown in FIG. 5.

The process 624 begins at a start state 650 and then moves to a state 652 wherein all of the rows in the account bin table that have the current collector's ID number are read into a memory. The process 624 then moves to a state 654 wherein, for each bin, the total number of debtor accounts having the current date as a follow-up data are calculated. This allows the system to only display accounts that have an action due on the current date, and ignore accounts that don't have anything due on the current date. The process then moves to state 662 wherein the total number of the collector's accounts having a "Very Good" ranking, and a wherein the current date is the follow-up date, is calculated.

The process 624 then moves to a state 664 wherein for each bin, the total number of accounts with an "Average" ranking, and wherein the current date is the follow-up date, are calculated. The process 624 then moves to a state 668 wherein for each bin, the total number of accounts with a "Poor" ranking, and the current date is the follow-up date is calculated.

The process 624 then moves to a state 669 wherein a total count of debtor accounts in each bin is determined. Thus, at this stage a calculation has been made for the collector of the total number of debtor's accounts within each bin and the ranking of the debtor's accounts within each bin.

The process 624 then moves to a state 670 wherein the maximum height of the bin is set to a predetermined size. The predetermined size is based on the size of bins to be displayed on each collector's display screen. The process 624 then moves to a state 674 wherein the size of the bar representing the "Poor" ranked accounts in each bin is determined. The height of this bar is determined by scaling the number of poor-ranked accounts in the overall total number of accounts in the particular bin to the maximum height. Thus, if the bin has 100 accounts, of which 50 are ranked poor, the height of the bar will equal approximately one-half the total height of the bar to be displayed within the chosen rectangular bin.

However, in one embodiment, the height of the bar representing the "Poor" ranked accounts does not go below the predetermined minimum size, unless there are no accounts associated with this ranking. The minimum size is calculated to be at least the height of the font that displays the number of "Poor" ranked debtors within the bar. Thus, the numeral representing the number of poor accounts will always be displayed on top of the colored bar representing the poor accounts.

Once the height of the bar representing the "poor" ranked accounts has been calculated for each bin in the bin display, the actual graphical bar is generated by a display driver/generator and displayed on the collector's screen within each of the bins at a state 676.

The process 624 then moves to a state 678 wherein the height of the bars representing the "Average" ranked accounts for each bin are determined. Similar to the mechanism used to determine the height of the "Poor" ranked accounts, the height of the bars representing the "Average" ranked accounts are also determined at a state 680 by scaling the number of "Average" accounts within the total number of accounts to the maximum bin size in a particular bin. The process 624 then generates and displays the "Average" ranked bar above the "Poor" ranked bar within each bin.

The process 624 then moves to a state 682 wherein the height of the "Very Good" ranked accounts are determined in a manner similar to that described above. The process 624 then moves to a state 684 wherein the "Very Good" bar for each bin is scaled and displayed within each bin directly above the "Average" ranked bar. In this manner, each of the bars corresponding to the Poor, Average and Very good ranked accounts are generated, one on top of the other, in order to produce the bin display illustrated in FIG. 5. The process then sorts the debtor account bin according to the bin number, ranking, follow-up date and other parameters in chronological order. The processes then ends at an end state 690.

Thus, in summary, the bin display illustrated in FIG. 5 is generated by accessing an account bin table stored on the main server that holds data corresponding to the total number of accounts within each bin and sorted by DID number. When a collector logs into the system, this accounts bin is accessed and the number of accounts assigned to that collector within each bin is calculated. As described above, the accounts are divided into the three rankings of very good, average and poor. Instructions stored on the collector's computer then access the accounts bin table and generate the bar chart illustrating the total number of accounts within each bin, and the corresponding ranking for each account in the various bins.

Of course it should be understood that while the above display is illustrated with rectangular bars that provide the graphical indicia of a bin, other types of representations are contemplated. For example, a graphical indicia in the shape of a desk bin, a pie chart, a square, a circle or any other graphical indicia that illustrates both the number and rankings of accounts within each bin are within the scope of the present invention. Moreover, while the implementation discussed above relates to fixed-height bins it should be understood that bins of individual varying heights are contemplated. For example, one bin, or set of bins might be set to a varying maximum height depending on the number of records associated with the bin.

3. Listing Accounts in a Bin

Referring now to FIG. 8, a screen capture 700 of the hot accounts bin 430a is illustrated. This screen appears once a collector presses a function key that causes a list of each debtor account within the Hot Accounts bin 430a to be displayed. As indicated, this list of debtor accounts provides a simple and quick mechanism for listing and accessing each debtor account.

It should be realized that the order in which each debtor's account appears on the list can be programmed to show the most urgent account at the top, and continuing with less urgent accounts as the collector moves down the list. Of course, the order of accounts listed in the various bins can differ so that, for example, in one bin the debtor accounts are listed in date due order, while in another bin the debtor accounts are listed by the date since the last contact. In any case, the collector can advantageously access the accounts in any order he or she chooses by selecting the listed number, based upon the listed information.

4. The Main Screen

FIG. 9 is an illustration of a Main Screen 450 that includes fields listing specific information about the debtor. Conventional debtor information, such as the name, spouse name, addresses, telephone number and debt balance are all listed on the main screen 450. However, there are several features of the main screen 450 that provide particular efficiency and/or flexibility advantages for the collector.

a. Telephone Number Field

For example, the home telephone number field 750 not only lists the home telephone number, but also lists the number of attempts to that number (ATT) and the number of messages left at that telephone number (LMTC). Thus, the single home telephone number field includes a plurality of information, thus providing the collector with useful data on the number of attempts and messages left with the debtor at this particular telephone number.

The information on number of attempts to the telephone number, and number of messages left with the debtor at that telephone number are automatically generated through the dialer system within the dialer server 164 (FIG. 1). Every time that an attempt is made to contact the debtor at, for example, the home telephone number, a telephone call event is generated by the debt collection system. This event is handled as described below to update the number of telephone call attempts to the home telephone number. Similarly, every time a message is left at that phone number, a LMTC event is generated that updates the LMTC code by 1.

The telephone number field is actually a compilation field that includes data from several sources. The telephone number is stored in the field as standard data. However, the ATT and LMTC data is added to the field through the use of events that cause these numbers to change in response to actions by the collector. ATT attempts may also be documented by the system automatically if the background dialer makes the attempt.

b. Maneuvering in the Main Screen

The main screen 450 includes an input field 754 that accepts numeric input corresponding to the field code numbers displayed on the main screen. For example, if the collector wants to change an address, the number 7, corresponding to an address field 760 is entered into the input field 754, illustrated in the lower left hand corner of the screen After the collector presses the Enter key, instructions are run that allow the collector to change the address information on debtor.

Because the field code numbers are displayed on the main screen, it is not necessary for the collector to memorize any numbers, or use a mouse to move to the desired field. Entering the field code number in the input field 754 results in the proper instructions being run to modify the chosen field. For example, if the field code 7 is entered, a pop-up menu is displayed that allows the user to choose whether to add, delete or modify address information. In another embodiment, the focus of the cursor is brought to the address field 760 so that the information can be directly entered into this field.

c. The Address Field

The main screen 450 includes the address field 760 that lists each of the known addresses for the debtor. These addresses are derived from the address table 122 (FIG. 2). Any number of addresses can be entered and displayed within the address field 760, which becomes a multiple value field which can be opened to view more than two addresses.

It should be noted that the first address 762 is in a normal font and can be easily read by the collector. However, as illustrated in this example, the second address 764 is in a "strikethrough" font that indicates that this address is no longer correct for the debtor.

The debt collection system described herein allows "bad" addresses to remain, however in a strikethrough font. This allows the collector to continue attempting contact with the debtor at a bad address just in case the debtor has returned to a previously listed location. Moreover, the use of a strikethrough font to list bad addresses advantageously keeps the collector apprised of confirmed bad information, such that the collector does not re-enter this information if again given the old address from a new source. The collector can change an address or telephone number from good to bad, or bad to good, by selecting the address field 760 from the main screen 450. An option is then offered to the collector to change the type of address stored within the address field 760. In addition, an address that is found to be either good or bad by the skip trace process can be automatically updated to show a normal or strikethrough font.

If the collector chooses to mark an address, telephone number, or many other data types within the system as "bad", the system converts the current font displayed to the user from a normal font to a strikethrough font. If the collector chooses to mark a bad address as now being good, the system converts the strikethrough font to a normal font. Similar stricken-through old information can be listed in phone fields, lead fields, etc.

d. The Scrolling Windows

The main screen 450 also has a set of three scrolling windows 780a, 780b and 780c that can store information on leads, references and co-debtors. Although only three windows are displayed at any time, more than three leads can be stored within this system of windows. For example, five separate leads could be stored within the field 780. Although only three leads are displayed, the collector can press the right or left arrow keys on the keyboard to display the additional leads not shown on the screen. In this manner, the collector can "scroll" left and right through a series of leads while still displaying the debtor's information on the screen. This scrolling concept can also be applied to the bins display, as further discussed with respect to the FIG. 30.

As indicated, the screen is divided into an upper section 752a and a lower section 752b. While the upper section 752a includes the name, telephone number, address and lead information for a debtor, the lower section 752b can be changed to display a series of different data to the collector. For example, in FIG. 9, the lower portion 752b of the main screen 450 includes the full transaction history list 785. The full transaction history list 785 is a line-by-line listing of every action taken on the debtor's account. Thus, every telephone call, letter, contact or other action is recorded by date and time in the transaction history list 785.

e. The Instant Retrieval Buttons

On the lower portion 752b of the main screen 450 is also a series of instant retrieval buttons 790a to 790j. The instant retrieval buttons 790 list the names of the last ten debtor accounts that have been viewed by the collector. In order to provide almost instantaneous access to these previous accounts, the debt collection system stores the entire debtor account information for the previous ten accounts in the RAM of the collector's computer.

For example, pressing the button 790*a* provides immediate access to John Smith's main screen, while pressing button 790*b* will give immediate access to the main screen for Jane Doe. Thus, the collector can maintain a series of ten debtors stored in memory for instant viewing. This allows the collector to rapidly switch between the most current debtors that have been contacted, without waiting for information to transfer from the server.

In order to activate any of the buttons 790*a* to 790*j*, the collector types the number 19 into the command box 754. This results in the first box 790*a* receiving the focus of the cursor. By depressing the right and left arrow keys, the collector can scroll from one box to the next. Once the appropriate box has been highlighted, the collector presses the enter key to instantly switch to the selected debtor's main screen.

E. Menus

Figure 10:
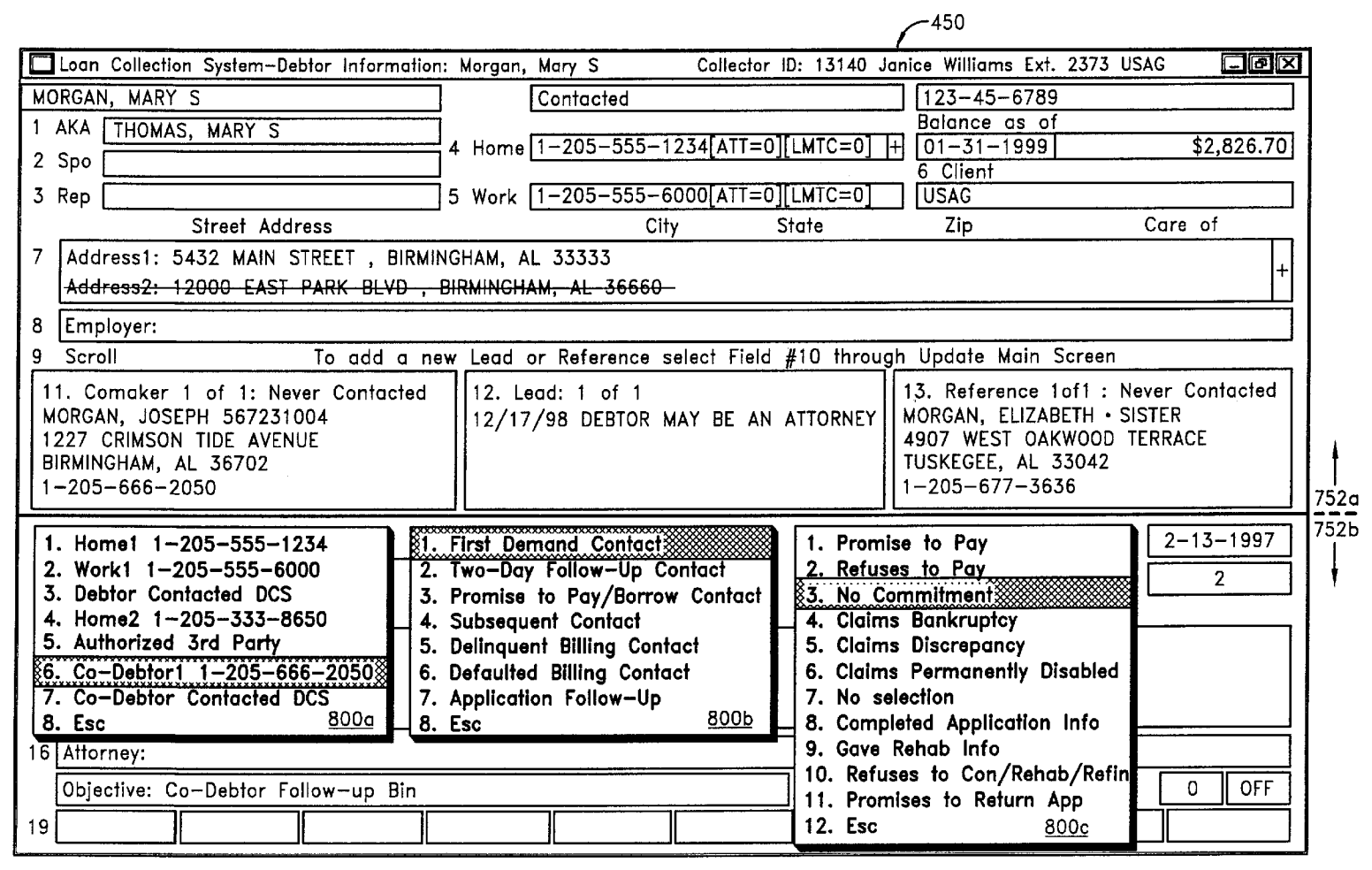

Referring to FIG. 10, a screen capture of a main screen 450 is shown with a series of tiered menus 800*a*, 800*b* and 800*c* over the lower portion 752*b* of the main screen 450. The menu screens 800*a*–800*c* illustrate the mechanism that the collector uses to generate events that log information and record contacts in the debt collection system.

The menu system illustrated in FIG. 10 allows a collector to record a contact with the debtor by making simple menu choices through a menu tree. As can be seen in the menu box 800*a*, the telephone numbers of the debtor and co-debtors are listed for easy selection. By pressing the right arrow key after highlighting the appropriate telephone number called, the second menu box 800*b* appears, which lists types of contacts appropriate for the telephone number chosen in menu box 800*a*.

For example, if a co-debtor telephone number was selected in the menu box 800*a*, a series of co-debtor type contacts are listed in the menu box 800*b*. In a similar manner, once the collector chooses the appropriate type of contact in the menu box 800*b*, a third menu box 800*c* appears, offering the collector a series of options for recording the type of contact made with the debtor. Through the use of these menus, the collector does not need to memorize codes or refer to a printed list of options. Each option available for the particular type of contact made is listed within the menu tree, while the collector continues to view information pertinent to the contact in the upper portion 752*a* of the Main Screen 450.

As can be seen upon reference to FIG. 11, if the collector selects contact to the home telephone number in the menu box 800*a*, the series of options in the menu box 800*b* is altered to provide options related to a home telephone number. For example, option 2 allows the collector to chose that an answering machine picked up the telephone, but no message was left. If the left message to call (LMTC) option is chosen in the menu box 800*b*, the third menu box 800*c* appears giving the collector a choice of answering machines or individuals with whom the message was left. For example, if a family member took the message from the collector, option 4 would be chosen which corresponds to "family member."

Figure 12:
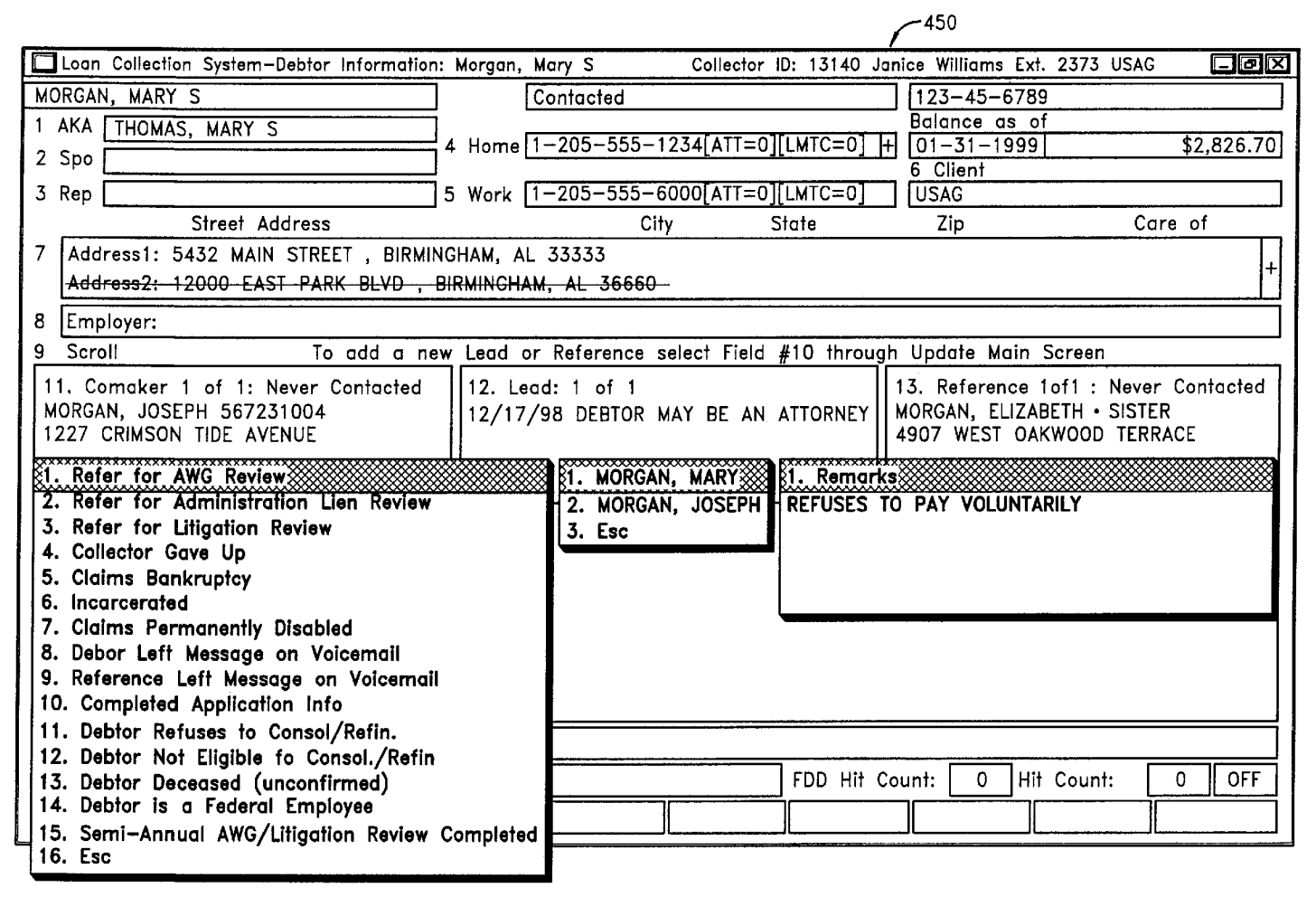
Figure 13:
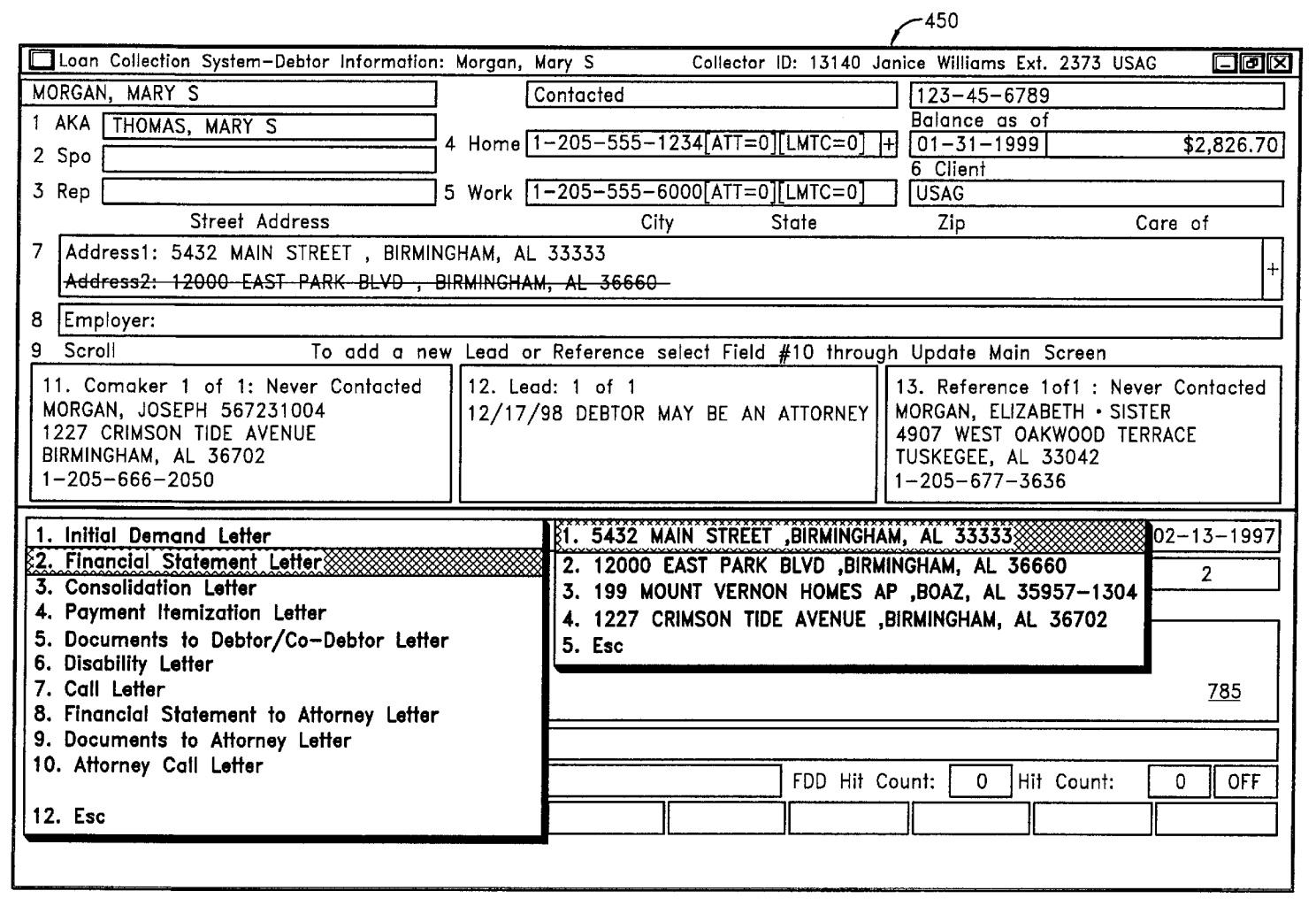

FIGS. 12–13 list other types of menu trees available to the collector within the system of the present invention. As can be seen, the system provides tremendous flexibility for allowing the collector to chose options without having to memorize codes, or refer to other lists of potential options to enter into the system. The menu tree structure of the debt collection system provides the flexibility and lists available for virtually every type of entry required to be made by the collector in collecting the debt. This is a tremendous advantage over systems requiring the collector to enter numerous codes or other texts in order to track the debtor.

Figure 14:
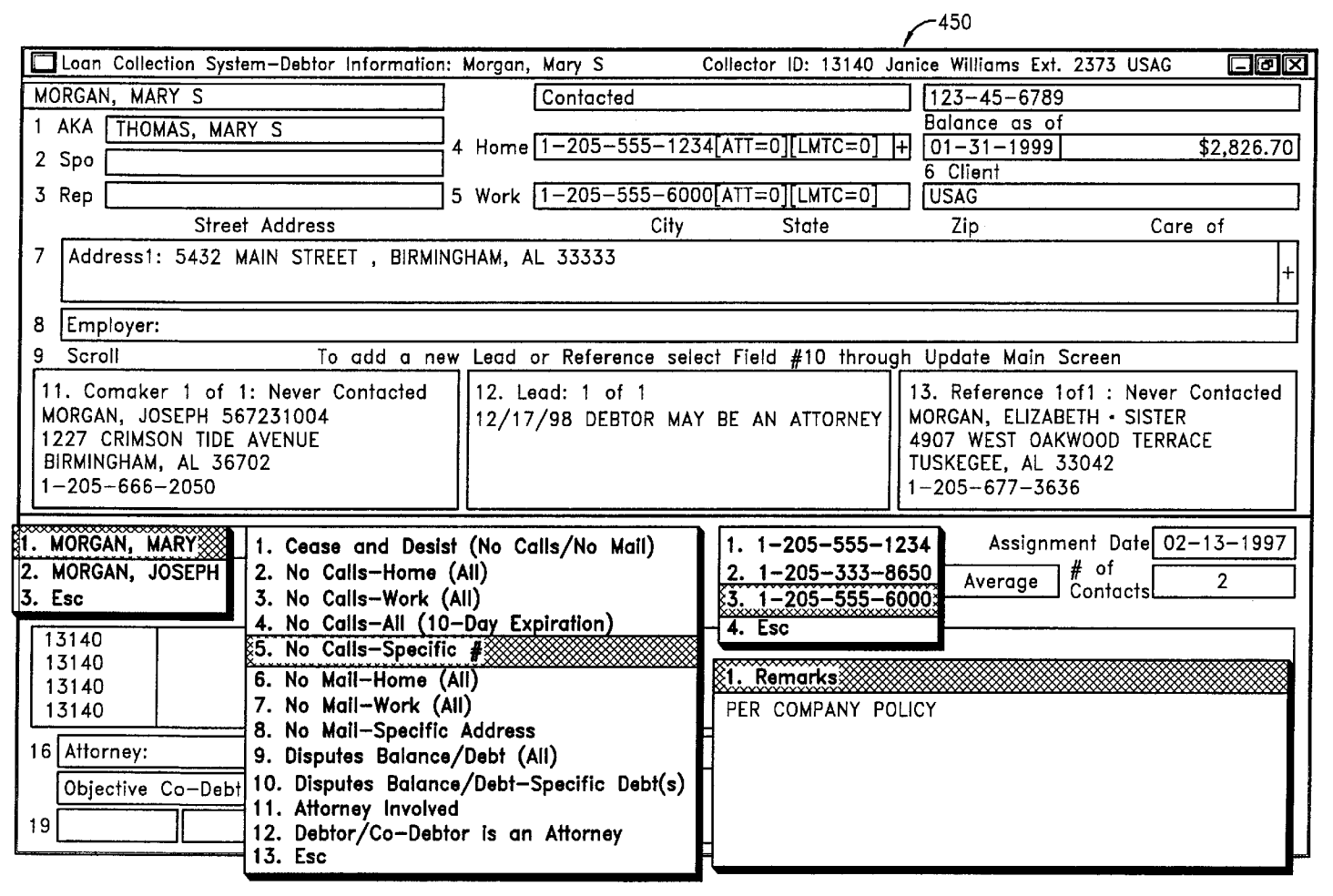

FIG. 14 illustrates a menu choice that allows the collector to mark that no calls are to be received at a particular telephone number. If this choice is made, automated instructions change the background color of the selected telephone number to red, in order to indicate that the debtor should not be contacted at that telephone number. In addition, the dialer system is prevented from automatically attempting to contact the debtor if the telephone number is marked a "no calls". That is, speed dial, autodialers and power dialers are disabled for that phone number.

FIGS. 15 and 16 illustrate a menu driven mechanism for generating reports from a debtor's account. For example, as illustrated in FIG. 15, if a collector desires to create a report based on a particular phone number, a menu choice is presented that allows the collector to choose "phone number." By depressing the right arrow key, the collector is presented with an entry screen for inputting the debtor's telephone number. This information is then used to create a report of debtor's having that phone number. A report showing all of the accounts with the entered phone number is then displayed within the appropriate telephone field on the main screen 450.

Figure 17:
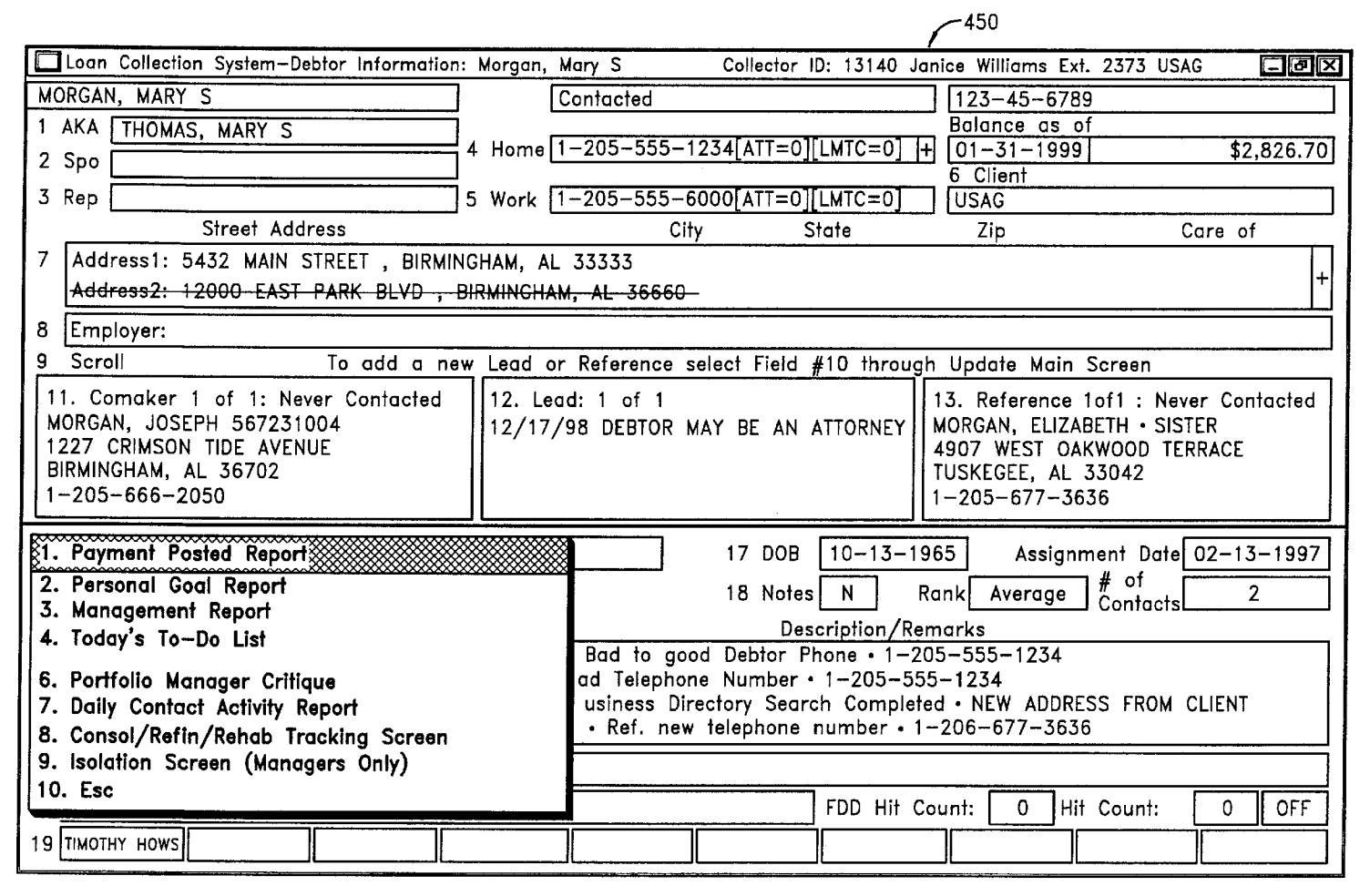

In a similar manner, FIG. 16 displays a method of creating a report based on the name or address of a lead or reference by entering data within a menu. The data entered is thereafter used to create a report for the collector. FIG. 17 illustrates a menu that the collector can access from the main screen 450 for generating other types of reports. As with the remainder of the menus on the main screen, this menu can be accessed by pressing a function key on the keyboard, preferably indicated on a keyboard template provided to the collector. As shown, a variety of reports are available generated in specific formats from the master database 118 (FIG. 2) for the collector's assigned accounts.

FIG. 18 illustrates the use of menus 900*a* and 900*b* by a collector to manually associate a debtor's account with various bins illustrated in the bin display (FIG. 5). As shown, the menu screen 900*a* includes several options for associating the debtors account with various bins. For example, a "copy" of the debtor's account can be added or removed to a "Hot Accounts" bin 430*a* (FIG. 5).

In the illustrated embodiment, the debtor's account can also be added or copied to the Asset Investigation/Skip trace bin in order to perform these functions on the debtor's account. Other options include, adding and removing the debtor's account from the Saturday Work bin 430*l*. If the collector chooses to add the debtor's account to the Hot Accounts bin 430*a* (FIG. 5), a second menu box 900*b* opens and requests entry of the date that the account should be added to the Hot Accounts bin, and the time that an alarm should sound to notify the collector of a particular due date. Again, it should be noted that the association of debtors accounts with particular bins can be altered by making simple menu choices within the debt collection system. This provides the collector with flexibility in organizing accounts to contact for collection.

1. The Split Screen

Aside from active menus, the split screen can also be utilized to display additional account information. FIGS.

19–21 illustrate several embodiments of the split screen system used within the main screen 450.

For example, in FIG. 19, the lower portion 452b provides a scrolling list of every transaction made on the debtor's account. In addition, a series of help boxes are presented along the lower edge of the window to assist the collector in performing specific functions related to the Transaction History display.

Referring to FIG. 20, the lower portion 452b of the main screen 450 includes specific information on the debt owing by the debtor. In addition, information on the client to whom the debt is owed is also listed.

Figure 21:
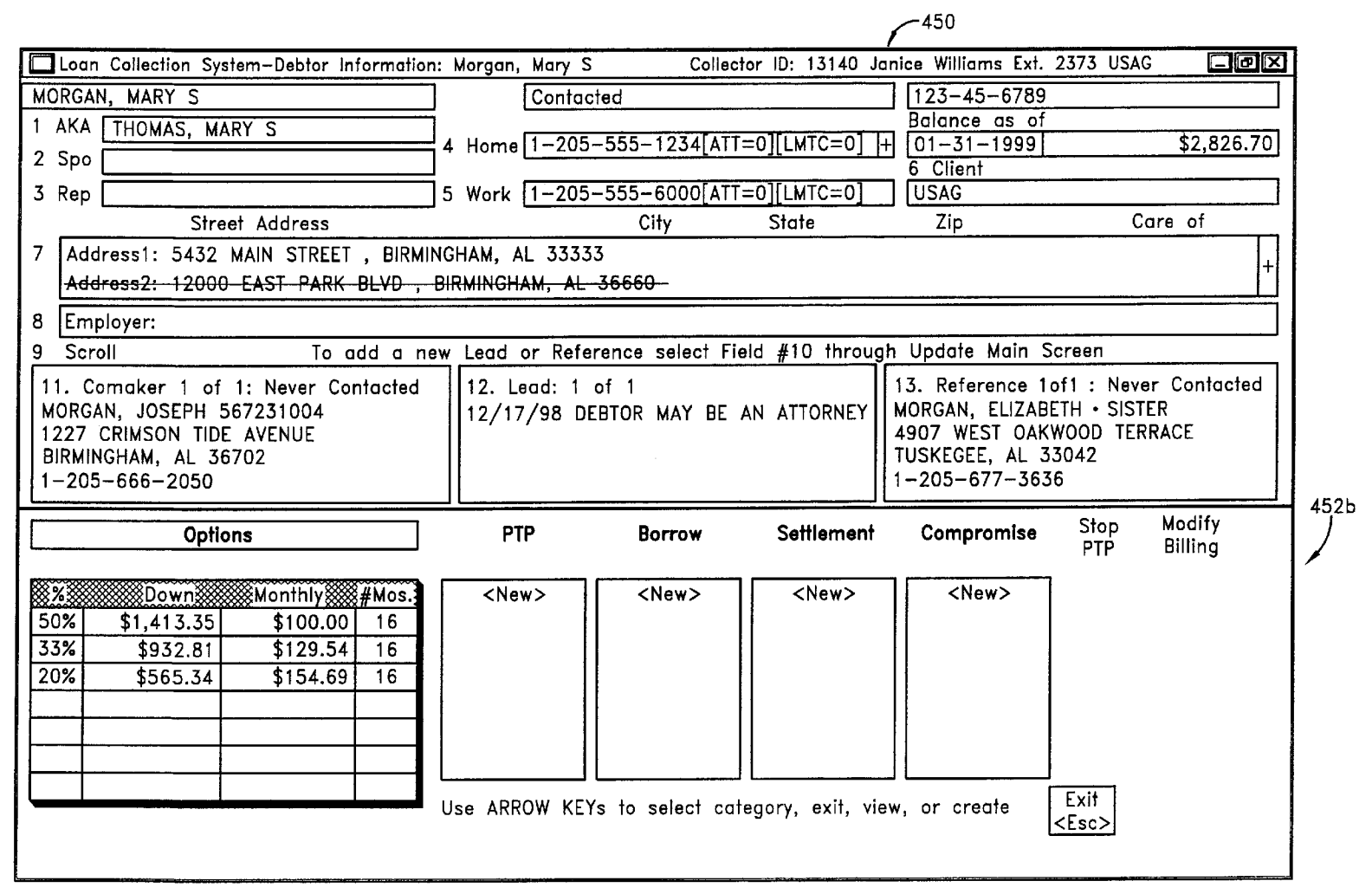

FIG. 21 illustrates a main screen 450 wherein the lower portion 452b lists default payment options that are available to the debtor. Further options can be entered directing into the system by the collector. Thus, the collector can negotiate the type of down payment and monthly payments and enter a promise to pay, borrow, settle or compromise, if reached, into the system.

IV. Method of Operation

The following figures describe a system and method for generating events that perform actions within the debt collection system. Throughout the system, events are generated either manually by the collector, or automatically by the scheduler 150 to perform an action.

A. Event Generation

Figure 22:
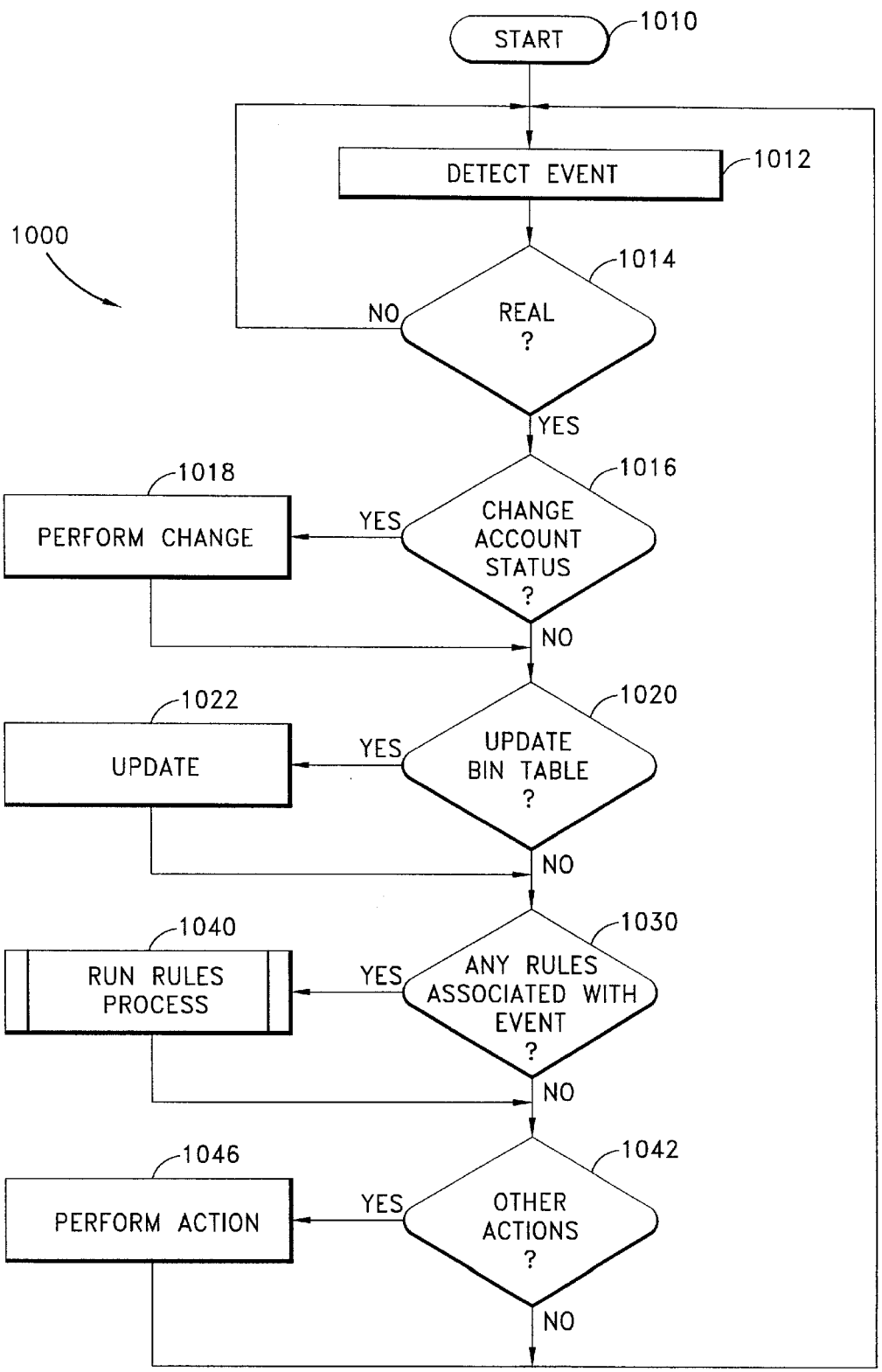
FIG. 22 is a flow diagram illustrating a process for detecting events within the preferred debt collection system and performing actions in response to those events.

Referring to FIG. 22, a process 1000 for detecting events and generating actions is described. The process 1000 begins at a start state 1010 and then moves to a state 1012 when an event is detected. As used herein, an event is a software module or flag that is activated either automatically by the scheduler (often following manual data input by the collector, other staff members or the media department) or manually from an action taken by the collector. The event causes other instructions to be run by the system.

If an event is detected at the state 1012, the process 1000 moves to a decision state 1014 to determine whether the event is real. A real event is one that was properly generated by the scheduler 150 or manually generated by the collector. If the event is not real, the process 1000 loops to the state 1012 until an event is generated.

However, if the event was real at the decision state 1014, the process moves to a decision state 1016 wherein a determination is made whether the event changes the status of the debtor's account. As used herein, the status of the debtor's account is the category of the account. For example, the status can be the following categories: contacted, never contacted, new business, administrative wage garnishment, legal, stipulation, judgement, in billing, suspended, canceled and paid in full. If a determination is made that the event should change the debtor's account status, the process 1000 moves to a state 1018 wherein a change in the account status of the debtor is performed. The process 1000 then moves to an additional decision state 1020 to determine whether the bin table 126 (FIG. 2) should be updated.

It should be noted, that if an account status change was not required at the decision state 1016, the process would move immediately to the decision state 1020. If a determination is made that the bin table does need to be updated at the decision state 1020, the process 1000 moves to a state 1022 wherein the bin table is updated. The process 1000 then moves to a decision state 1030 to determine whether there are any rules associated with the event that was detected. If the bin table did not need to be updated at the decision state 1020 then the process 1000 moves immediately to the decision state 1030 to determine whether any rules were associated with the detected event.

If any rules were associated with the detected event, the process 1000 moves to a process state 1040, wherein the RUN RULES PROCESS is implemented. This process is described more completely with respect to the following figures. Once the run rules process has been implemented at the process state 1040, the process 1000 moves to a decision state 1042 to determine whether any other actions need to be taken in response to the detected event. It should be noted that if no rules were associated with the detected event at the decision state 1030 the process 1000 moves immediately to the decision state 1042.

If a determination is made at the decision state 1042 that other actions need to be undertaken, the process 1000 moves to a state 1046, wherein other actions are performed. These other actions include recording the contact date, recording the number of attempts associated with a plan, or recording an LMTC code associated with a telephone call. Once the other action has been performed at the state 1046, the process loops to detecting events at the state 1012. In addition, if no other actions need to be taken at the decision state 1042, the process 1000 returns to the detect event state 1012.

Figure 23:
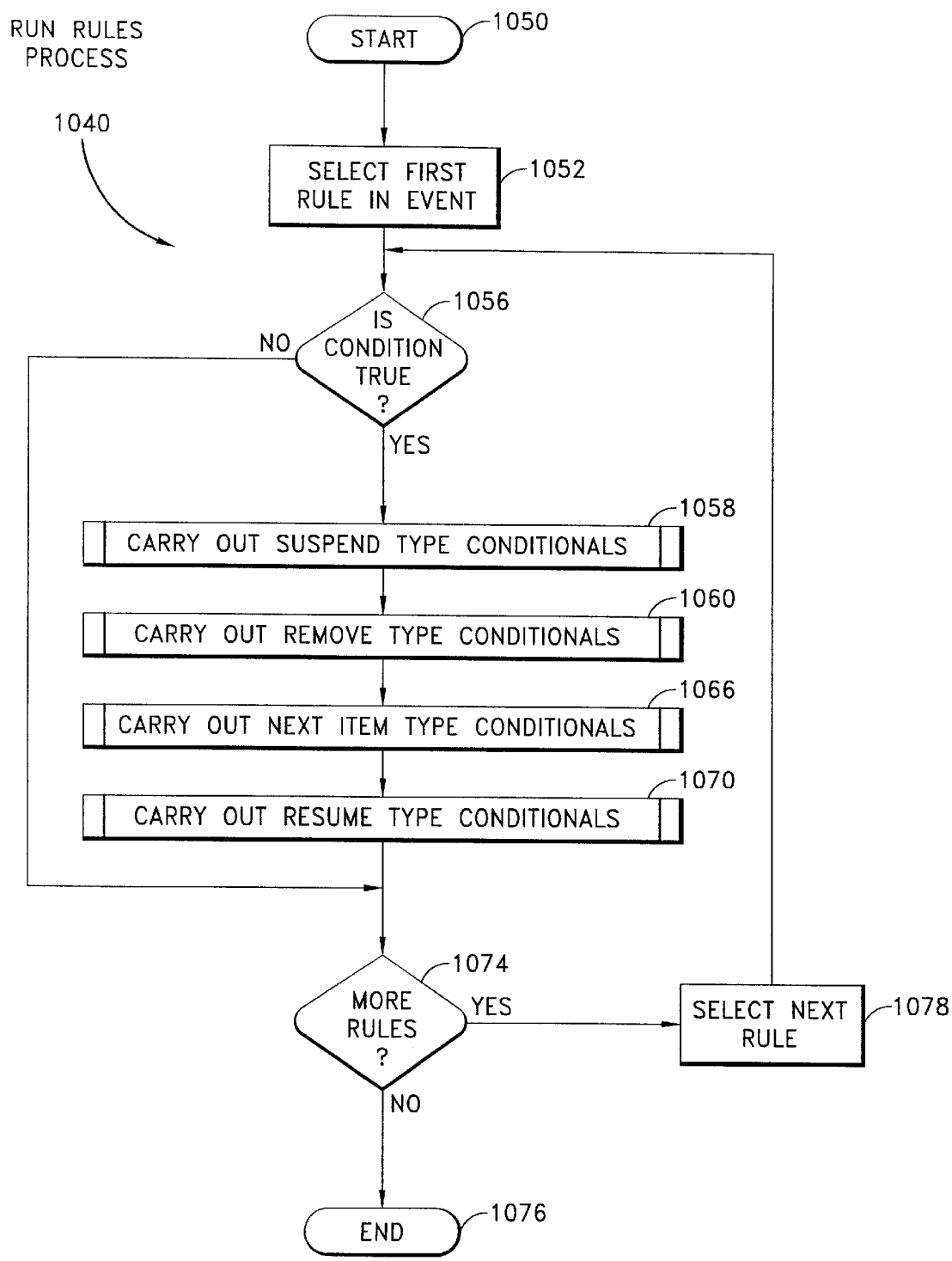
FIG. 23 is a flow diagram illustrating the run rules process of FIG. 22.

Referring now to FIG. 23, the RUN RULES PROCESS 1040 of FIG. 22 is described in more detail. The process 1040 begins at a start state 1050 and then moves to a state 1052 wherein the first rule stored within the event is selected. As described previously, events are software modules or flags that result in actions being performed within the system. In this case, some events contain rules that are run when the event is generated either manually by the collector or automatically by the scheduler 150 (FIGS. 1 & 3). Some events may have multiple rules in order to perform several actions simultaneously or sequentially.

Once the first rule has been selected, the process 1040 moves to a decision state 1056 to determine whether the condition within the rule has been satisfied. If the condition was true, the process 1040 moves to a process state 1058 in order to carry out the "suspend" type conditionals. The suspend type conditionals are used to place an account on hold pending the outcome of a particular situation. Examples of some situations that lead to suspend type conditionals are:

1) The debtor disputes the validity of the debt.
2) A congressional inquiry is solicited wherein a debtor calls a congressperson and the congressperson's staff calls the collector and requests suspension of the debt pending congressional review.
3) A client requests a suspension.
4) The collector finds a problem with the account.
5) The client (debt holder) warns of an impending withdrawal of the account from the collector.

The suspend type conditionals will be described more completely with regard to FIG. 24.

Once the suspend type conditionals have been carried out at the process state 1058 the process 1040 moves to a process state 1060 to carry out the "remove" type conditionals. These types of conditionals are used to permanently remove the association of an account and a bin category. Examples of situations that cause a remove type conditional event are:

1) The collector enters a contact and the account is in the new business bin. This account is then moved to the two-day follow-up bin by first removing it from the New Business Bin and then adding it to the 2-day follow-up bin.
2) The collector enters a contact and the account is in the delinquent billing bin. The account is then moved to the subsequent follow-up bin.

This process will be described more completely with reference to FIG. 25 below. After the remove type conditionals have been carried out, the process 1040 moves to process state 1066 wherein the "next item" type conditionals are carried out. The next item conditionals correspond to events that change the association between an account and a bin category. Examples of situations that lead to next item type conditionals are:

1) A collector's letter is requested.
2) A skip trace search is performed.
3) An account is associated with a bin category.
4) A follow-up telephone call is requested.
5) A debtor makes a promise to pay. The debtor's account is associated with the PTP bin and a confirmation letter is sent.

This process will be described more completely in reference to FIG. 26 below.

Once the next item type conditionals have been carried out, the process 1040 moves to a state 1070 wherein the "resume" type conditionals are carried out. A resume type conditional is used to resume the association of an account with a bin once a debtor has satisfied the condition that placed him on a suspended status. In one example of a resume type conditional, a debtor's account is suspended following a request by the debt-holder. If the debt-holder then requests the account to become active again, it will be resumed. In another example, the debtor disputes the balance owing and the collector resumes activity on the account once the validity of the debt is documented. The resume type conditionals process 1070 will be described more completely with regard to FIG. 27.

It should be noted that the progression through process states 1058, 1060, 1066, 1070 is preferably carried out in the order described in FIG. 23. Thus, it is preferable for the suspend type conditionals to be run prior to the remove type conditionals, which are preferably carried out prior to the next item type conditionals, which are in turn preferably carried out prior to the resume type conditionals.

Once the resume type conditionals have been carried out at the process state 1070 the process 1040 moves to the decision state 1074 to determine whether more rules exist within the detected event. If more rules do not exist, the process 1040 terminates at an end state 1076.

However, if more rules do exist, the process 1040 moves to a state 1078 wherein the next rule triggered by the event is selected and the process then returns to the decision state 1056 in order to determine whether the condition within the first rule is true. It should be noted that if a condition is not true at the decision state 1056 the process 1040 moves to the decision state 1074 to determine whether any more rules exist within the detected event.

Figure 24:
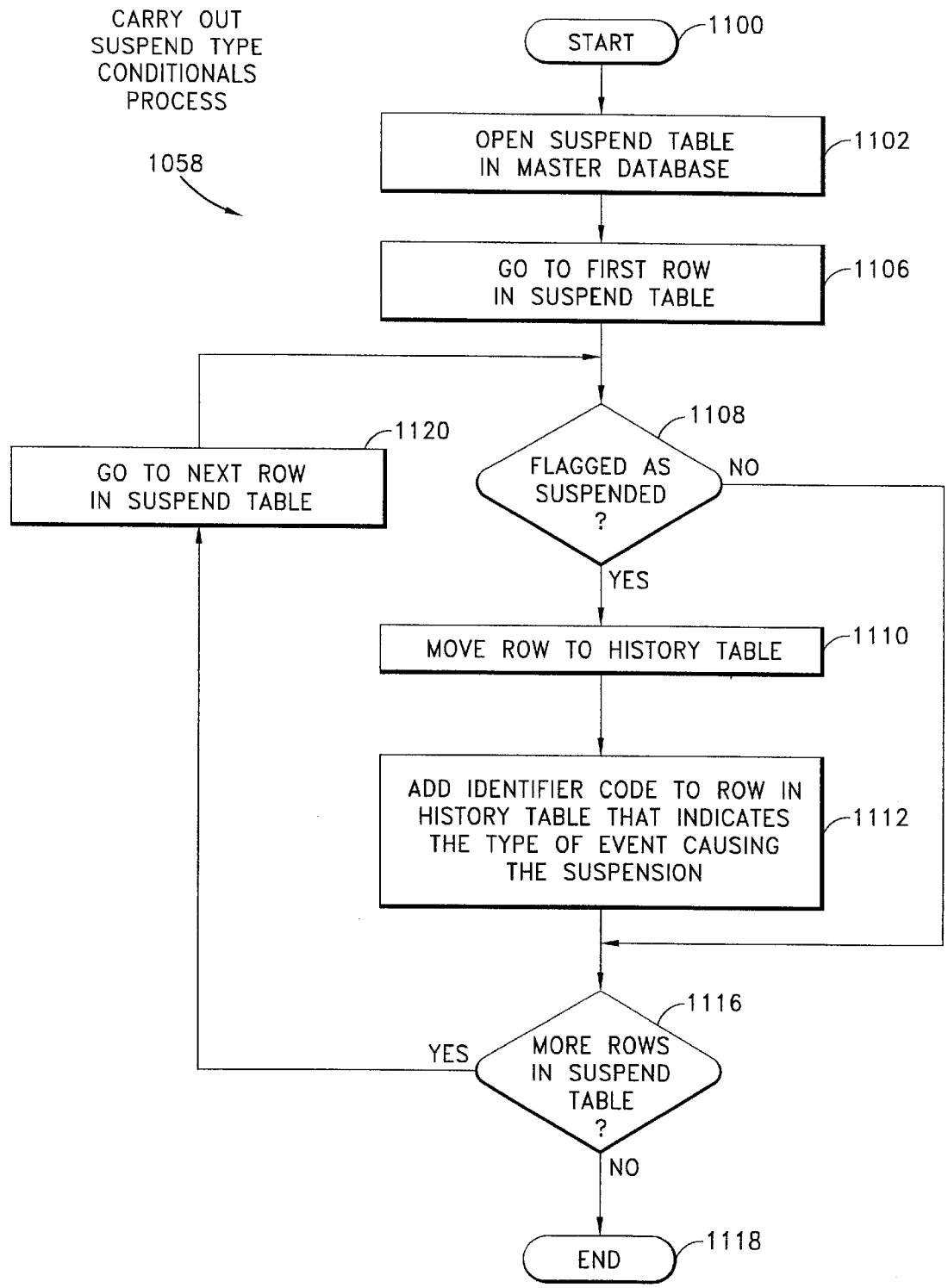
FIG. 24 is a flow diagram illustrating the carry out suspend-type conditionals process of FIG. 23.

Referring now to FIG. 24, the process 1058 of carrying out a suspend-type conditional is described. The process 1058 begins at a start state 1100 and moves to a state 1102, wherein the suspend table within the master data base is opened. The process 1058 then moves to the first row in the suspend table at a state 1106 and continues to a decision state 1108 to determine whether the current row is flagged as suspended.

If the record within the suspended table is marked as suspended, the process 1058 moves the information from the selected row to the history table 128 (FIG. 2) within the main database. The process 1058 then moves to a state 1112 and adds an identifier code to the row in the history table that indicates the type of event that caused the suspension. The process 1058 then moves to a decision state 1116 to determine whether more rows exist to be analyzed in the suspend table.

If no more rows are available in the suspend table, the process 1058 terminates at an end state 1118. However, if more rows do exist in the suspend table, the process 1058 moves to a state 1120 wherein a pointer is moved to the next row in the suspend table. The process then continues to determine whether the current row is flagged as suspended at the decision state 1108.

Figure 25:
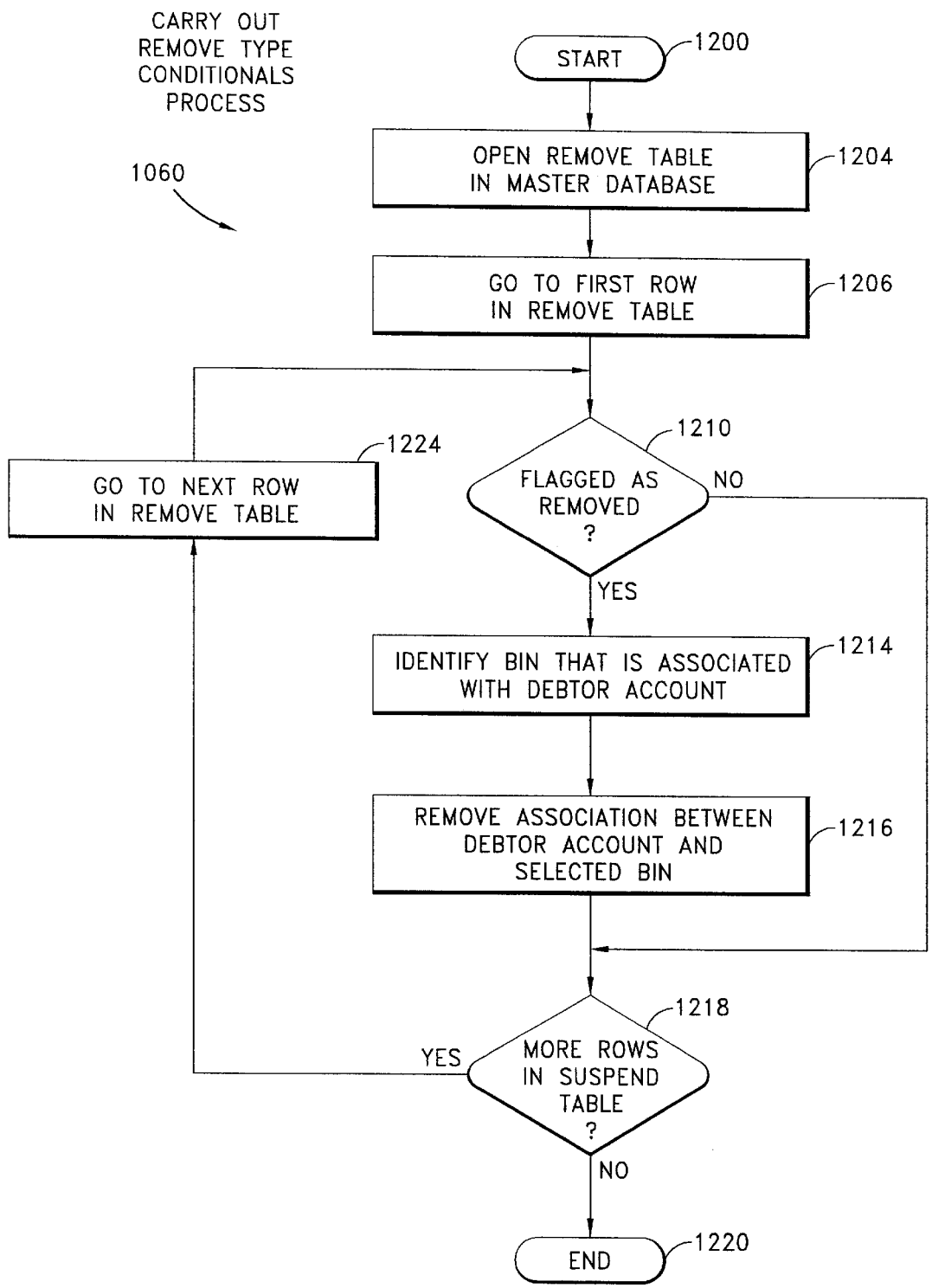
FIG. 25 is a flow diagram illustrating the carry out remove-type conditionals process of FIG. 23.

Referring now to FIG. 25, the process 1060 for carrying out a remove type conditional is described. The process 1060 is used to permanently remove an association between a debtor's account and a bin. The process 1060 begins at a start state 1200 and moves to a state 1204 wherein a remove table is opened in the master database. The remove table includes the debtor ID number, a remove flag and the number of the bin that is to be removed from the debtor's account. The process 1060 then moves to a state 1206 wherein a pointer is moved to the first row in the remove table. A determination is then made at a decision state 1210 whether the currently selected row in the remove table is flagged to be removed.

If the currently selected row is flagged to be removed, the process 1060 moves to a state 1214 wherein the association between the current debtor's account and the identified bin is removed from the bin table. Once the association is removed, the process 1060 moves to a decision state 1218, wherein a determination is made whether more rows exist to be analyzed in the remove table. If no more rows exist to be analyzed, the process 1060 terminates at an end state 1220.

However, if more rows do exist in the remove table, the process 1060 moves to a state 1224, wherein a pointer is moved to the next row within the remove table. The process 1060 then continues at the decision state 1210 to determine whether the currently selected row is flagged to be removed.

Figure 26:
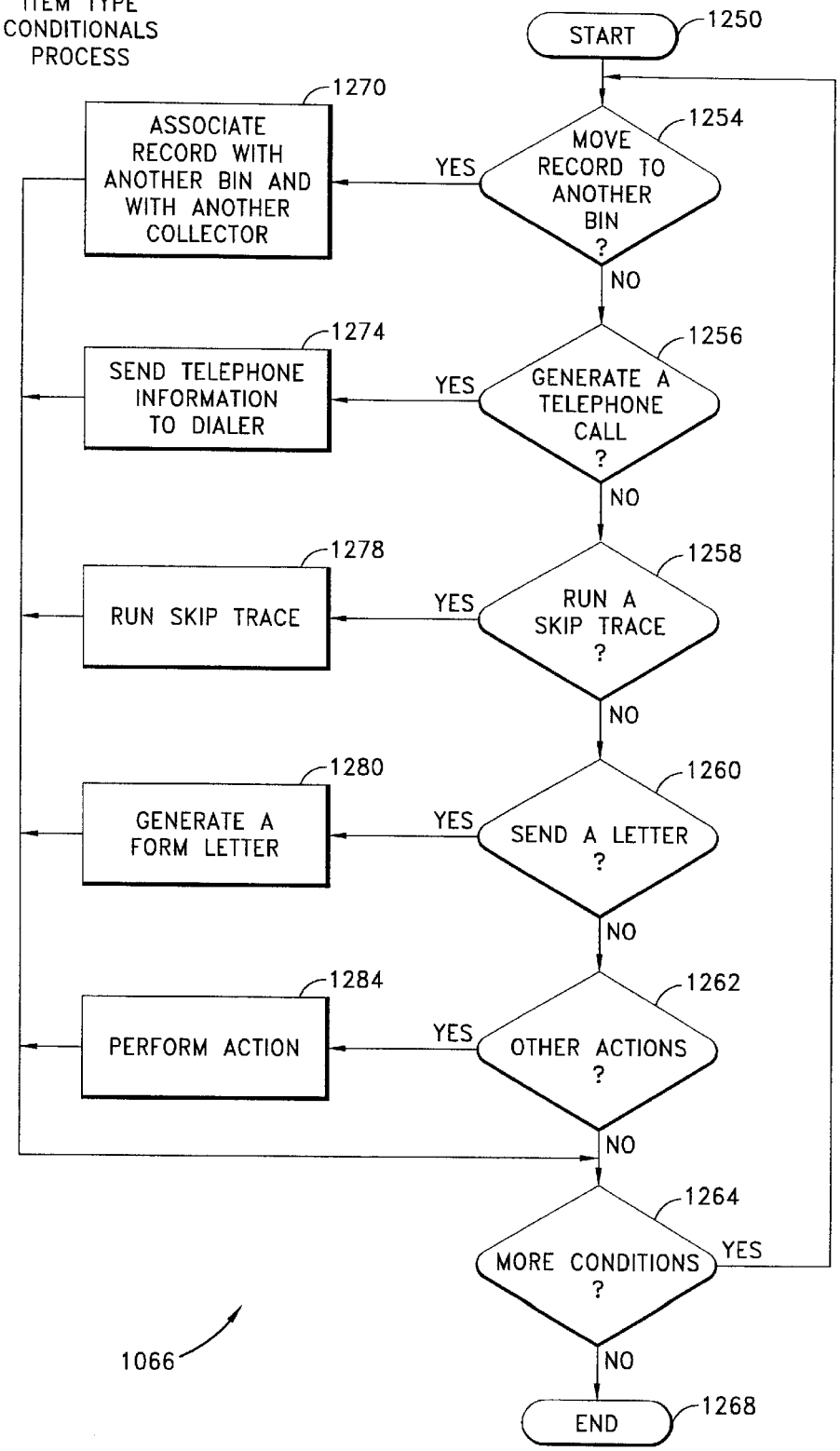
FIG. 26 is a flow diagram illustrating the carry out next item-type conditionals process of FIG. 23.

FIG. 26 describes the carryout next item type conditionals process 1066 of FIG. 23. This process begins at a start state 1250 and moves to a decision state 1254 to determine whether the debtor's record needs to be associated with a different bin. If the debtor's record does not need to be associated with a different bin, the process 1066 moves to a decision state 1256 to determine whether a telephone call needs to be generated for the debtor. This process would be undertaken when the collector has scheduled a telephone call with the auto dialer system of the invention. If a determination is made the decision state 1256 that a telephone call does not need to be generated, the process 1066 moves to a decision state 1258 to determine whether a skip trace needs to be run on the debtor. If a skip trace does not need to be run, the process continues to a decision state 1260 to determine whether a letter needs to be sent to the debtor.

If a determination is made that a letter does not need to be sent at the decision state 1260, the process 1066 moves to a decision state 1262 to determine whether any other action needs to be undertaken by the next item type conditional. If no other conditioned action needs to be taken, the process continues to a decision state 1264 to determine whether any more conditions need to be satisfied. If no more conditions need to be satisfied, the process terminates at an end state 1268.

If a determination is made at the decision state 1254 to move a chosen debtor's record to another bin, the process 1066 moves to a state 1270 to associate the current record with another bin and with another collector within the system. The process 1066 would then move to the decision state 1264 to determine whether any additional conditions need to be satisfied.

If a determination was made to generate a telephone call at the decision state 1256, then telephone information, such as the telephone number, area code and name of debtor would be sent to the dialer system at a state 1274. The process would then continue to the decision state 1264 to determine whether additional conditions need to be met.

If a determination was made at the decision state 1258 to run a skip trace on the debtor, then a skip trace is run at the skip trace server 168 (FIG. 1) at a state 1278.

If a determination was made to send a letter to the debtor at the decision state 1260, then a form letter would be generated through the letter generator 154 (FIG. 1) at a state 1280.

If a determination was made at the decision state 1262 that other actions need to be undertaken such as setting an alarm, those actions would be performed at a state 1284 before the process 1066 returns to the decision state 1264 to determine if more events need to be tested for satisfying conditions. If more events do need to be tested, the process 1066 returns to the decision state 1254 so that the cycle can begin anew.

Figure 27:
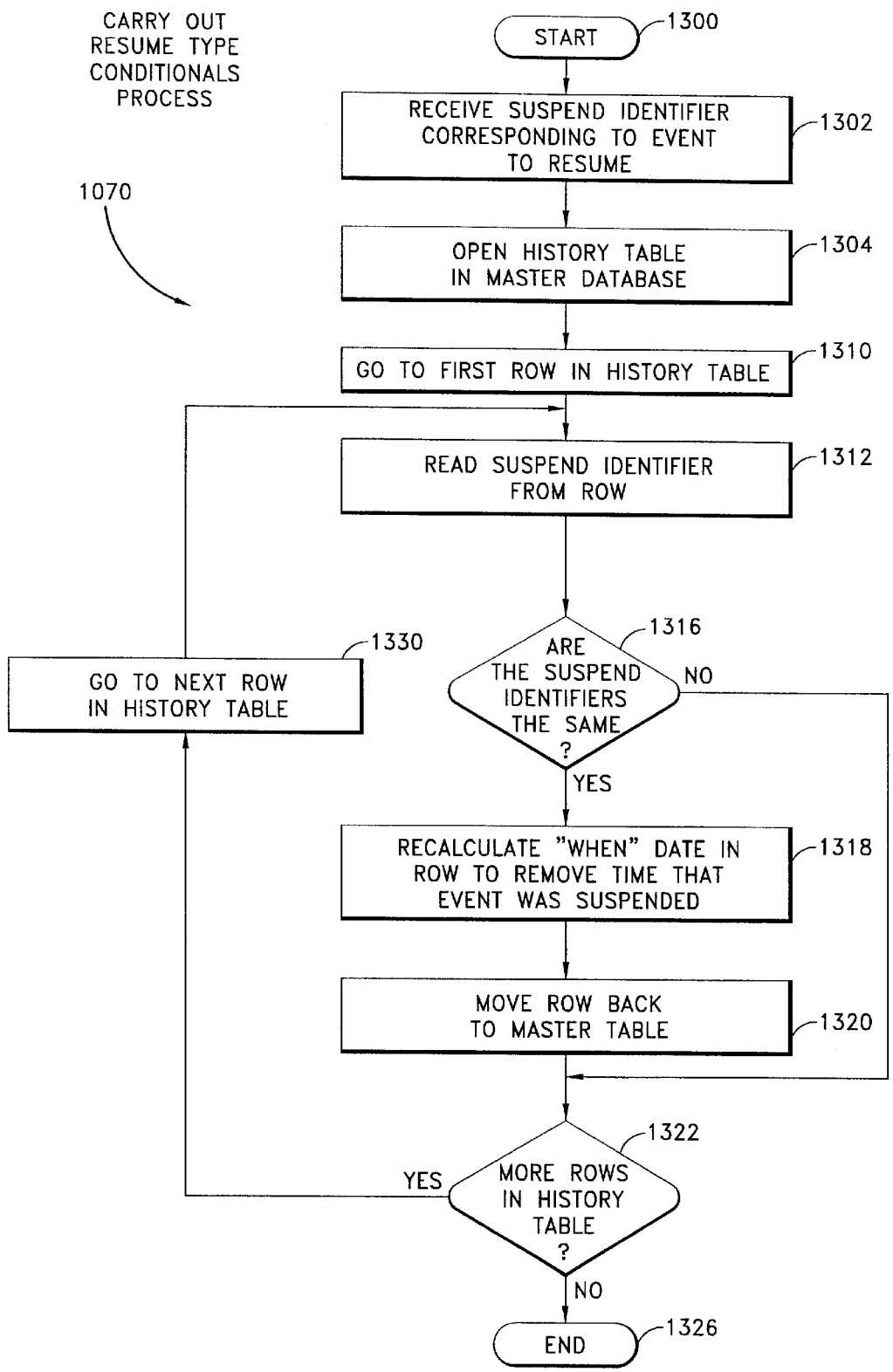
FIG. 27 is a flow diagram illustrating the carry out resume-type conditionals process of FIG. 23.

FIG. 27 illustrates the process 1070 for carrying out a resume type conditionals process. This process begins at a start state 1300 and moves to a state 1302, wherein a suspend identifier corresponding to the detected event to resume is received. The process 1070 then opens the history table 128 (FIG. 2) in the master database 118 at a state 1304 and identifies the first row in the history table 128 at a state 1310.

The process 1070 then moves to a state 1312 and reads the suspend identifier from the selected row. A determination is then made at a decision state 1316 whether the suspended identifiers from the detected event and the suspend identifier in the row are the same. If the identifiers are the same, the process 1070 recalculates the "when" date in the row in order to remove the time from the conditional that the event was suspended. The state 1318 allows the system to suspend a debtor's account for a period of time and then resume the account, preferably with all of the dates and times for the debtor being calculated as if the account had never been suspended at all. Thus, if the debtor had a due date in 14 days when the account was suspended, the system would grant the debtor 14 days from the time that the account was resumed.

The process 1070 then moves to state 1320 wherein the row selected in the history table is moved back to the master table. The process 1070 then moves to a decision state 1322 to determine whether more rows exist in the history table to be analyzed. If no more rows exist, the process 1070 terminates at an end state 1326.

It should be noted that if more rows do exist at the decision state 1322, the process 1070 moves to a state 1330, wherein a pointer is moved to the next row in the history table and the process continues to read the suspend identifier at the state 1312.

B. Fileback Process

One aspect of the present invention is a method for temporarily moving debtor accounts from the Desk Bins to the Central Files bins, to be automatically returned to the Desk Bins. As discussed previously, the present debt collection system is designed to give the collector some control over the management of their debtor accounts. However, some controls are desirable to ensure that accounts are not completely neglected, possibly resulting in liability and at the very least reduced productivity for the collection agency. The Fileback process is one mechanism that is used to move accounts from the active Desk Bins back to Central Files 430*n* and 430*o* (FIG. 5) so that the collector can "clear his desk" for temporarily inactive or non-urgent files without completely neglecting those accounts. Moreover, the model is comfortably reminiscent of physical file management.

The purpose of the Fileback process is to move accounts at the end of the day from the Desk Bins 430*a*–430*m* (FIG. 5) to the "Contacted" and "Never Contacted" bins 430*n*, 430*o* of Central Files with a due date for follow-up. The follow-up due date is then stored with every account in the Central Files. The Fileback process can be programmed to automatically set the due date of accounts moved into central files for 1, 2, 3, 4, 5, 6, 7 or more days from current date. Alternatively, an algorithm can be programmed that randomly or pseudo-randomly assigns a follow-up date to each record as it is being returned to the Central Files. Preferably, the collector sets the due date for filing the account back to Today's Work bin.

The next time the collector logs into the computer another process reads the follow-up due date stored in the accounts in the Central Files moves the accounts with the due date of the current date into the "Today's Work" bin.

Figure 28:
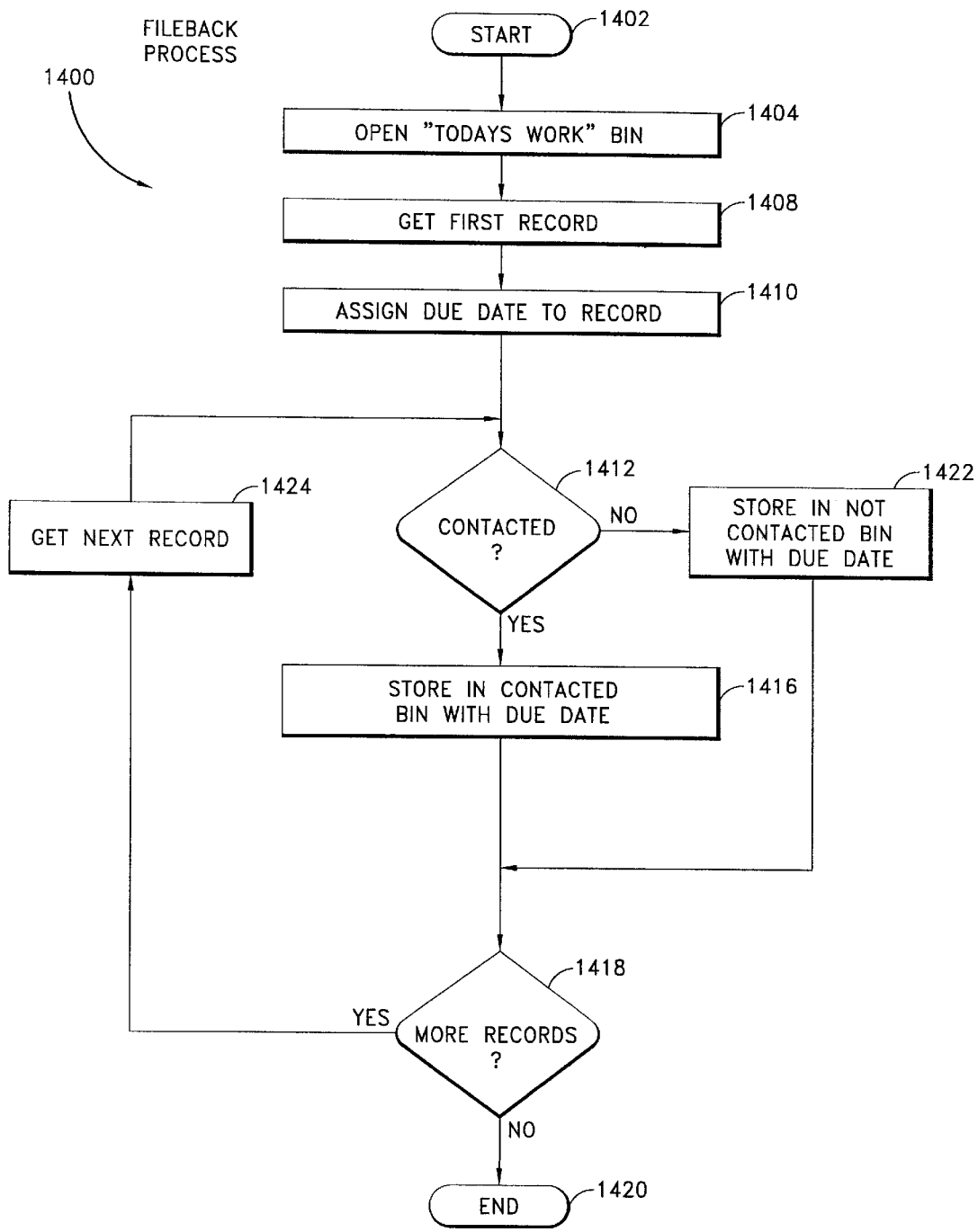
FIG. 28 is a flow diagram illustrating a Fileback process for clearing accounts from the Desk Bins to Central Files and returning debtor accounts to the Desk Bins.

FIG. 28 is one example of a Fileback process 1400. The process 1400 begins at a start state 1402 and then moves to a state 1404 wherein an active Desk Bin 430*a*–430*m* (typically "Today's Work" bin, as illustrated) is opened. At this point the collector indicates the account(s) to be returned to Central Files for filing back to Today's Work bin, such by selecting accounts and hitting a function key designating the Fileback process (typically at an open bin stage such as FIG. 8).

The process 1400 then moves to a state 1408, wherein the first selected record in the Today's Work bin is read. Preferably, the collector assigns a due date to the first record at a state 1410. The due date can be any date that is predetermined by the manager or collector.

Once the due date is assigned at the state 1410, the process 1400 moves to a decision state 1412 to determine if the current record is for a debtor that has been contacted by the collector. This determination can be made, for example, by analyzing the transaction history for any mention of a contact (telephone call, letter, etc.) with the debtor. If a debtor has been contacted, the process 1400 moves to state 1416, wherein the debtor identification number and due date is associated with the Contacted bin 430*o*.

A decision is then made at decision state 1418 whether or not there are more selected records from the Desk Bin to be analyzed. If no more records have been selected for Fileback at the decision state 1418, the process 1400 terminates at an end state 1420.

If a determination had been made at the decision state 1412 that the chosen record had not yet been contacted by the collector, the process 1400 moves to a state 1422 wherein the currently selected debtor's account is associated with the Never Contacted bin 430*n* of Central Files. In addition, if there were more records to be analyzed at the decision state 1418, the process 1400 moves to a state 1424, wherein the next record in the Today's Work bin is analyzed. The process 1400 then returns to the state 1410 wherein a due date is assigned to the record.

In practice, a collector selects a plurality of accounts to send to Central Files for Fileback, and movement to the Central Files bins takes place at the end of the day. Until then, the collector continues to have the option of working the account through the Desk Bin in which it currently is stored.

C. Scatter Back Process

The purpose of the Scatter Back process is to temporarily move accounts at from the Desk Bins 430*a*–430*m* (FIG. 5) to the "Contacted" and "Never Contacted" Central Files bins 430*n*, 430*o* with a random due date for returning the account back to the Today's Work bin. Thus, if the collector is not likely to work a particular account in his Today's Work bin for many days, and there is no urgency to address that account, the collect can move those accounts to Central Files for a random period of time, within preset limits. When multiple accounts are sent to Central Files using the Scatter Back feature, the system distributes the return of those accounts to Today's Work bin over several days in order to even out the work flow for the collector.

The Scatter Back process can be programmed to automatically distribute the accounts over a set period of days. For example, due dates of accounts moved into central files can be distributed over 2, 3, 4, 5, 6, 7 or more days. Of course, the Scatter Back process can randomly select a due date within any set length of time, without departing from the spirit of the invention. In the illustrated embodiment, the files are distributed over 21 days. Thus, if a collector selects 42 files for Scatter Back, the collector will see two new files in his/her Today's Work bin every day for the next 21 days.

Figure 29:
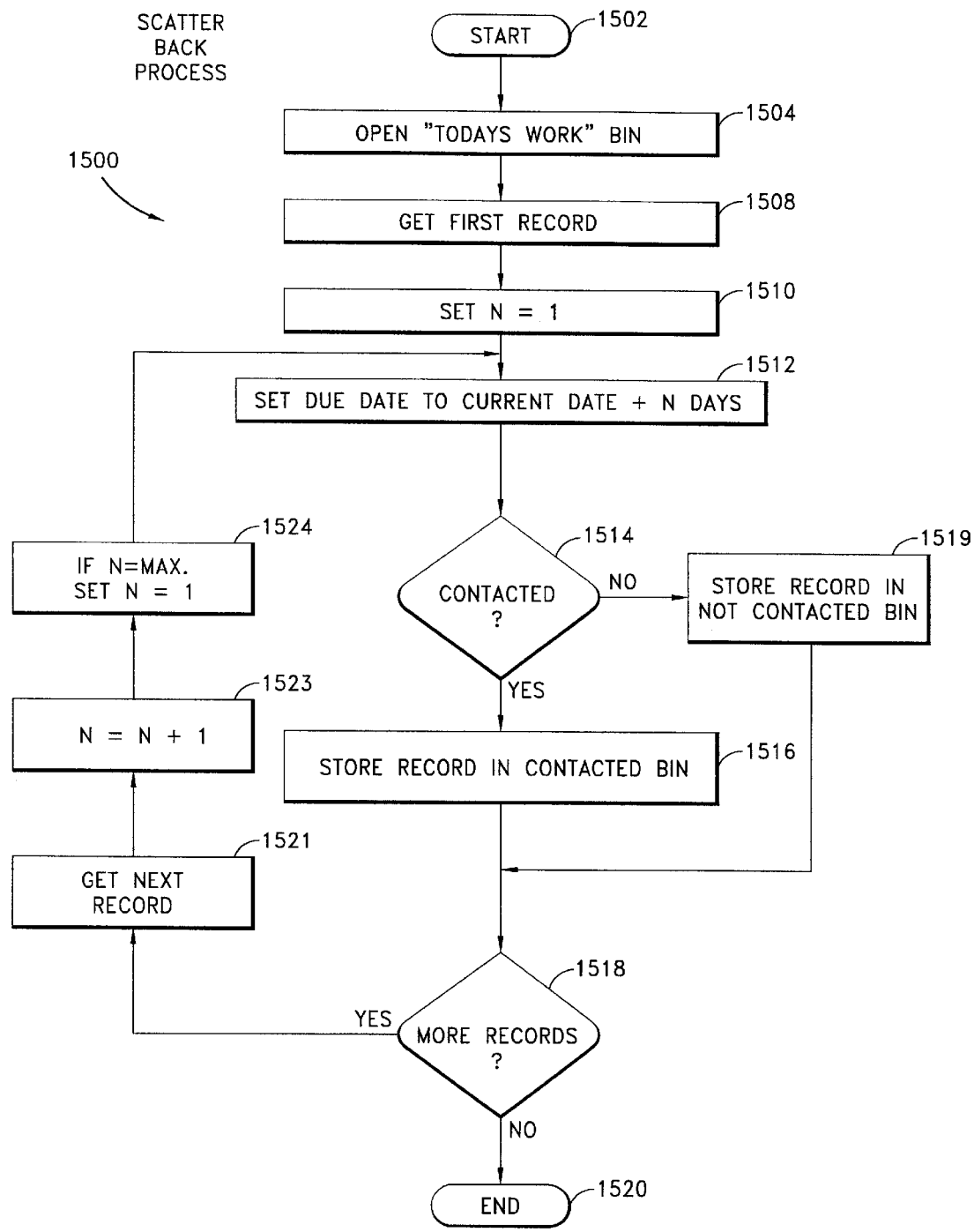
FIG. 29 is a flow diagram illustrating a scatter back process for clearing accounts from the Desk Bins to Central Files and returning accounts to the Desk Bins.

FIG. 29 is one example of a Scatter Back process 1500. The process 1500 begins at a start state 1502 and then moves to a state 1504 wherein the Desk Bins are opened. At this point, the collect can select one or more accounts to be sent to Central Files and "scattered back" to Today's Work bin over time. By the end of the day, the collector will likely have selected several accounts for Scatter Back, and these are cued up in random order when the start state 1502 begins, either at a scheduled after-hours time each day, or when the collector logs off.

The process 1500 then moves to a state 1508 wherein the first selected record is read. A counter "N" is then set to 1 at a state 1510. The process then moves to a state 1512 wherein the due date is set to the current date plus N days.

Once the first record has been assigned a due date, at the state 1510, the process 1500 moves to a decision state 1512 to determine if the current record is for a debtor that has been contacted by the collector. This determination can be made by analyzing the transaction history for any mention of a contact (telephone call, letter, etc.) with the debtor. If a debtor has been contacted, the process 1500 moves to state 1516, wherein the debtor identification number and due date is associated with the Contacted bin 430o. If a determination had been made at the decision state 1512 that the chosen record had not yet been contacted by the collector, the process 1500 moves to a state 1519, wherein the currently selected debtor's account is associated with the Never Contacted bin 430n of Central Files.

A decision is then made at decision state 1518 whether or not there are more records selected for Scatter Back. If no more records have been selected at the decision state 1518, the process 1500 terminates at an end state 1520.

If more records are available to be analyzed at the decision state 1518, the process 1500 moves to a state 1521 wherein the next record in the Today's Work bin is retrieved. The process then moves to a state 1523 wherein N is set to N+1. The process 1500 then moves to a state 1524 where, in the illustrated embodiment, if N=max days, then N is reset to 1. If N is less than the maximum number of days, then N is set to N+1. Thus, the process scatters due dates over a specified period. In one example, the maximum period is 21 days. Once the correct value of N is calculated at state 1524, the process returns to the state 1512 to set the due date to the current date plus N days. In this manner, the due dates of the debtor's accounts that are sent back to "central files" are divided over a specified maximum period. Of course, it should be realized that the calculation made at state 1524 could be modified to reset N to be "1" after every 5, 7, 10, 14, 15, 21 or 28 days, or any other chosen cycle length, in order to scatter the debtor accounts over a desired period of time.

D. Workflow Management

While particularly advantageous in a contact management context, the combination of automation and flexibility of the illustrated software enables use in more general workflow management contexts. One example of using the debt collection system as a workflow management tool is illustrated below.

When a new account is brought into the debt collection business, a manager first reviews the account and assigns a collectability rating to the debtor's account. Alternatively, the rating can be automatically calculated from a variety of information in the master database 118 (FIGS. 1 and 2). This rating is used to give the collector an idea of how many resources are available to the debtor to pay the debt. The manager then assigns the account to the collector by associating that collector's ID number with the debtor in the accounts bin table.

Once the collector's ID number is associated with the new debtor account, the New Business bin 430f becomes updated on the collector's desktop to indicate that a new account has been added. The collector has the flexibility to select any account in any bin to work on. However, if the new account carries a large balance and is rated as "Very Good" for collectability, the collector will likely want to contact this debtor before other lower rated accounts. Moreover, the collector is aware that of the debtor account's status due to its placement in the New Business bin 430f. Similarly, the collector would be aware that an account in the Promise to Pay bin 430d has not only been found and contacted, but has also agreed to begin a payment plan of some sort. Knowing his or her own preferences, strengths and weaknesses, the collector can decide the sequence in which he or she works to optimize productivity.

Returning the debt collection example, when the collector contacts the debtor, the debtor might dispute the debt by stating that he never signed any loan documents. The collector can then make a menu choice from the main menu that generates a "DISPUTE" event. This event will cause a customer service representative's ID number to be associated with a copy of the debtor's account. In addition, the debtor's account is moved from the "Today's Work" bin on the collector's display to a "Delay in Collections" bin. Thus, the next time the customer service representative goes to her "Today's Work" bin, it will include the debtor with the dispute.

The customer service representative can order copies of the loan documents, which then places the debtor's account in a suspend mode until the documents are received. Once the loan documents are received, the customer service representative can scan them in through the media module. This generates a MEDIA RECEIVED event that removes the customer service representative's name from the debtor's account and changes the original collector's display to move the account from the "Delay in Collection" bin to the "Today's Work" bin.

Thus, the next time the collector logs into the system, the debtor's account will again appear in his Today's Work bin. The collector can review the account, and see from the scanned document that the debtor did indeed sign the loan documents. The collector can then contact the debtor and discuss the scanned documents while the are displayed on the collector's screen.

This system of bins and bin movements allows a debt collection company to manage workflow between several departments, such as collections and customer service. This provides a tremendous advantage over prior, more limited debt collection systems.

More generally speaking, a plurality of tasks (contacting a plurality of debtors) are each assigned a value (ranking), based upon which a worker (collector) can manage the sequence and number of tasks he addresses each day. In addition to the ranking, the collector is aware at a glance of the number of tasks (accounts to contact) in each of several categories, and the categorization aids productivity by visually informing the collector's selection. Moreover, the system advantageously facilitates specialized task distribution for different individuals or groups to tackle different tasks (contact, skiptracing, documentation of disputes, etc.) associated with the same item (account). Note that the workflow management aspect of the invention is not limited to users making contact with customers or debtors, but is rather more broadly applicable to managing any multi-person, multi-task effort.

E. Contractual Obligations

As discussed above, an important aspect of the debt collection system is the contract compliance aspect of the scheduler. As can be appreciated, each account that is brought into a debt collection business is normally controlled by contractual obligations with the debt collection business' client. Similarly, loans involving government creditors trigger legal obligations, such as Federal Due Diligence requirements imposed on the collection of federal student loans. Additionally, all collectors are governed by the Fair Debt Collections Practices Act (FDCPA).

The scheduler module of the present invention can be advantageously programmed with such obligations, so that if the collector does not meet certain requirements, the system will automatically set an alarm or perform a function. While known software systems for collection agencies would address these requirements by forcing rigid schedules upon collectors, the present system provides flexibility for the collector to operate efficiently accordingly to his or her own preferences, strengths and weaknesses, while providing safety systems to prevent failure to meet contractual obligations.

For example, if the debt collection agency has an obligation through its contract with ACME to contact the debtor at least once a month, the scheduler program can be modified to check for this condition, and perform an action if the condition is not met. In one scenario, the scheduler module can be programmed to search the transaction history file of each debtor that owes money to ACME. If the last contact with the debtor was more than 25 days ago, the scheduler can set an alarm to remind the collector that a contact needs to be made.

If the scheduler determines that last contact with the debtor was 28 days ago, it reprioritize by moving the account to a different bin. Preferably, the safety controls "enforce" contractual and other legal obligations by providing more information, rather than forcing actions by the collector. Most preferably, reports generated by and alarm messages provided to managers operate as the controls to ensure obligations are met. Such automated backups provide the managers debt collection business with a flexible, yet controlled system for collecting debt and complying with contractual obligations.

F. Scrolling Bins

Figure 30:
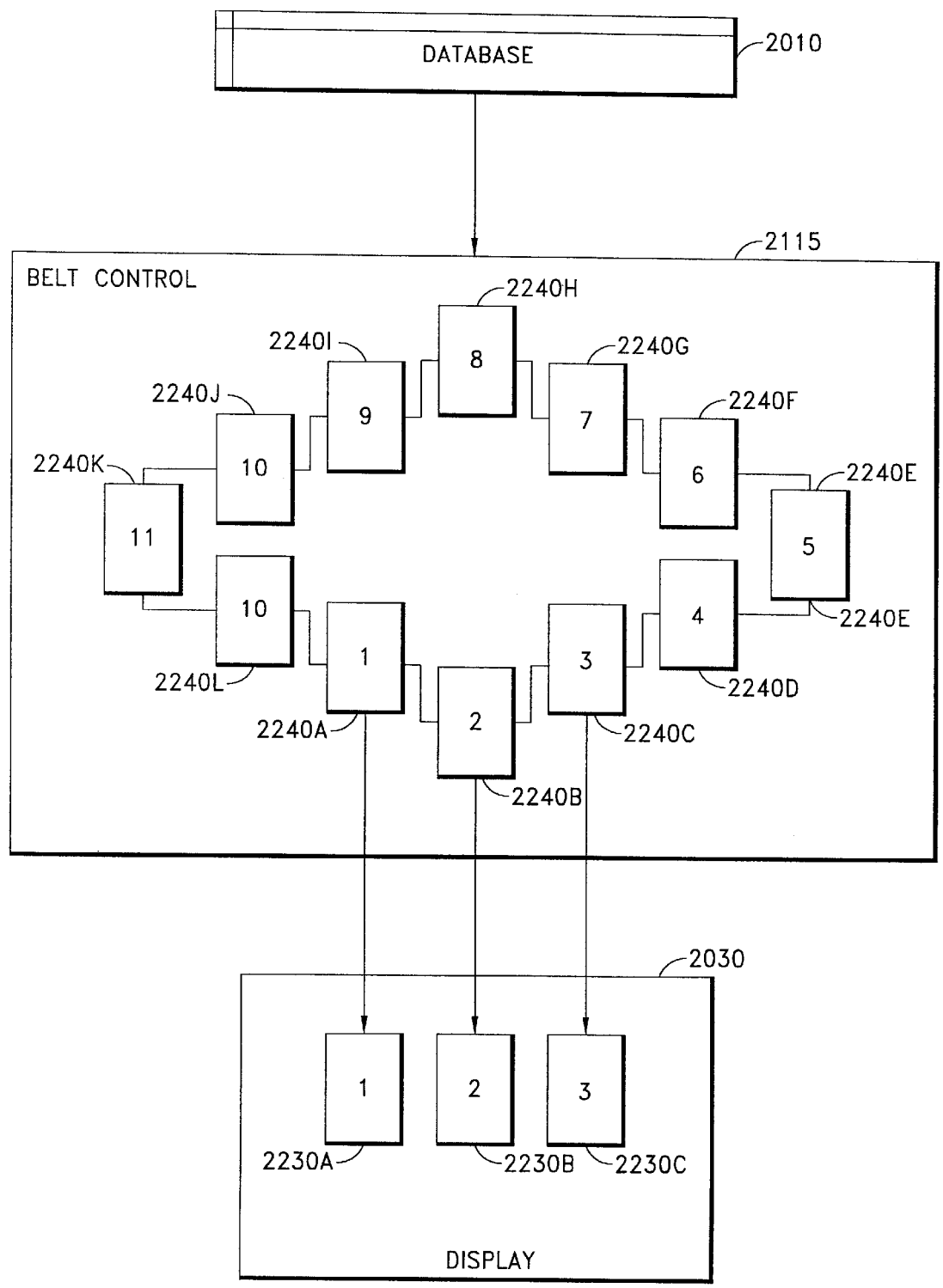
FIG. 30 is a block diagram illustrating one embodiment of a bin display that includes scrolling bins.

FIG. 30 provides an illustration of an embodiment of a database 2010 linked to a bin "belt" control 2115. The bin belt control 2115 is linked to the database 2010 that stores information to be displayed to a user. Also connected to the belt control 2115 is a display 2030. The database 2010 provides data to the belt control 2115 that is eventually displayed within a plurality of windows 2230a–2230c on the display 2030.

The belt control 2115 can be conceptually described as a circular (belt) pattern of bins 2240a–2240l. Each of the bins 2240a–l hold information from the database 2010 that can be displayed in one of the windows 2230a–2230c. For example, as shown in FIG. 30, three bins 2240a–2240c are displayed in the three windows 2230a–2230c, respectively. However, if a user presses one of the arrow keys, the data being displayed in windows 2230a–2230c will change.

For example, if the user presses the right arrow key, all of the data being displayed will shift one bin to the right. Thus, the information from bin 2240b will be displayed in window 2230a; information from belt item 2240c will be presented in window 2230b; and the information in belt item 2240d is then shown in window 2230c. If the user keeps pressing the right arrow key, the data displayed in the windows 2230a–2230cwill change to display triplets of data fields as they move around the circular belt pattern 2115.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A computerized method of managing contact information for managing the status of a plurality of customer accounts, the method comprising:

storing a plurality of names of customer accounts, a category identifier that identifies one or more categories associated with the plurality of the customer accounts, and a rating for each customer account;

outputting a graphical display to a display screen, said graphical display comprising a plurality of graphical shapes, wherein each graphical shape represents one of said categories associated with the plurality of the customer accounts, wherein the graphical shapes indicate the number of customer accounts within each category and the rating for each customer account, wherein the graphical shapes indicate the number of customer accounts having each type of rating by associating a color with each possible rating, wherein each graphical shape is colored in a proportion substantially equal to the proportion of each rating within the total number of customer accounts, and wherein each category identifier corresponds to a graphical shape that indicates a current status of the customer accounts;

changing a category identifier associated with a customer account so that said customer account becomes associated with a different category corresponding to a different graphical shape and thereby indicating an updated status of said customer account, wherein said updated status indicates that a new action needs to be taken on said customer account;

receiving input from a user indicating which of said plurality of graphical shapes is selected by the user; and displaying a list of the plurality of the customer accounts associated with the selected graphical shape.

2. The method of claim 1, wherein the contact information is debt collection information.

3. The method of claim 1, wherein receiving input comprises selecting a function key on a computer keyboard.

4. The method of claim 1, wherein the graphical shapes are rectangles.

5. The method of claim 1, wherein the number of customer accounts within each category is displayed within its corresponding graphical shape.

6. The method of claim 1, further comprising storing a rating for each customer account.

7. The method of claim 6, wherein the graphical shapes indicate the number of the customer accounts within each category, and the rating for each customer account.

8. The method of claim 7, wherein the graphical shapes indicate the number of customer accounts having each type of rating by associating a color with each possible rating, and wherein each graphical shape is colored in a proportion substantially equal to the proportion of each rating within the total number of customer accounts.

9. The method of claim 1, further comprising changing the association between the customer accounts and the categories in response to an event.

10. The method of claim 9, wherein said event is generated in response to a key being pressed on a keyboard.

11. The method of claim 9, wherein said event is generated in response to a selection being made from a menu.

12. The method of claim 9, wherein said event is automatically generated in response to a condition being satisfied.

13. The method of claim 12, wherein the condition being satisfied is selected from the group consisting of: a date condition, a time condition, a flag set condition and a data entry found condition.

14. A computerized method of managing debt collection, the method comprising:
   storing a plurality of names of debtors, a category identifier that identifies one or more categories associated with the plurality of the names of debtors, and a collectability ranking for each debtor; and
   outputting a graphical display to a display screen, said graphical display comprising a plurality of graphical shapes, wherein each graphical shape has a particular size and represents one of said categories associated with the plurality of the names of debtors, wherein each category identifier corresponds to a graphical shape, wherein the particular size of each graphical shape is configured to change in relation to the number of debtors associated with the category represented by said graphical shape, wherein the graphical shapes are rectangles, wherein the rectangles indicate the number of debtors having each type of ranking by associating a shading with each possible ranking, and wherein each rectangle is shaded in a proportion equal to the proportion of each ranking within the total number of debtors.

15. The method of claim 14, further comprising displaying on the display screen a list of debtors in each category.

16. The method of claim 14, wherein the collectability ranking is selected from the group consisting of: Very Good, Average and Poor.

17. The method of claim 14, further comprising storing data relating to a debt owed by the debtors.

18. The method of claim 14, wherein the graphical shapes are rectangles.

19. The method of claim 18, wherein the number of debtors within each category is displayed within the rectangles.

20. The method of claim 18, wherein the rectangles indicate the number of debtors that have each type of ranking.

21. The method of claim 18, wherein the rectangles indicate the number of debtors having each type of ranking by associating a shading with each possible ranking, and wherein each rectangle is shaded in a proportion equal to the proportion of each ranking within the total number of debtors.

22. The method of claim 14, further comprising changing the association between debtors and categories in response to an event.

23. The method of claim 22, wherein said event is generated in response to a keyboard input.

24. The method of claim 22, wherein said event is generated in response to a user making a selection from a menu.

25. The method of claim 22, wherein said event is automatically generated in response to a condition being satisfied.

26. The method of claim 25, wherein the condition being satisfied is selected from the group consisting of a date condition, a time condition, a flag set condition and a data entry found condition.

27. A computerized method of managing contact information for managing the status of a plurality of customer accounts, the method comprising:
   storing a plurality of names of customer accounts, a category identifier that identifies one or more categories associated with the plurality of the customer accounts, and a rating for each customer account;
   outputting a graphical display to a display screen, said graphical display comprising a plurality of graphical shapes, wherein each graphical shape represents one of said categories associated with the plurality of the customer accounts, wherein the graphical shapes indicate the number of customer accounts having each type of rating by associating a color with each possible rating, and wherein each category identifier corresponds to a graphical shape that indicates a current status of the customer accounts;
   changing a category identifier associated with a customer account so that said customer account becomes associated with a different category corresponding to a different graphical shape and thereby indicating an updated status of said customer account wherein said updated status indicates that a new action needs to be taken on said customer account;
   receiving input from a user indicating which of said plurality of graphical shapes is selected by the user; and
   displaying a list of the plurality of the customer accounts associated with the selected graphical shape.

28. The method of claim 27, wherein the contact information is debt collection information.

29. The method of claim 27, wherein receiving input comprises selecting a function key on a computer keyboard.

30. The method of claim 27, wherein the graphical shapes are rectangles.

31. The method of claim 27, wherein the number of customer accounts within each category is displayed within its corresponding graphical shape.

32. The method of claim 27, further comprising storing a rating for each customer account.

33. The method of claim 32, wherein the graphical shapes indicate the number of the customer accounts within each category, and the rating for each customer account.

34. The method of claim 33, wherein the graphical shapes indicate the number of customer accounts having each type of rating by associating a color with each possible rating, and wherein each graphical shape is colored in a proportion substantially equal to the proportion of each rating within the total number of customer accounts.

35. The method of claim 27, further comprising changing the association between the customer accounts and the categories in response to an event.

36. The method of claim 35, wherein said event is generated in response to a key being pressed on a keyboard.

37. The method of claim 35, wherein said event is generated in response to a selection being made from a menu.

38. The method of claim 35, wherein said event is automatically generated in response to a condition being satisfied.

39. The method of claim 38, wherein the condition being satisfied is selected from the group consisting of: a date condition, a time condition, a flag set condition and a data entry found condition.

* * * * *